United States Patent
Rico Alvarino et al.

(10) Patent No.: US 12,302,264 B2
(45) Date of Patent: May 13, 2025

(54) TIMING IMPROVEMENTS FOR WIRELESS COMMUNICATIONS SYSTEMS

(71) Applicant: QUALCOMM Incorporated, San Diego, CA (US)

(72) Inventors: Alberto Rico Alvarino, San Diego, CA (US); Xiao Feng Wang, San Diego, CA (US); Liangping Ma, San Diego, CA (US); Ayan Sengupta, San Diego, CA (US); Jun Ma, San Diego, CA (US); Huilin Xu, Temecula, CA (US); Peter Gaal, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/440,963

(22) Filed: Feb. 13, 2024

(65) Prior Publication Data

US 2024/0276404 A1 Aug. 15, 2024

Related U.S. Application Data

(63) Continuation of application No. 17/214,538, filed on Mar. 26, 2021, now Pat. No. 11,937,193.
(Continued)

(51) Int. Cl.
*H04W 56/00* (2009.01)
*H04W 4/029* (2018.01)
*H04W 74/0833* (2024.01)

(52) U.S. Cl.
CPC ....... *H04W 56/0005* (2013.01); *H04W 4/029* (2018.02); *H04W 74/0833* (2013.01)

(58) Field of Classification Search
None
See application file for complete search history.

(56) References Cited

U.S. PATENT DOCUMENTS 7,248,841 B2 * 7/2007 Agee ............... H04W 24/02
455/272
9,781,717 B2 * 10/2017 Zhao ............... H04W 72/0446
(Continued)

FOREIGN PATENT DOCUMENTS

CN 105830519 A 8/2016
CN 107371271 A 11/2017
(Continued)

OTHER PUBLICATIONS

3GPP TS 38.104: "3rd Generation Partnership Project, Technical Specification Group Radio Access Network, NR, Base Station (BS) Radio Transmission and Reception (Release 15)", V15.2.0 (Jun. 2018), pp. 1-147.
(Continued)

*Primary Examiner* — Faiyazkhan Ghafoerkhan
(74) *Attorney, Agent, or Firm* — Holland & Hart LLP

(57) ABSTRACT

Non-terrestrial networks (NTNs) may establish uplink (UL) and downlink (DL) radio frame timing structures to efficiently account for propagation delay and propagation delay variation associated with communications in the NTN. NTNs may manage (synchronize) radio frame timing structures of base stations (e.g., satellites) and user equipment (UEs) in the NTN. Further, UEs may determine timing advance (TA) values to be applied to UL transmissions based on their respective scheduling offset (e.g., offset in UL and DL radio frame timing structures), as well as based on propagation delay or round trip time (RTT). As such, served UEs may determine UL timing such that UL transmissions from the UEs to a satellite arrives at the satellite in a time synchronized manner. In other cases, a satellite may determine UL timing, based on reception timing, such that various UEs in the NTN may implement uniform UL and DL radio frame timing structures.

42 Claims, 27 Drawing Sheets

US 12,302,264 B2
Page 2

Related U.S. Application Data

(60) Provisional application No. 63/003,687, filed on Apr. 1, 2020.

(56) References Cited

U.S. PATENT DOCUMENTS

| | | | | |
|---|---|---|---|---|
| 10,219,776 | B2* | 3/2019 | Belei | A61B 6/0487 |
| 10,624,052 | B2* | 4/2020 | Alasti | H04B 7/2125 |
| 10,716,127 | B2* | 7/2020 | Yang | H04L 1/1854 |
| 11,166,065 | B1* | 11/2021 | Camargo | H04N 21/4318 |
| 11,469,815 | B2* | 10/2022 | Hsieh | H04W 56/0045 |
| 11,522,658 | B2* | 12/2022 | Harrison | H04B 7/0691 |
| 11,523,344 | B2* | 12/2022 | Song | H04W 52/0222 |
| 11,546,935 | B2* | 1/2023 | Huang | H04L 1/1864 |
| 11,552,700 | B2* | 1/2023 | Charbit | H04L 1/189 |
| 11,570,646 | B2* | 1/2023 | Sarkis | H04L 5/0044 |
| 11,576,035 | B2* | 2/2023 | Ekpenyong | H04W 8/245 |
| 11,595,928 | B2* | 2/2023 | Lin | H04L 5/0087 |
| 11,659,599 | B2* | 5/2023 | Ma | H04W 56/0045 370/336 |
| 11,711,171 | B2* | 7/2023 | Salem | H04L 1/1819 370/329 |
| 11,937,193 | B2* | 3/2024 | Rico Alvarino | H04W 56/0005 |
| 2005/0058149 | A1* | 3/2005 | Howe | H04L 49/602 370/428 |
| 2007/0211657 | A1* | 9/2007 | McBeath | H04W 72/0446 370/347 |
| 2012/0269180 | A1* | 10/2012 | Li | H04L 1/1822 370/336 |
| 2013/0034066 | A1* | 2/2013 | Kakishima | H04L 27/2613 370/329 |
| 2013/0100936 | A1* | 4/2013 | Pettersson | H04W 72/0446 370/336 |
| 2015/0181544 | A1* | 6/2015 | Liu | H04B 7/18506 370/336 |
| 2015/0334705 | A1* | 11/2015 | Zhao | H04W 36/22 370/329 |
| 2017/0201974 | A1* | 7/2017 | Sohn | H04W 72/21 |
| 2017/0318605 | A1* | 11/2017 | Wijetunge | H04W 72/12 |
| 2019/0075536 | A1* | 3/2019 | Hans | H04W 56/0045 |
| 2019/0090261 | A1* | 3/2019 | Yang | H04W 72/0446 |
| 2019/0190661 | A1* | 6/2019 | You | H04W 74/0833 |
| 2019/0207719 | A1* | 7/2019 | Shevchenko | H03M 13/251 |
| 2019/0215104 | A1* | 7/2019 | Salem | H04W 80/02 |
| 2019/0306848 | A1* | 10/2019 | Zhou | H04W 72/20 |
| 2019/0349877 | A1* | 11/2019 | Alasti | H04W 56/0045 |
| 2020/0120458 | A1* | 4/2020 | Aldana | H04W 12/069 |
| 2020/0274654 | A1* | 8/2020 | Loehr | H04W 72/23 |
| 2020/0295824 | A1* | 9/2020 | Charbit | H04L 1/1864 |
| 2020/0314816 | A1* | 10/2020 | Yi | H04L 5/0094 |
| 2021/0029658 | A1* | 1/2021 | Mahalingam | H04B 7/1851 |
| 2021/0068142 | A1* | 3/2021 | Park | H04W 72/0453 |
| 2021/0105731 | A1* | 4/2021 | Lin | H04L 5/0087 |
| 2021/0105761 | A1* | 4/2021 | Cheng | H04W 74/0833 |
| 2021/0297149 | A1* | 9/2021 | Hsieh | H04B 7/18589 |
| 2021/0314889 | A1* | 10/2021 | Rico Alvarino | H04W 56/0045 |
| 2021/0314892 | A1* | 10/2021 | Rico Alvarino | H04W 56/0045 |
| 2021/0352708 | A1* | 11/2021 | Seo | H04W 52/0216 |
| 2022/0015120 | A1* | 1/2022 | Qiu | H04W 72/1268 |
| 2022/0030562 | A1* | 1/2022 | Yi | H04W 76/28 |
| 2022/0039140 | A1* | 2/2022 | Yi | H04L 1/08 |
| 2022/0046679 | A1* | 2/2022 | Yeo | H04L 1/1896 |
| 2022/0070809 | A1* | 3/2022 | Song | H04W 72/20 |
| 2022/0086671 | A1* | 3/2022 | Hong | H04W 16/28 |
| 2022/0086715 | A1* | 3/2022 | Hong | H04W 76/19 |
| 2022/0095258 | A1* | 3/2022 | Yeo | H04W 72/0446 |
| 2022/0110146 | A1* | 4/2022 | Xu | H04L 5/14 |
| 2022/0124795 | A1* | 4/2022 | Wu | H04W 56/0045 |
| 2022/0200740 | A1* | 6/2022 | Zou | H04L 1/1887 |
| 2022/0287048 | A1* | 9/2022 | Lin | H04L 27/2655 |
| 2022/0321272 | A1* | 10/2022 | Yoshioka | H04L 1/1854 |
| 2022/0386382 | A1* | 12/2022 | Medeiros De Amorim | H04W 56/0045 |
| 2023/0039715 | A1* | 2/2023 | Ye | H04B 7/19 |
| 2023/0247577 | A1* | 8/2023 | Rico Alvarino | H04W 56/0045 370/329 |
| 2023/0345494 | A1* | 10/2023 | Harrison | H04L 5/0053 |
| 2024/0276404 | A1* | 8/2024 | Rico Alvarino | H04W 4/029 |

FOREIGN PATENT DOCUMENTS

| | | | | |
|---|---|---|---|---|
| CN | 109819511 A | 5/2019 | | |
| EP | 2824979 A1 | 1/2015 | | |
| EP | 3454487 A1 | 3/2019 | | |
| EP | 3588836 A1 | 1/2020 | | |
| WO | WO-2015094815 A1 | 6/2015 | | |
| WO | WO-2015175291 A1 | 11/2015 | | |
| WO | WO-2018003903 A1 | 1/2018 | | |
| WO | WO-2019195457 A1 | 10/2019 | | |
| WO | WO-2020031120 A2 | 2/2020 | | |
| WO | WO-2020031155 A1 * | 2/2020 | | H04B 7/2125 |
| WO | WO-2020032757 A1 | 2/2020 | | |
| WO | WO-2020034564 A1 | 2/2020 | | |

OTHER PUBLICATIONS

CMCC: "Discussion on UL Transmission Timing for NTN", 3GPP Draft, R1-1912535, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823469, pp. 1-3, Section 2.

Dish Network: "On Timing Advance for NTN", 3GPP Draft, 3GPP TSG RAN WG1 Meeting #96Bis, R1-1905215, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700290, 3 Pages, sections 2.2-2.3, sections 2.

Ericsson: "Remaining Details on Random Access for NTN", 3GPP Draft, 3GPP TSG-RAN WG2 #108, R2-1915567, 3rd Generation Partnership Project (3GPP), Mobile Competence Centre, 650, Route Des Lucioles, F-06921 Sophia-Antipolis Cedex, France, vol. RAN WG2, No. Reno, Nevada, US, Nov. 18, 2019-Nov. 22, 2019, Nov. 7, 2019 (Nov. 7, 2019), XP051815978, 7 Pages, Section 2.1.

International Search Report and Written Opinion—PCT/US2021/017953—ISA/EPO—Sep. 13, 2021.

International Preliminary Report on Patentability—PCT/US2021/017953 The International Bureau of WIPO—Geneva, Switzerland, Oct. 13, 2022.

International Preliminary Report on Patentability—PCT/US2021/024699 The International Bureau of WIPO—Geneva, Switzerland, Oct. 13, 2022.

International Search Report and Written Opinion—PCT/US2021/024699—ISA/EPO—Sep. 30, 2021.

Mediatek Inc: "Delay-Tolerant Re-Transmission Mechanisms in NR-NTN", 3GPP TSG RAN WG1 Meeting #96bis, R1-1904646, 3rd Generation Partnership Project, Mobile Competence Centre, 650, Route Des Lucioles, F-06921 Sophia-Ant, vol. RAN WG1, No. Xian, China, Apr. 8, 2019-Apr. 12 2019, Apr. 7, 2019, XP051699855, 5 Pages, Section 2 Section 4 p. 3, figure 3, The whole document.

Mediatek Inc: "Remaining Issues on Enhancements to HARQ for NR-U Operation", 3GPP Draft, 3GPP TSG RAN WG1 #100, R1-2000439, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), XP051853301, 5 Pages, Section 2.1 p. 1, figure 1 p. 2, figure 2.

Moderator (Ericsson): "Feature Lead Summary on Timing Relationship Enhancements", R1-200xxxx, 3GPP TSG-RAN WG1 Meeting#102-e, Document for: Discussion, Agenda Item, Jan. 1, 2020 (Jan. 1, 2020), XP055743390, pp. 1-64, Section 2.

Panasonic: "Issues on Timing Advance and RACH for Ntn", 3GPP Draft, R1-1906264, 3GPP TSG RAN WG1 #97, NTN RACH, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17,

(56) References Cited

OTHER PUBLICATIONS

2019, May 1, 2019 (May 1, 2019), XP051708302, 4 Pages, page 1, Line 1, paragraph 2-line 2 p. 2. line 3-line 4 p. 1. line 11. paragraph 2-line 14.
Panasonic: "Timing Advance and PRACH Design for NTN", 3GPP TSG RAN WG1 #99, R1-1912903, Reno, USA, Nov. 18-22, 2019, 13 Pages.
Partial International Search Report—PCT/US2021/017953—ISA/EPO—Jun. 2, 2021.
Partial International Search Report—PCT/US2021/024699—ISA/EPO—Jul. 13, 2021.
Qualcomm Incorporated: "TP for Enhancements to Scheduling and HARQ Operation for NR-U", 3GPP Draft, 3GPP TSGRAN WG1 Meeting#100e, R1-2000958, 3rd Generation Partnership Project (3GPP), Mobile Competence Centre, 650, Route Des Lucioles, F-06921 Sophia-Antipolis Cedex, France, vol. RAN WG1, No. Feb. 24, 2020-Mar. 6, 2020, Feb. 15, 2020 (Feb. 15, 2020), XP051853533, 6 Pages, Section 3 p. 3, figure 1.
Vivo: "Remaining Issues on HARQ Operation for NR-U", 3GPP Draft, 3GPP TSG RAN WG1 #100, R1-2000311, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051852800, 18 Pages, Section 2 .1.1. p. 3; figure 1 p. 4; figure 2.

\* cited by examiner

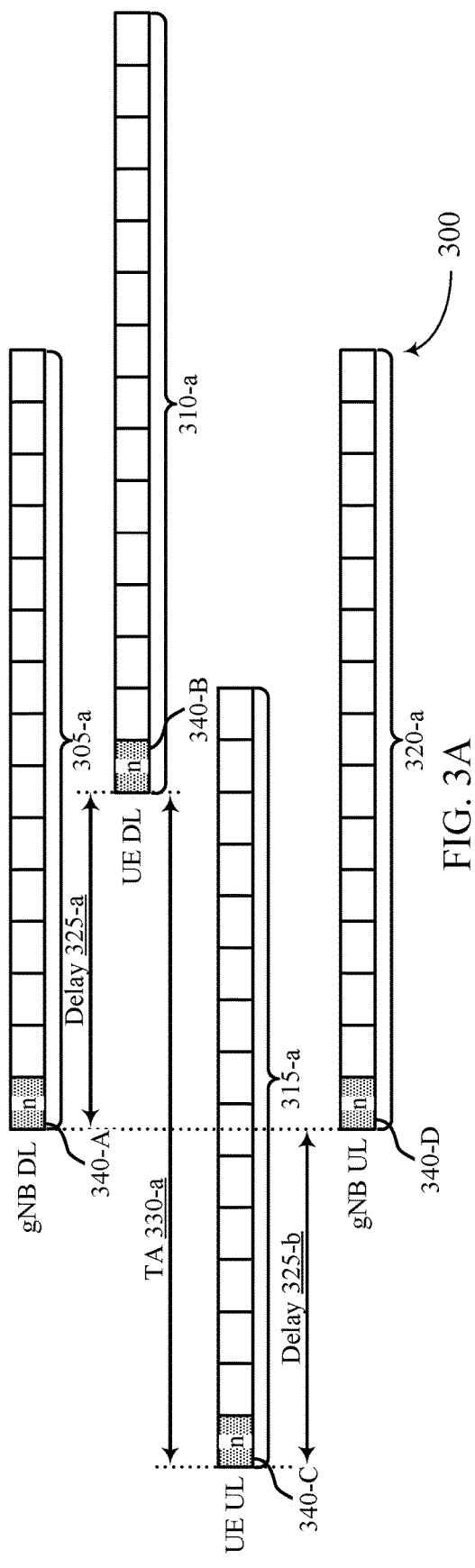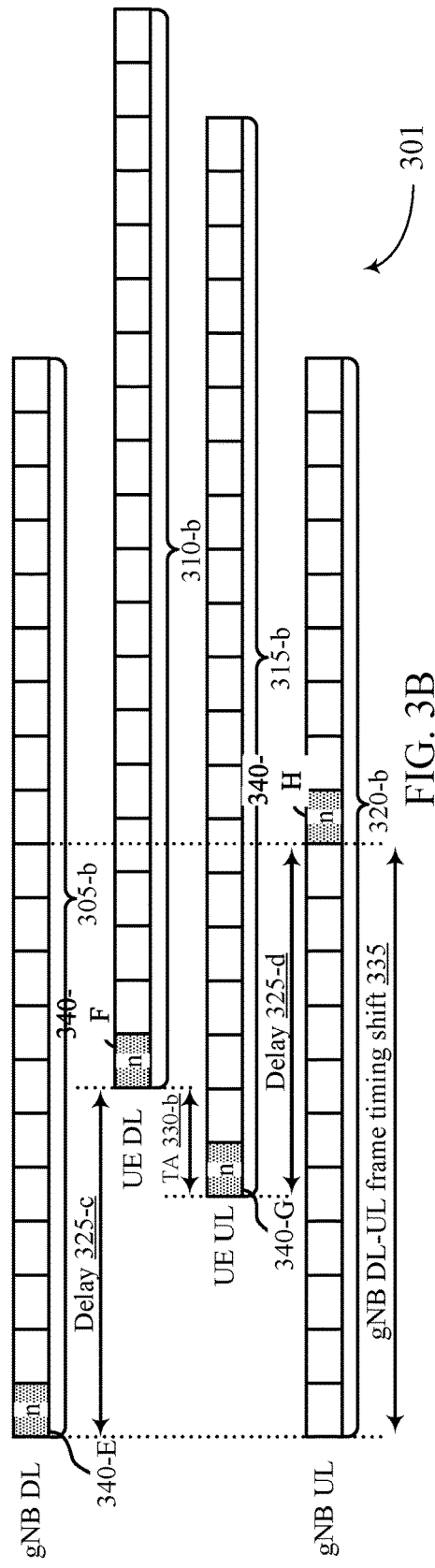
FIG. 3A
FIG. 3B

TIMING IMPROVEMENTS FOR WIRELESS COMMUNICATIONS SYSTEMS

CROSS REFERENCE

The present application is a continuation of U.S. Non-Provisional application Ser. No. 17/214,538 by RICO ALVARINO et al., entitled "TIMING IMPROVEMENTS FOR WIRELESS COMMUNICATION SYSTEMS", filed Mar. 26, 2021, which claims the benefit of U.S. Provisional Patent Application No. 63/003,687 by RICO ALVARINO et al., entitled "TIMING IMPROVEMENTS FOR WIRELESS COMMUNICATIONS SYSTEMS," filed Apr. 1, 2020, which is hereby incorporated by reference in its entirety as if fully set forth below for all applicable purposes.

INTRODUCTION

The following relates generally to wireless communications and more specifically to timing aspects for wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, there may be a large distance between a UE and a serving node of the UE, such as when a gateway or base station and the UE are a part of a non-terrestrial network (NTN). Because of the distance between UEs and gateways in such cases, there may be a relatively long round-trip delay or propagation delay in message transmissions between a UE and gateway (e.g., relative to terrestrial networks). Efficient techniques for managing communications with such relatively long round-trip or propagation delays may thus be desirable for such systems.

SUMMARY

A method of wireless communication at a UE is described. The method may include receiving, from a base station, an indication of a scheduling offset between a downlink (DL) radio frame timing structure and an uplink (UL) radio frame timing structure, and transmitting an UL message to the base station based on a timing advance (TA), the TA based on the received indication of the scheduling offset.

An apparatus for wireless communication at a UE is described. The apparatus may include a processor, and memory coupled to the processor. The processor and memory may be configured to receive, from a base station, an indication of a scheduling offset between a DL radio frame timing structure and an UL radio frame timing structure, and transmit an UL message to the base station based on a TA, the TA based on the received indication of the scheduling offset.

Another apparatus for wireless communication at a UE is described. The apparatus may include means for receiving, from a base station, an indication of a scheduling offset between a DL radio frame timing structure and an UL radio frame timing structure, and transmitting an UL message to the base station based on a TA, the TA based on the received indication of the scheduling offset.

A non-transitory computer-readable medium storing code for wireless communication at a UE is described. The code may include instructions executable by a processor to receive, from a base station, an indication of a scheduling offset between a DL radio frame timing structure and an UL radio frame timing structure, and transmit an UL message to the base station based on a TA, the TA based on the received indication of the scheduling offset.

Some examples of the method, apparatuses, and non-transitory computer-readable medium described herein may further include operations, features, means, or instructions for determining a range of TA values based on the scheduling offset, where the TA may be determined based on the range. Some examples of the method, apparatuses, and non-transitory computer-readable medium described herein may further include operations, features, means, or instructions for determining an orbit type associated with the base station, where the range may be determined based on the orbit type.

Some examples of the method, apparatuses, and non-transitory computer-readable medium described herein may further include operations, features, means, or instructions for determining a TA threshold, where the TA may be determined based on the TA threshold. In some examples of the method, apparatuses, and non-transitory computer-readable medium described herein, the TA threshold may be determined based on one or more of a slot duration, a radio frame numerology, and a buffering capability of the UE. Some examples of the method, apparatuses, and non-transitory computer-readable medium described herein may further include operations, features, means, or instructions for receiving an indication of a common offset associated with a cell served by the base station, where the TA may be determined based on the common offset.

Some examples of the method, apparatuses, and non-transitory computer-readable medium described herein may further include operations, features, means, or instructions for determining a range of TA values based on the common offset, where the TA may be determined based on the range. In some examples of the method, apparatuses, and non-transitory computer-readable medium described herein, the TA may be based on a round trip time (RTT) for communications with the base station. In some examples of the method, apparatuses, and non-transitory computer-readable medium described herein, the RTT for communications with the base station may be determined based on one or more of a position of the UE, a position of the base station, a distance between the UE and the base station, a timestamp corresponding to a DL message received from the base station, and a local timestamp.

Some examples of the method, apparatuses, and non-transitory computer-readable medium described herein may further include operations, features, means, or instructions for determining a network offset between a network DL radio frame timing structure and a network UL radio frame timing structure, where the TA may be determined based on the network offset. Some examples of the method, apparatuses, and non-transitory computer-readable medium described herein may further include operations, features, means, or instructions for determining a range of TA values based on the network offset, where the TA may be determined based on the range. Some examples of the method, apparatuses, and non-transitory computer-readable medium described herein may further include operations, features, means, or instructions for receiving an indication of the network offset, where the network offset may be determined based on the indication of the network offset.

Some examples of the method, apparatuses, and non-transitory computer-readable medium described herein may further include operations, features, means, or instructions for determining a minimum offset between the DL radio frame timing structure and the UL radio frame timing structure, where the TA may be determined based on the minimum offset. Some examples of the method, apparatuses, and non-transitory computer-readable medium described herein may further include operations, features, means, or instructions for determining an initial TA based on the minimum offset, and transmitting a physical random access channel (PRACH) message based on the initial TA. In some examples of the method, apparatuses, and non-transitory computer-readable medium described herein, the scheduling offset is based on an NTN.

A method of wireless communication at a base station is described. The method may include transmitting, to the UE, an indication of a scheduling offset between a DL radio frame timing structure and an UL radio frame timing structure, and receiving an UL message from the UE based on a range of TA values, the range of TA values based on the scheduling offset.

An apparatus for wireless communication at a base station is described. The apparatus may include a processor and memory coupled to the processor. The processor and memory may be configured to transmit, to the UE, an indication of a scheduling offset between a DL radio frame timing structure and an UL radio frame timing structure, and receive an UL message from the UE based on a range of TA values, the range of TA values based on the scheduling offset.

Another apparatus for wireless communication at a base station is described. The apparatus may include means for transmitting, to the UE, an indication of a scheduling offset between a DL radio frame timing structure and an UL radio frame timing structure, and receiving an UL message from the UE based on a range of TA values, the range of TA values based on the scheduling offset.

A non-transitory computer-readable medium storing code for wireless communication at a base station is described. The code may include instructions executable by a processor to transmit, to the UE, an indication of a scheduling offset between a DL radio frame timing structure and an UL radio frame timing structure, and receive an UL message from the UE based on a range of TA values, the range of TA values based on the scheduling offset.

Some examples of the method, apparatuses, and non-transitory computer-readable medium described herein may further include operations, features, means, or instructions for determining the range of TA values based on the scheduling offset, where the UL message may be received from the UE based on the range. Some examples of the method, apparatuses, and non-transitory computer-readable medium described herein may further include operations, features, means, or instructions for determining an orbit type associated with the base station, where the range may be determined based on the orbit type.

Some examples of the method, apparatuses, and non-transitory computer-readable medium described herein may further include operations, features, means, or instructions for determining a TA threshold, where a TA may be determined based on the TA threshold. In some examples of the method, apparatuses, and non-transitory computer-readable medium described herein, the TA threshold may be determined based on one or more of a slot duration, a radio frame numerology, and a buffering capability of the UE. Some examples of the method, apparatuses, and non-transitory computer-readable medium described herein may further include operations, features, means, or instructions for determining a common offset associated with a cell served by the base station, and transmitting an indication of the common offset to the UE, where the UL message may be received from the UE based on the common offset.

Some examples of the method, apparatuses, and non-transitory computer-readable medium described herein may further include operations, features, means, or instructions for determining a network offset between a network DL radio frame timing structure and a network UL radio frame timing structure, where the UL message may be received from the UE based on the network offset. Some examples of the method, apparatuses, and non-transitory computer-readable medium described herein may further include operations, features, means, or instructions for transmitting an indication of the network offset to the UE.

Some examples of the method, apparatuses, and non-transitory computer-readable medium described herein may further include operations, features, means, or instructions for determining a minimum offset between the DL radio frame timing structure and the UL radio frame timing structure, where a TA may be determined based on the minimum offset. Some examples of the method, apparatuses, and non-transitory computer-readable medium described herein may further include operations, features, means, or instructions for determining an initial TA based on the minimum offset, and receiving a PRACH message from the UE based on the initial TA. In some examples of the method, apparatuses, and non-transitory computer-readable medium described herein, the scheduling offset is based on an NTN.

A method of wireless communication at a UE is described. The method may include receiving, from a base station, a random access response message including a fractional TA, and transmitting, to the base station in response to the random access response message, a second random access message including a differential offset between a first slot boundary associated with a base station radio frame timing structure and a second slot boundary associated with a UE radio frame timing structure.

An apparatus for wireless communication at a UE is described. The apparatus may include a processor and memory coupled to the processor. The processor and memory may be configured to receive, from a base station, a random access response message including a fractional TA, and transmit, to the base station in response to the random access response message, a second random access message including a differential offset between a first slot boundary associated with a base station radio frame timing structure and a second slot boundary associated with a UE radio frame timing structure.

Another apparatus for wireless communication at a UE is described. The apparatus may include means for receiving, from a base station, a random access response message including a fractional TA, and transmitting, to the base station in response to the random access response message, a second random access message including a differential offset between a first slot boundary associated with a base station radio frame timing structure and a second slot boundary associated with a UE radio frame timing structure.

A non-transitory computer-readable medium storing code for wireless communication at a UE is described. The code may include instructions executable by a processor to receive, from a base station, a random access response message including a fractional TA, and transmit, to the base station in response to the random access response message, a second random access message including a differential offset between a first slot boundary associated with a base station radio frame timing structure and a second slot boundary associated with a UE radio frame timing structure.

Some examples of the method, apparatuses, and non-transitory computer-readable medium described herein may further include operations, features, means, or instructions for determining a RTT for communications with a base station, and transmitting a first random access message to the base station based on the RTT, where the random access response message may be received based on transmitting the first random access message. Some examples of the method, apparatuses, and non-transitory computer-readable medium described herein may further include operations, features, means, or instructions for determining a scrambling sequence, a hopping pattern, or both based on the RTT.

Some examples of the method, apparatuses, and non-transitory computer-readable medium described herein may further include operations, features, means, or instructions for determining a TA based on the differential offset, and transmitting an UL message to the base station based on the TA. Some examples of the method, apparatuses, and non-transitory computer-readable medium described herein may further include operations, features, means, or instructions for receiving, from the base station, an indication to shift the UE radio frame timing structure, and shifting the UE radio frame timing structure based on the indication, where the TA may be determined based on the shifting. In some examples of the method, apparatuses, and non-transitory computer-readable medium described herein, the differential offset may be determined based on the fractional TA. In some examples of the method, apparatuses, and non-transitory computer-readable medium described herein, the base station is associated with an NTN.

A method of wireless communication at a UE is described. The method may include receiving, from a base station, an indication of a scheduling offset between a UL radio frame timing structure and an UL radio frame timing structure, determining an RTT for communications with the base station, determining a TA based on the scheduling offset and the RTT, and transmitting an UL message to the base station based on the TA.

An apparatus for wireless communication at a UE is described. The apparatus may include a processor, memory coupled with the processor, and instructions stored in the memory. The instructions may be executable by the processor to cause the apparatus to receive, from a base station, an indication of a scheduling offset between a UL radio frame timing structure and an UL radio frame timing structure, determine an RTT for communications with the base station, determine a TA based on the scheduling offset and the RTT, and transmit an UL message to the base station based on the TA.

Another apparatus for wireless communication at a UE is described. The apparatus may include means for receiving, from a base station, an indication of a scheduling offset between a UL radio frame timing structure and an UL radio frame timing structure, determining an RTT for communications with the base station, determining a TA based on the scheduling offset and the RTT, and transmitting an UL message to the base station based on the TA.

A non-transitory computer-readable medium storing code for wireless communication at a UE is described. The code may include instructions executable by a processor to receive, from a base station, an indication of a scheduling offset between a UL radio frame timing structure and an UL radio frame timing structure, determine an RTT for communications with the base station, determine a TA based on the scheduling offset and the RTT, and transmit an UL message to the base station based on the TA.

Some examples of the method, apparatuses, and non-transitory computer-readable medium described herein may further include operations, features, means, or instructions for determining a range of TA values based on the scheduling offset, where the TA may be determined based on the range. Some examples of the method, apparatuses, and non-transitory computer-readable medium described herein may further include operations, features, means, or instructions for determining an orbit type associated with the base station, where the range may be determined based on the orbit type.

Some examples of the method, apparatuses, and non-transitory computer-readable medium described herein may further include operations, features, means, or instructions for determining a TA threshold, where the TA may be determined based on the TA threshold. In some examples of the method, apparatuses, and non-transitory computer-readable medium described herein, the TA threshold may be determined based on one or more of a slot duration, a radio frame numerology, and a buffering capability of the UE. Some examples of the method, apparatuses, and non-transitory computer-readable medium described herein may further include operations, features, means, or instructions for receiving an indication of a common offset associated with a cell served by the base station, where the TA may be determined based on the common offset.

Some examples of the method, apparatuses, and non-transitory computer-readable medium described herein may further include operations, features, means, or instructions for determining a range of TA values based on the common offset, where the TA may be determined based on the range. In some examples of the method, apparatuses, and non-transitory computer-readable medium described herein, the RTT for communications with the base station may be determined based on one or more of a position of the UE, a position of the base station, a distance between the UE and the base station, a timestamp corresponding to a UL message received from the base station, and a local timestamp.

Some examples of the method, apparatuses, and non-transitory computer-readable medium described herein may further include operations, features, means, or instructions for determining a network offset between a network UL radio frame timing structure and a network UL radio frame timing structure, where the TA may be determined based on the network offset. Some examples of the method, apparatuses, and non-transitory computer-readable medium described herein may further include operations, features, means, or instructions for determining a range of TA values based on the network offset, where the TA may be determined based on the range. Some examples of the method, apparatuses, and non-transitory computer-readable medium described herein may further include operations, features, means, or instructions for receiving an indication of the network offset, where the network offset may be determined based on the indication of the network offset.

Some examples of the method, apparatuses, and non-transitory computer-readable medium described herein may further include operations, features, means, or instructions for determining a minimum offset between the UL radio frame timing structure and the UL radio frame timing structure, where the TA may be determined based on the minimum offset. Some examples of the method, apparatuses, and non-transitory computer-readable medium described herein may further include operations, features, means, or instructions for determining an initial TA based on the minimum offset, and transmitting a PRACH message based on the initial TA. In some examples of the method, apparatuses, and non-transitory computer-readable medium described herein, the scheduling offset is based on an NTN.

A method of wireless communication at a base station is described. The method may include determining a minimum RTT for communications with a UE, transmitting, to the UE, an indication of a scheduling offset between a UL radio frame timing structure and an UL radio frame timing structure, and receiving an UL message from the UE based on the scheduling offset.

An apparatus for wireless communication at a base station is described. The apparatus may include a processor, memory coupled with the processor, and instructions stored in the memory. The instructions may be executable by the processor to cause the apparatus to determine a minimum RTT for communications with a UE, transmit, to the UE, an indication of a scheduling offset between a UL radio frame timing structure and an UL radio frame timing structure, and receive an UL message from the UE based on the scheduling offset.

Another apparatus for wireless communication at a base station is described. The apparatus may include means for determining a minimum RTT for communications with a UE, transmitting, to the UE, an indication of a scheduling offset between a UL radio frame timing structure and an UL radio frame timing structure, and receiving an UL message from the UE based on the scheduling offset.

A non-transitory computer-readable medium storing code for wireless communication at a base station is described. The code may include instructions executable by a processor to determine a minimum RTT for communications with a UE, transmit, to the UE, an indication of a scheduling offset between a UL radio frame timing structure and an UL radio frame timing structure, and receive an UL message from the UE based on the scheduling offset.

Some examples of the method, apparatuses, and non-transitory computer-readable medium described herein may further include operations, features, means, or instructions for determining a range of TA values based on the scheduling offset, where the UL message may be received from the UE based on the range. Some examples of the method, apparatuses, and non-transitory computer-readable medium described herein may further include operations, features, means, or instructions for determining an orbit type associated with the base station, where the range may be determined based on the orbit type.

Some examples of the method, apparatuses, and non-transitory computer-readable medium described herein may further include operations, features, means, or instructions for determining a TA threshold, where the TA may be determined based on the TA threshold. In some examples of the method, apparatuses, and non-transitory computer-readable medium described herein, the TA threshold may be determined based on one or more of a slot duration, a radio frame numerology, and a buffering capability of the UE.

Some examples of the method, apparatuses, and non-transitory computer-readable medium described herein may further include operations, features, means, or instructions for determining a common offset associated with a cell served by the base station, and transmitting an indication of the common offset to the UE, where the UL message may be received from the UE based on the common offset.

Some examples of the method, apparatuses, and non-transitory computer-readable medium described herein may further include operations, features, means, or instructions for determining a network offset between a network UL radio frame timing structure and a network UL radio frame timing structure, where the UL message may be received from the UE based on the network offset. Some examples of the method, apparatuses, and non-transitory computer-readable medium described herein may further include operations, features, means, or instructions for transmitting an indication of the network offset to the UE.

Some examples of the method, apparatuses, and non-transitory computer-readable medium described herein may further include operations, features, means, or instructions for determining a minimum offset between the UL radio frame timing structure and the UL radio frame timing structure, where the TA may be determined based on the minimum offset. Some examples of the method, apparatuses, and non-transitory computer-readable medium described herein may further include operations, features, means, or instructions for determining an initial TA based on the minimum offset, and receiving a PRACH message from the UE based on the initial TA. In some examples of the method, apparatuses, and non-transitory computer-readable medium described herein, the scheduling offset is based on an NTN.

A method of wireless communication at a UE is described. The method may include receiving, from a base station, a random access response message including a fractional TA, determining, a differential offset between a first slot boundary associated with a base station radio frame timing structure and a second slot boundary associated with a UE radio frame timing structure, and transmitting, to the base station in response to the random access response message, a second random access message including the differential offset.

An apparatus for wireless communication at a UE is described. The apparatus may include a processor, memory coupled with the processor, and instructions stored in the memory. The instructions may be executable by the processor to cause the apparatus to receive, from a base station, a random access response message including a fractional TA, determine, a differential offset between a first slot boundary associated with a base station radio frame timing structure and a second slot boundary associated with a UE radio frame timing structure, and transmit, to the base station in response to the random access response message, a second random access message including the differential offset.

Another apparatus for wireless communication at a UE is described. The apparatus may include means for receiving, from a base station, a random access response message including a fractional TA, determining, a differential offset between a first slot boundary associated with a base station radio frame timing structure and a second slot boundary associated with a UE radio frame timing structure, and transmitting, to the base station in response to the random access response message, a second random access message including the differential offset.

A non-transitory computer-readable medium storing code for wireless communication at a UE is described. The code may include instructions executable by a processor to receive, from a base station, a random access response message including a fractional TA, determine, a differential offset between a first slot boundary associated with a base station radio frame timing structure and a second slot boundary associated with a UE radio frame timing structure, and transmit, to the base station in response to the random access response message, a second random access message including the differential offset.

Some examples of the method, apparatuses, and non-transitory computer-readable medium described herein may further include operations, features, means, or instructions for determining a RTT for communications with a base station, and transmitting a first random access message to the base station based on the RTT, where the random access response message may be received based on transmitting the first random access message. Some examples of the method, apparatuses, and non-transitory computer-readable medium described herein may further include operations, features, means, or instructions for determining a scrambling sequence, a hopping pattern, or both based on the RTT.

Some examples of the method, apparatuses, and non-transitory computer-readable medium described herein may further include operations, features, means, or instructions for determining a TA based on the differential offset, and transmitting an UL message to the base station based on the TA. Some examples of the method, apparatuses, and non-transitory computer-readable medium described herein may further include operations, features, means, or instructions for receiving, from the base station, an indication to shift the UE radio frame timing structure, and shifting the UE radio frame timing structure based on the indication, where the TA may be determined based on the shifting. In some examples of the method, apparatuses, and non-transitory computer-readable medium described herein, the differential offset may be determined based on the fractional TA. In some examples of the method, apparatuses, and non-transitory computer-readable medium described herein, the base station is associated with an NTN.

BRIEF DESCRIPTION OF THE DRAWINGS

FIGS. 3A and 3B illustrate examples of frame timing diagrams that support timing improvements for wireless communications systems in accordance with one or more aspects of the present disclosure.

DETAILED DESCRIPTION

Figure 1:
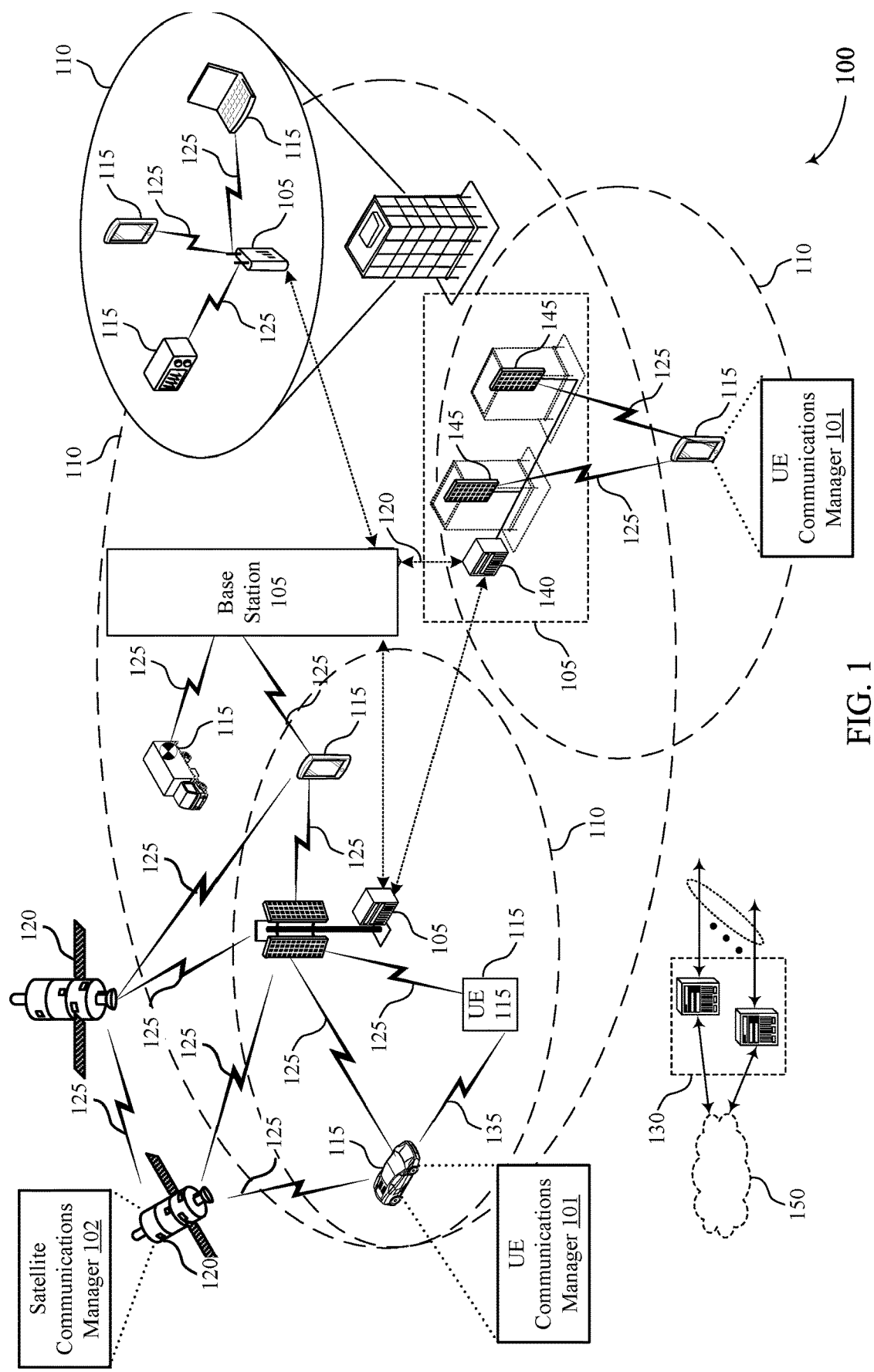
FIG. 1 illustrates an example of a system for wireless communications that supports timing improvements for wireless communications systems in accordance with one or more aspects of the present disclosure.

NTNs may provide coverage by using high-altitude vehicles between user terminals and gateways or base stations (e.g., next-generation NodeBs or giga-NodeBs (which may be referred to as a gNB, and also referred to as access stations or access gateways)). A gateway may, for example, transmit data to a satellite which may then be relayed to a user terminal or vice-versa. A high-altitude vehicle itself may be a base station, in some examples. A user terminal may be any device capable of transmitting signals to a satellite. Examples of a user terminal may include a UE, a relay equipment configured to relay a signal between a satellite and a user terminal, or a combination thereof. NTNs may involve the use of high altitude platform stations (HAPSs) and/or satellites to provide coverage for terrestrial base stations and UEs. The terms HAPS and satellite may be used interchangeably herein to refer to a remote NTN device that may provide coverage to one or more other high altitude or terrestrial devices. Likewise, the terms gateway and base station may be used interchangeably herein to refer to a network node that serves a UE and provides network access to the UE. In some cases, the base station (e.g., gNB) may be itself on the satellite, or the functionality of the base station may be split between the satellite and the gateway (e.g., the satellite may be a distributed unit (DU) and the gateway a central unit (CU), or other architectures). One or more aspects of the techniques described herein may be applicable in scenarios where the gNB is on the gateway, the satellite, or split among gateway and satellite.

The gateway and the satellite may be thousands of kilometers apart and it may take some time for electromagnetic waves to propagate over the distance between the gateway and the satellite and between the satellite and the user terminal. Thus, the propagation delay for NTNs may be many orders of magnitude larger than the propagation delay for terrestrial networks. As such, the round trip delay (RTD), or sometimes referred to as an RTT) associated with a signal may also be orders of magnitude larger for NTNs than for terrestrial networks. Further, due to the high mobility of high-altitude vehicles such as non-geostationary satellites, communications with the non-geostationary satellites may promote large and time-varying RTDs. These variations in RTD may affect user terminals to experience variation in UL timing and frequency synchronization with satellites. As demand for communication efficiency increases, it may be desirable for wireless communications systems to support a techniques for estimating and determining UL timing (e.g., including DL and UL radio frame timing structures, UL transmission timing, etc.) that accounts for RTD as well as variation in RTD.

According to the techniques described herein, a satellite and/or served UEs may account for UE-specific propagation delay and propagation delay variation between UEs and the satellite such that UL transmissions may be either synchronized at the UEs (e.g., synchronized with a nearest slot boundary) or synchronized at the satellite and/or gateway (e.g., synchronized at the network). For example, an NTN may establish (e.g., via preconfigured network specification, via signaling, such as system information block (SIB) signaling, etc.) UL and DL radio frame timing structures to efficiently account for propagation delay and propagation delay variation associated with communications in the NTN. For instance, UL and DL radio frame timing structures at the UE and at the satellite may be offset to account for propagation delay and propagation delay variation. As described herein, a scheduling offset ($K_{offset}$) between a UE's UL and DL radio frame timing structure may be based on a worst case RTT within the NTN ($K_{offset}=RTT_{WorstCase}$) or a difference between the worst case RTT and the best case RTT within the NTN ($K_{offset}=RTT_{WorstCase}-RTT_{BestCase}$).

In examples where, UL transmissions are synchronized at the UEs (e.g., synchronized with a nearest slot boundary), $K_{offset}=0$ and the network may account for different UE offsets at the network based on the propagation delay variation between UEs. In such examples, the techniques described herein may provide for improved random access channel (RACH) procedures (e.g., to account for UEs following their own timing when the satellite is unaware of UE location before RACH procedures). For instance, a UE may include a differential offset (e.g., between a first slot boundary associated with a satellite radio frame timing structure and a second slot boundary associated with a UE radio frame timing structure) in a RACH Msg3 to the satellite. In some cases, the satellite may use the differential offset to determine UE timing for subsequent UL communications. In some cases, the UE may determine the differential offset based on a fractional TA value sent to the UE in a random access response (RAR) during the RACH procedure prior to transmitting the RACH Msg3 including the determined differential offset.

Further, UEs may determine TA values to be applied to UL transmissions based on their respective scheduling offset ($K_{offset}$), as well as based on propagation delay or RTT. As such, in some cases, served UEs may determine UL timing such that UL transmissions from the UEs to a satellite arrive at the satellite in a time synchronized manner (e.g., such that communications from two or more UEs scheduled in a same DL time slot arrive at a same corresponding UL time slot from the perspective of the satellite). According to various examples described herein, the UE may apply a TA (e.g., to determine UL timing) that is based on the UE radio frame timing structure in addition to estimated propagation delay (e.g., a UE-specific RTT), propagation delay variation between served UEs and the satellite (e.g., differential offset), etc. In some cases, the serving gateway may provide information related to RTD, information related to variation in RTD across UEs of the NTN, or both, to assist the UE in determining UL timing. In other examples, a satellite (e.g., or a gateway, the network, etc.) may determine UL timing, based on reception timing, such that UL transmissions from the various UEs may be transmitted uniformly (e.g., according to a same offset, according to a same radio frame timing structure at the UEs, etc.).

The described techniques may support reliable NTN timing alignment of communications between a base station or satellite and one or more UEs served by the base station or satellite. For instance, the described techniques may provide for reliable (e.g., improved) estimation of timing offsets, and reliable estimation of TA values for UL, etc. relating to communications between high-altitude vehicles (e.g., satellites or other non-terrestrial-based equipment), user terminals, and gateways, in NTNs. As such, supported techniques may include features for efficient NTNs and efficient non-terrestrial communications. The described techniques may also support increased spectral efficiency and, in some examples, may promote higher mobility support for user terminals in NTNs compared to terrestrial networks.

Aspects of the disclosure are initially described in the context of example wireless communications systems. Aspects of the disclosure are also illustrated by example frame timing diagrams and example process flow diagrams. Aspects of the disclosure are further illustrated by and described with reference to apparatus diagrams, system diagrams, and flowcharts that relate to timing improvements for wireless communications systems.

FIG. 1 illustrates an example of a wireless communications system 100 that supports timing improvements for wireless communications systems in accordance with one or more aspects of the present disclosure. The wireless communications system 100 may include one or more base stations 105, one or more UEs 115, and a core network 130. In some examples, the wireless communications system 100 may be an NTN, an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The described techniques relate to improved methods, systems, devices, and apparatuses that support timing improvements for wireless communications systems. Generally, the described techniques provide for timing relationships amongst devices (e.g., UEs 115 and satellites 120) communicating via an NTN. For example, the techniques described herein may be implemented to manage (e.g., synchronize) radio frame timing structures of base stations 105 (e.g., satellites 120) and UEs 115 in an NTN. Relatively large differences in round-trip delays or propagation delays associated with communications from various UEs 115 in an NTN may result in large offsets between DL and UL frame timing of such UEs 115. According to the techniques described herein, timing enhancements may be employed by an NTN to account for such large offsets between frame timing of different UEs 115 within the NTN.

Generally, timing may be aligned at either the base station (e.g., the satellite 120) or at the UEs 115 served by the base station 105 or satellite 120. In cases where timing is aligned at the base station 105 or satellite 120, UEs 115 served by the base station 105 or satellite 120 may apply various advances to UL transmissions (e.g., based on UE 115 proximity to the satellite 120, RTD corresponding to communications associated with the UE 115, etc.) such that UL transmissions may be aligned at the receiving base station 105 or satellite 120. For example, an NTN (e.g., wireless communications system 100) may establish (e.g., via preconfigured network specification, via signaling, such as SIB signaling, etc.) UL and DL radio frame timing structures to efficiently account for propagation delay and propagation delay variation associated with communications in the NTN. In cases where timing is aligned at the UEs 115, UEs 115 of an NTN may transmit UL transmissions uniformly (e.g., radio frame timing structures may be uniform across served UEs) and the base station 105 or satellite 120 may account for variations in reception timing (e.g., based on varying differences in RTDs corresponding to communications associated with the served UEs 115).

Further, UEs 115 may determine TA values to be applied to UL transmissions based on their respective UL and DL radio frame timing structure, as well as based on propagation delay, propagation delay variation, etc. As such, in some cases, served UEs 115 may determine UL timing such that UL transmissions from the UEs 115 to a satellite 120 arrive at the satellite 120 in a time synchronized manner (e.g., such that communications from two or more UEs 115 scheduled in a same DL time slot arrive at a same corresponding UL time slot from the perspective of the satellite 120). According to various examples, the UE 115 may apply a TA, to determine the UL timing, that is based on the UE 115 radio frame timing structure in addition to estimated propagation delay (e.g., a UE-specific RTT), propagation delay variation between served UEs 115 and the satellite 120 (e.g., differential offset), etc. In some cases, the serving gateway (e.g., a base station 105) may provide information related to RTD, information related to variation in RTD across UEs 115 of the NTN, or both, to assist the UE 115 in determining UL timing. In other examples, a satellite 120 (e.g., or a gateway, the network, etc.) may determine UL timing, based on reception timing, such that UL transmissions from the various UEs 115 may be transmitted uniformly (e.g., according to a same offset, according to a same radio frame timing structure at the UEs 115, etc.).

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple DL component carriers and one or more UL component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and Ns may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a DL carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include DL transmissions, UL transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical)

communications, low latency communications, or communications with low-cost and low-complexity devices.

Wireless communications system 100 may also include one or more satellites 120. Satellite 120 may communicate with base stations 105 (also referred to as gateways in NTNs) and UEs 115 (or other high altitude or terrestrial communications devices). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit (LEO) or a medium earth orbit (MEO). A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of an NTN. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from UL frequencies to DL frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

UEs 115 may communicate with satellites 120 and/or base stations or gateways 105 using communications links 125. In some cases, timing adjustments to account for propagation delay communications links 125 via a satellite 120 may include a propagation delay between a UE 115 and a satellite 120, a propagation delay between a base station 105 and a satellite 120, as well as a variation in the propagation delays due to movement of the satellite. In accordance with various techniques discussed herein, radio frame timing structures for UL and DL communications (e.g., offsets between a DL radio frame timing structure and an UL radio frame timing structure of the UE 115, offsets between satellite 120 radio frame timing structure and UE 115 radio frame timing structure, etc.) may provide for efficient communications in NTN (e.g., via efficient accounting for large propagation delays or RTTs, large variation in propagation delays or RTTs between different UEs 115 in an NTN, etc.). Further, a UE 115 may account for variation in propagation delay, in addition to determined propagation delay itself, when determining an UL timing for UL communications via a satellite 120.

For example, generally, the described techniques provide for timing relationships amongst devices (e.g., UEs 115 and satellites 120) communicating via an NTN (e.g., via wireless communications system 100). One or more aspects of the described techniques may be implemented to manage (e.g., synchronize) radio frame timing structures of base stations 105, satellites 105, and UEs 115 in an NTN, such as in wireless communications system 100. Relatively large differences in round-trip delays or propagation delays associated with communications from various UEs 115 in an NTN may result in large offsets between DL and UL frame timing of such UEs 115. According to the techniques described herein, timing enhancements may be employed by an NTN to account for such large offsets between frame timing of different UEs 115 within the NTN.

The discussed techniques may be described with reference to satellite timing, however one or more aspects of such techniques may be applied to gateway timing (e.g., base station 105 timing) by analogy without departing from the scope of the present disclosure. Generally, the described techniques (e.g., radio frame timing structures, radio frame timing structure offsets, UL transmission timing, TA determination, TA application, etc.) may be applicable to UE 115 and satellite 120 communications, UE 115 and base station 105 communications, base station 105 and satellite 120 communications, etc.

NTNs (e.g., such as wireless communications system 100) may establish (e.g., via preconfigured network specification, via signaling, such as SIB signaling, etc.) UL and DL radio frame timing structures to efficiently account for propagation delay and propagation delay variation associated with communications in the NTN. In cases where timing is aligned at the UEs 115 (e.g., when $K_{offset}=0$), UEs 115 of the NTN may transmit UL transmissions uniformly (e.g., each UE 115 may have a same offset between DL radio frame timing structure and an UL radio frame timing structure) and the base station 105 or satellite 120 may account for variations in reception timing (e.g., based on varying differences in RTDs or RTTs corresponding to communications associated with the served UEs 115).

Further, UEs 115 may determine TA values to be applied to UL transmissions based on their respective scheduling offset ($K_{offset}$), as well as based on propagation delay or RTT (e.g., which may be determined by the UE 115 or indicated via satellite 120 signaling). As such, in some cases, served UEs 115 may determine UL timing such that UL transmissions from the UEs 115 to a satellite 120 arrives at the satellite 120 in a time synchronized manner (e.g., such that communications from two or more UEs 115 scheduled in a same DL time slot arrive at a same corresponding UL time slot from the perspective of the satellite 120). According to various examples, UEs 115 may apply a TA and/or determine timing of UL transmissions based on the estimated propagation delay (e.g., a UE-specific RTT), propagation delay variation between served UEs 115 and the satellite 120 (e.g., differential offset), etc. In some cases, the serving gateway may provide information related to RTD, variation in RTD, or both, to assist a UE 115 in determining UL timing. In other examples, a satellite 120 (e.g., or a base station 105, a gateway, the network, etc.) may determine UL timing, based on reception timing, such that UL transmissions from the various UEs 115 may be transmitted uniformly (e.g., according to a same offset, according to a same radio frame timing structure at the UE, etc.).

A UE 115 may include a UE communications manager 101 (e.g., which may be examples of a communications manager 1015 described herein). The UE communications manager 101 may receive, from a base station 105 or a satellite 120, an indication of a scheduling offset between a DL radio frame timing structure and an UL radio frame timing structure. The UE communications manager 101 may determine an RTT for communications with the base station 105 or the satellite 120, and the UE communications manager 101 may then determine a TA based on the scheduling offset and the RTT. The UE communications manager 101 may transmit an UL message to the base station 105 or the satellite 120 based on the TA.

In some examples, the UE communications manager 101 may receive, from a base station 105 or a satellite 120, a random access response message including a fractional TA and the UE communications manager 101 may determine a differential offset between a first slot boundary associated with a base station/satellite radio frame timing structure and a second slot boundary associated with the UE 115 radio frame timing structure. The UE communications manager 101 may transmit, to the base station 105 or the satellite 120 in response to the random access response message, a second random access message including the differential offset.

A satellite 120 (e.g., or in some examples a base station 105) may include a satellite communications manager 102 (e.g., which may be examples of a communications manager 1415 described herein). The satellite communications manager 102 may determine a minimum RTT for communications with a UE 115. The satellite communications manager 102 may transmit, to the UE 115, an indication of a scheduling offset between a DL radio frame timing structure and an UL radio frame timing structure. The satellite communications manager 102 receive an UL message from the UE 115 based on the scheduling offset.

Figure 2:
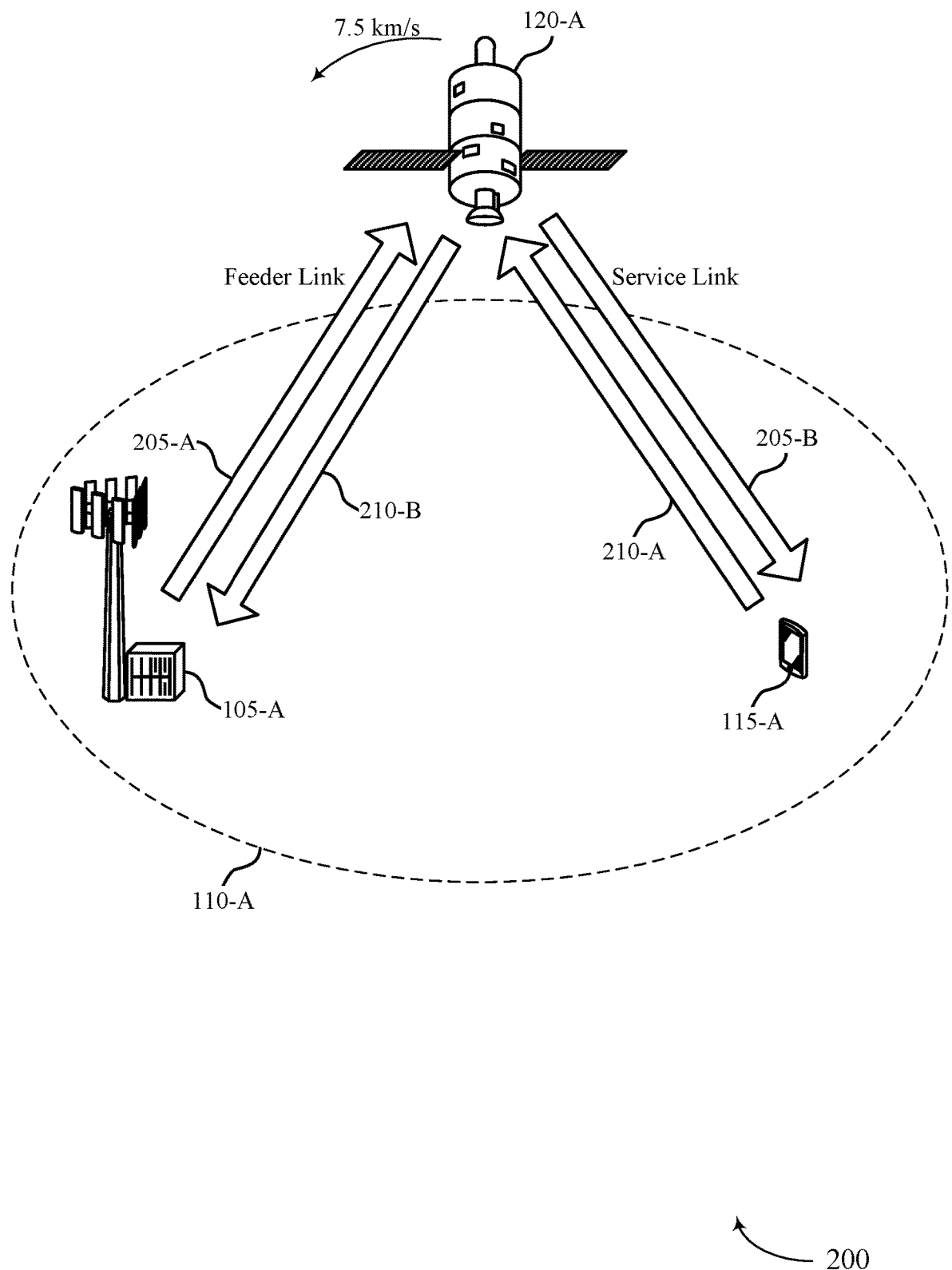
FIG. 2 illustrates an example of a wireless communications system that supports timing improvements for wireless communications systems in accordance with one or more aspects of the present disclosure.

FIG. 2 illustrates an example of a wireless communications system 200 that supports timing improvements for wireless communications systems in accordance with one or more aspects of the present disclosure. In some examples, wireless communications system 200 may implement aspects of wireless communications system 100. Wireless communications system 200 may include a gateway such as base station 105-*a*, a UE 115-*a*, and a satellite 120-*a* (e.g., which in some cases may also be referred to as a base station 105), which may be examples of a base station 105, UEs 115, and satellites 120 as described with reference to FIG. 1. The gateway 105-*a* may serve a coverage area 110-*a* in cases of a terrestrial network, and the satellite 120-*a* may serve coverage area 110-*a* in cases of an NTN.

In some examples, the satellite 120-*a* may relay communications between the gateway (e.g., base station 105-*a*) and the UE 115-*a*. For example, the gateway or base station 105-*a* may communicate with the UE 115-*a* via the satellite 120-*a* or vice-versa. In some examples, for communications originating at the gateway 105-*a* and going to the UE 115-*a*, the gateway 105-*a* may transmit an UL transmission 205-*a* to the satellite 120-*a*, which in some cases may be referred to as a feeder link. The satellite 120-*a* may relay the UL transmission 205-*a* as a DL transmission 205-*b* to the UE 115-*a*, which in some cases may be referred to as a service link. In other examples, for communications originating at the UE 115-*a* and going to the gateway 105-*a*, the UE 115-*a* may transmit an UL transmission 210-*a* to the satellite 120-*a* via service link. The satellite 120-*a* may relay the UL transmission 210-*a* as a DL transmission 210-*b* to gateway 105-*b* via the feeder link.

The gateway 105-*a* and the satellite 120-*a* may be thousands of kilometers apart and it may take some time for electromagnetic waves to propagate over the distance between the gateway 105-*a* and the satellite 120-*a* and between the satellite 120-*a* and the UE 115-*a*. The propagation delay for NTNs may be many orders of magnitude larger than the propagation delay for terrestrial networks. As such, the RTD (e.g., communication delay due to RTT associated with signal propagation) associated with a transmission may also be orders of magnitude larger for NTNs than for terrestrial networks. In addition, high speeds of non-geostationary satellites, for example, such as the satellite 120-*a* may promote variation in RTD. As a result, the UE 115-*a* may experience variation in UL timing synchronization with the satellite 120-*a*. Likewise, the gateway 105-*a* may experience variation in UL and DL timing synchronization with the satellite 120-*a*. Thus, in some examples, a total propagation delay may be comprised of a first portion of the propagation delay and a first propagation delay variation for the UE-to-satellite link, and a second portion of the propagation delay and a second propagation delay variation for the satellite-to-gateway link. In some cases, RTD information includes a satellite-to-gateway propagation delay, and where the UE determines a UE-to-satellite propagation delay for use in an initial access procedure, and where the propagation delay variation is determined subsequent to the initial access procedure.

By way of example, the satellite 120-*a* may be in an orbit, such as LEO, MEO, or geostationary earth orbit. In any of these examples, the satellite 120-*a* may be many thousands of kilometers from earth, and therefore may be thousands of kilometers from the gateway 105-*a* and the UE 115-*a*. Each transmission 205 or 210 between the gateway 105-*a* and the UE 115-*a* may therefore travel from earth the distance to the satellite 120-*a* and back to earth. The distance that a transmission travels may increase the propagation delay of a transmission or RTD associated with the transmission. The propagation delay may refer to a duration it takes for a signal to travel from its source to its intended recipient. The RTD may refer to a duration (e.g., a RTT) it takes for a transmission to be transmitted from a source to its intended recipient, processed by the intended recipient, and a response transmitted from the intended recipient of the transmission back to the source.

The UE 115-*a* may support a closed-loop timing control to maintain an UL timing synchronization (or UL timing accuracy) with the satellite 120-*a*, or with the gateway 105-*a*. The UE 115-*a*, in some examples, may rely on network signaled RTD information or a RTD variation rate (of a beam center of the satellite 120-*a*) when the UE 115-*a* is unable to determine its geolocation within the geographic coverage area 110-*a*. When the satellite 120-*a* is in a low-earth orbit, the satellite 120-*a* may be between 600 km to 2000 km from earth and travelling at a rate of 7.5 km/s. In the example of a LEO location of the satellite 120-*a*, for example, such as a 1200 km orbit from earth with an elevation angle of 30° the RTD variation rate may be on the order of 35 microseconds (μs) per second (s) (μs/s).

In order to provide synchronized UL and DL timing at the gateway 105-*a*, communications to and from the gateway 105-*a* may be made according to a gateway 105-*a* timing reference. In order to provide synchronized UL and DL timing at the satellite 120-*a*, communications to and from the satellite 120-*a* may be made according to a satellite 120-*a* timing reference. In order to provide synchronized UL and DL timing at the UE 115-*a*, communications to and from the satellite UE 115-*a* may be made according to a UE 115-*a* timing reference. In some examples, the described techniques may provide for efficient synchronization of UL and DL timing at the satellite 120-*a* (e.g., via implementation of a scheduling offset $K_{offset}$). In other examples, the described techniques may provide for efficient synchronization of UL and DL timing at the satellite 120-*a* (e.g., where $K_{offset}=0$). Generally, the described techniques may be applied for synchronized UL and DL timing at the gateway 105-*a* (e.g., where techniques for UL communications from UE 115-*a* may be applicable to DL communications from satellite 120-*a* to gateway 105-*a*, by analogy, without departing from the scope of the present disclosure).

For instance, in cases where UL and DL timing is synchronized at the gateway 105-*a*, the UE 115-*a* may adjust a timing of UL communications to the gateway 105-*a* such that the UL communications are transmitted far enough in advance of a timing boundary or frame boundary at the gateway 105-*a* to have a time of arrival at the gateway 105-*a* that corresponds to the timing boundary or frame boundary. In other cases, the UE 115-*a* may use a satellite 120-*a* timing reference for UL communications, to provide that UL communications are received at the satellite 120-*a* at a desired time or frame boundary. In either case, the satellite 120-*a* may have a sufficient propagation delay variation that the UE 115-*a* UL timing may be based on the propagation delay and the propagation delay variation.

Figure 5:
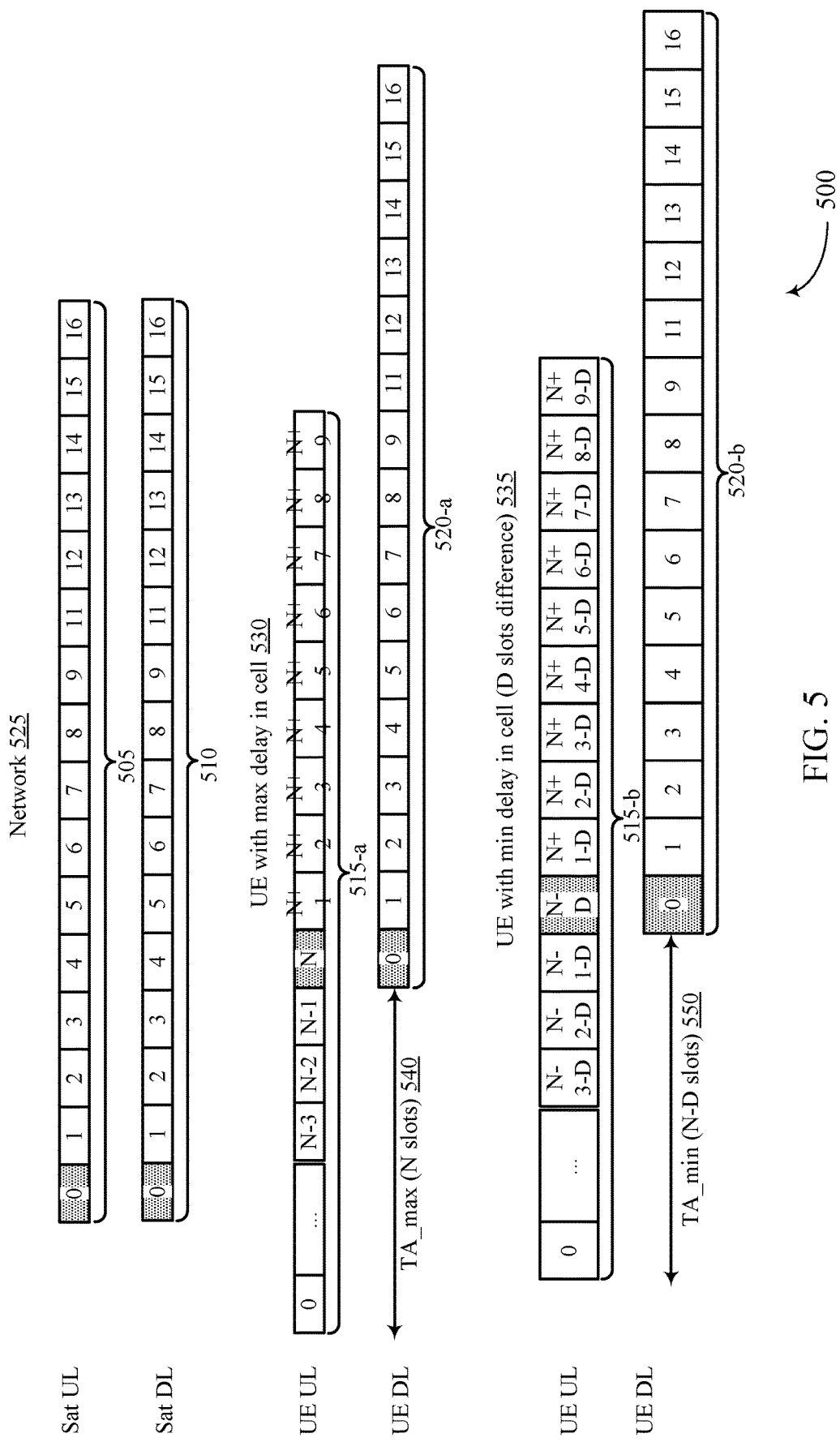
FIG. 5 illustrates an example of a frame timing diagram that supports timing improvements for wireless communications systems in accordance with one or more aspects of the present disclosure.
Figure 6:
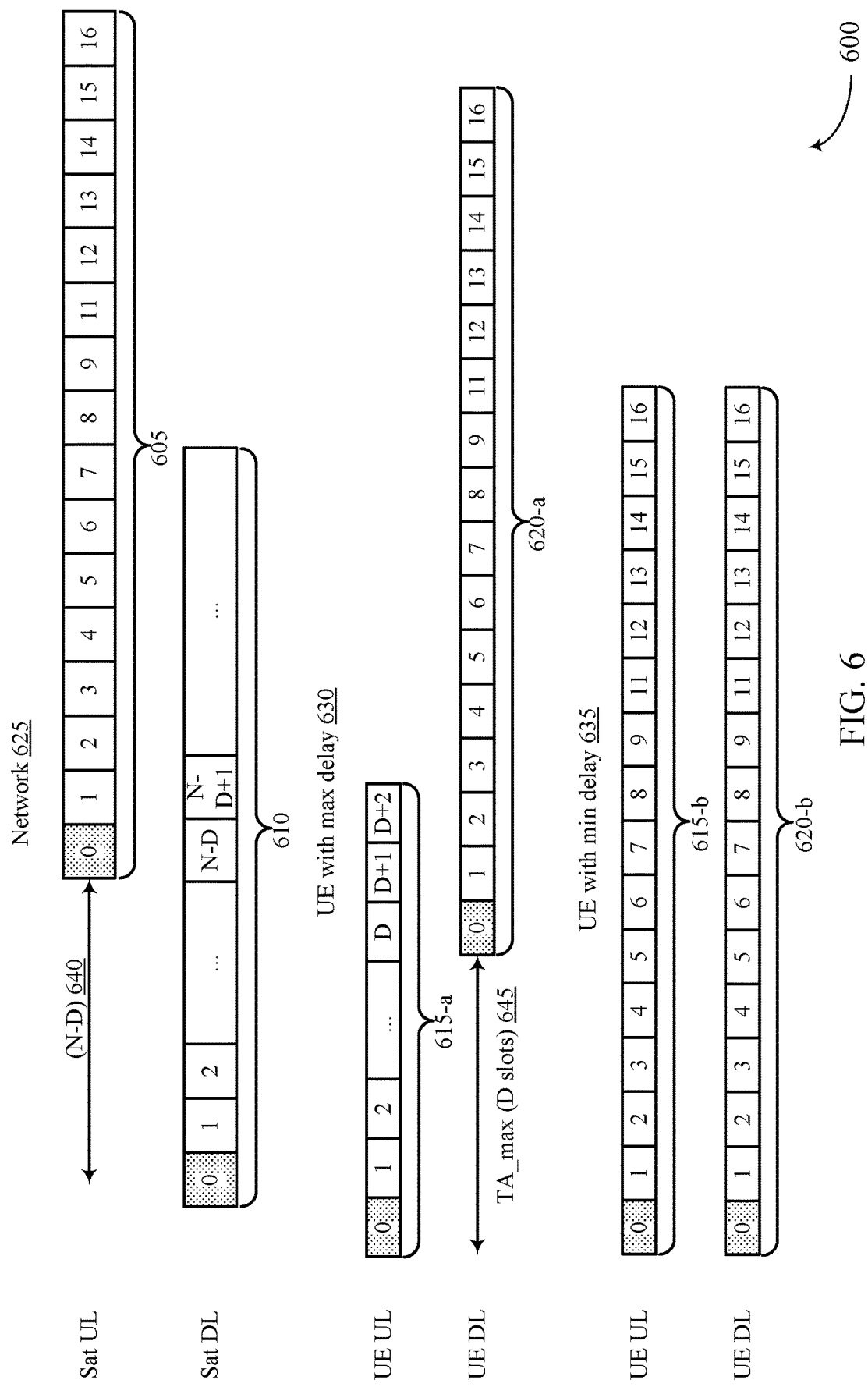
FIG. 6 illustrates an example of a frame timing diagram that supports timing improvements for wireless communications systems in accordance with one or more aspects of the present disclosure.

FIGS. 5 and 6 may illustrate an example of a satellite 120-*a* timing reference in accordance with various aspects of the disclosure, with the understanding that such relative timing references may be applied in cases where the gateway 105-*a* timing reference is used for determination of UL transmission timing. Further, FIG. 7 may illustrate an example of a UE 115-*a* timing reference in accordance with various aspects of the disclosure, with the understanding that aspects of such techniques may be applied at a satellite 120-*a* for reception of UL communication from UE 115-*a* or at a gateway 105-*a* for reception of DL communication from satellite 120-*a*.

Generally, considering UEs with global navigation satellite system (GNSS) and without GNSS, the UE may identify or determine (e.g., either via explicit signaling, via network specification or preconfiguration, or via derivation from other parameters) one or more of a minimum offset (M), a scheduling slot offset (S), and a portion of the offset that is captured at the network side (P). For implementing radio frame timing structures analogous to example frame timing diagram 500 (e.g., where timing is fully aligned at the network), M=N–D, S=N, and P=0. For implementing radio frame timing structures analogous to example frame timing diagram 600 (e.g., where timing is aligned with an offset, such as with a common offset N–D), M=N–D, S=D, and P=N–D. In some cases, a minimum offset may be implemented for UEs without GNSS for initial TA for PRACH.

In some cases, relationships between M, S, and P (as well as the TA) may be limited by wireless communications systems (e.g., by NTNs). For example, wireless communications systems (e.g., UEs and radio frame timing structures in an NTN) may adhere to S+P–M<z, where z may be specified or preconfigured by the network, where z may depend on deployment, etc. (e.g., which may limit buffering at the UE, for instance, by limiting the max time between receiving a DL control information (DCI) and transmitting PUSCH). Additionally or alternatively, wireless communications systems (e.g., UEs and radio frame timing structures in an NTN) may adhere to M–P<TA<M–P+y, where y may be specified or preconfigured by the network, where y may depend on deployment, etc. (e.g., which may limit the range of TA at the UE).

FIG. 3A and FIG. 3B illustrate example frame timing diagram 300 and example frame timing diagram 301, respectively, that each support timing improvements for wireless communications systems in accordance with one or more aspects of the present disclosure. In some examples, frame timing diagram 300 and/or frame timing diagram 301 may implement aspects of wireless communications system 100 and/or wireless communications system 200. For example, frame timing diagram 300 and/or frame timing diagram 301 may be based on a configuration by a gateway 105 (or a satellite 120), and implemented by a UE 115 for estimating and determining UL timing (or implemented by a satellite 120 for estimating and determining DL timing) in an NTN, as described with reference to FIGS. 1 and 2. Generally, FIG. 3A and FIG. 3B may illustrate one or more aspects that may allow frameworks (e.g., NTNs) to define timing relationships at a base station (e.g., a gNB, which may refer to a gateway and/or a satellite) and a UE.

In the example frame timing diagrams illustrated by FIGS. 3A, 3B, 4, 5, 6, and 7, gNB timing may illustrate one or more aspects of a radio frame timing structure for a gateway or satellite. For example, gNB DL 305 timing may illustrate one or more aspects of a DL radio frame timing structure for a gateway or satellite, and gNB UL 320 timing may illustrate one or more aspects of an UL radio frame timing structure for a gateway or satellite. Further, UE timing may illustrate one or more aspects of a radio frame timing structure for a UE. For example, UE DL 310 timing may illustrate one or more aspects of a DL radio frame timing structure for a UE, and UE UL 315 timing may illustrate one or more aspects of an UL radio frame timing structure for a UE. gNB timing and UE timing may be associated with boundaries such as slot boundaries, frame or subframe boundaries, etc. In some cases, gNB timing and UE timing may have a number of frame boundaries that correspond to slots or SFNs.

FIG. 3A may illustrate a large TA 330 in an NTN that may result in a large offset in the UEs DL frame timing and UL frame timing. For instance, in frame timing diagram 300, gNB DL 305-*a* timing and gNB UL 320-*a* timing may be aligned (e.g., a gNB DL frame n 340-*a* may be aligned with corresponding gNB UL frame n 340-*d*). UE DL 310-*a* timing may lag the gNB timing (gNB DL 305-*a* timing) by an amount of propagation delay 325-*a* between the UE and the gNB (e.g., which may include a UE-to-satellite propagation delay or both a UE-to-satellite propagation delay and a satellite-to-gateway propagation delay). In order to provide UL communications that are received at the gNB and synchronized with gNB SFN or slot boundaries, UE UL 315-*a* timing may have each corresponding SFN or slot advanced ahead of the UE DL 310-*a* timing by an amount of the TA 330-*a* (e.g., which may correspond to a RTT or RTD). In other words, UL and DL radio frame timing structures of the UE may be offset such that a UE DL frame n 340-*b* may be shifted compared to UE UL frame n 340-*c* by a TA 330-*a*. gNB DL frame n 340-*d* may be delayed by a delay 325-*b* behind UE UL frame n 340-*c*. As described herein, in some cases, UEs may thus transmit UL communications with very large TAs 330 in NTNs (e.g., TAs 330 to the order of hundreds of milliseconds (ms)).

Alternatively, if a smaller TA 330 is used, gNB DL 305 timing and gNB UL 320 timing may not be aligned. For example, FIG. 3B may illustrate a reduced TA 330 in an NTN that may result in a large offset in the gNBs DL frame timing and UL frame timing. For instance, in frame timing diagram 301, gNB DL 305-*b* timing and gNB UL 320-*b* timing may be offset (e.g., a gNB DL frame n 340-*e* may be offset from corresponding gNB UL frame n 320-*b* by a gNB DL-UL frame timing shift 335). UE DL 310-*b* timing may lag the gNB timing (gNB DL 305-*b* timing) by an amount of propagation delay 325-*c* between the UE and the gNB (e.g., which may include a UE-to-satellite propagation delay or both a UE-to-satellite propagation delay and a satellite-to-gateway propagation delay). In order to provide UL communications that are synchronized with UE SFN or slot boundaries, UE UL 315-*b* timing may have each corresponding SFN or slot advanced ahead of the UE DL 310-*b* timing by an amount of the TA 330-*b* (e.g., a UE UL frame n 340-*f* may be advanced ahead of UE DL frame n 340-*g*). gNB UL frame n 340-*h* may be delayed by a delay 325-*d* behind UE UL frame n 340-*g*.

Figure 4:
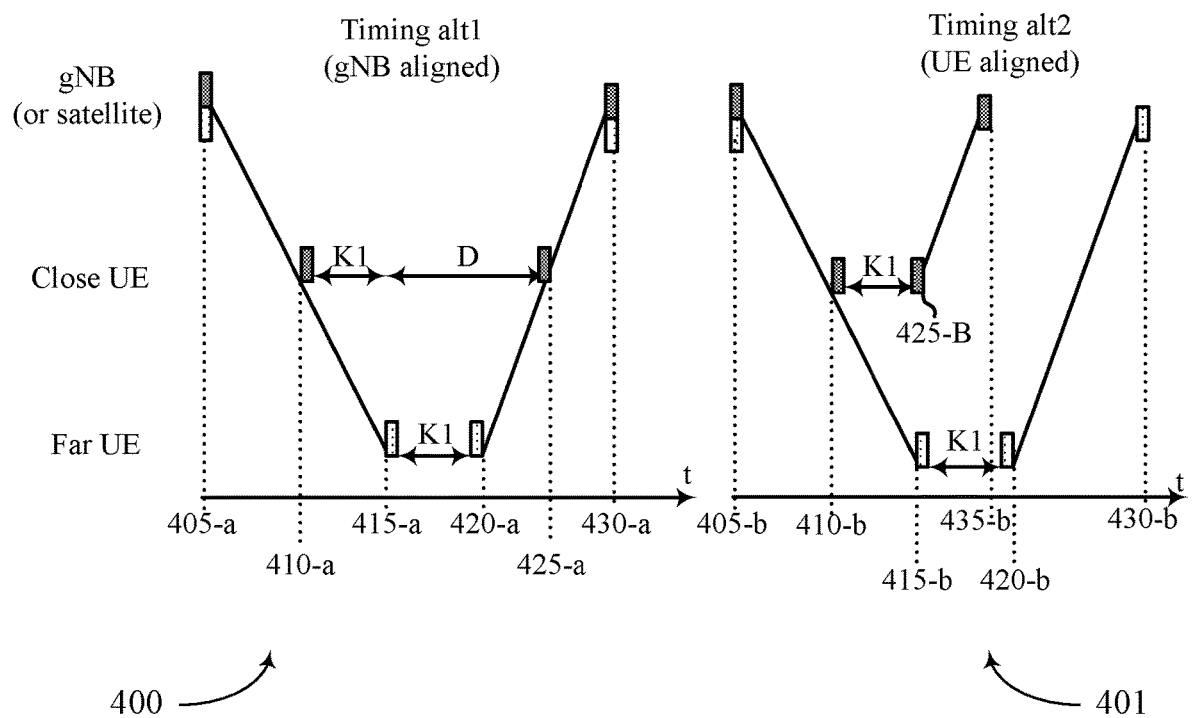
FIG. 4 illustrates example timing diagrams that support timing improvements for wireless communications systems in accordance with one or more aspects of the present disclosure.

FIG. 4 illustrates an example of a timing diagram 400 and a timing diagram 401 that support timing improvements for wireless communications systems in accordance with one or more aspects of the present disclosure. In some examples, timing diagram 400 and/or timing diagram 401 may implement aspects of wireless communications system 100, wireless communications system 200, frame timing diagram 300, and/or frame timing diagram 301. For example, timing diagram 400 and/or timing diagram 401 may be based on a configuration by a gateway 105 (or a satellite 120), and implemented by a UE 115 for estimating and determining UL timing (or implemented by a satellite 120 for estimating and determining DL timing) in an NTN, as described with reference to FIGS. 1-3. Generally, FIG. 4 may illustrate one or more aspects that may allow frameworks (e.g., NTNs) to define timing relationships at a base station (gNB, which may refer to a gateway and/or a satellite) and a UE.

Generally, NTNs may employ one of two high level alternatives. In gNB time (e.g., from the timing perspective of a satellite, a base station, a gateway, etc.), two UEs scheduled in the same instant (e.g., in the same DL frame) with a same offset (K) may be received at the same time (e.g., in a same UL frame corresponding to the scheduling DL frame), or two UEs scheduled in the same instant (e.g., in the same DL frame) with a same offset (K) may be received at different times (e.g., in different UL frames due to differences in RTTs between the two UEs scheduled via the same DL frame). Various aspects of the discussed timing enhancements may be described with reference to a scheduling offset ($K_{offset}$), a worst case RTT (N), a difference between the worst case RTT and the best case RTT (D), and an estimated RTT at a UE X ($N_x$). In some cases, the estimated RTT at a UE X ($N_x$) may be referred to as a UE-specific RTT. For example, the estimated RTT at a worst case UE (e.g., which may correspond to a UE furthest from the gNB, a UE moving away from the gNB, etc.) would be $N_x=N$, and the estimated RTT at a best case UE (e.g., where the best case RTT may correspond to a UE closest to the gNB, a UE moving towards the gNB, etc.) would be $N_x=N-D$.

Example timing diagram 400 may illustrate the first alternative described above where timing is aligned at the gNB (e.g., where a same RTT is observed by the gNB for a close UE and a far UE). For example, a gNB may transmit DCI (e.g., included in physical DL control channel (PDCCH) signaling) at 405-*a*. The DCI may schedule two UEs ('Close UE' and 'Far UE') for UL transmission (e.g., for physical uplink shared channel (PUSCH) signaling, which may be scheduled via an UL grant in DCI). The close UE may receive the DL message at 410-*a* and the far UE may receive the DL message at 415-*a* (e.g., due to differences in RTT associated with the two UEs). For example, due to proximity with a gNB in an NTN, a close UE and a far UE may have differences in RTTs (e.g., such as RTTs differing by 10 or more ms) that may be significant (e.g., relative to radio frame timing at the gNB and UEs).

Both UEs may be scheduled to transmit a corresponding UL message after some K1 slots (e.g., where K1 may be some scheduling offset configured by the network), and the close UE may delay transmission of the UL message by an additional duration D such that both UL messages may be received at the gNB at the same time (at 430-*a*). As such, a far UE may transmit an UL message (e.g., corresponding to the DL message received at 415-*a*) at 420-*a*, and a close UE may transmit an UL message (e.g., corresponding to the DL message received at 410-*a*) at 425-*a*. Due to the differences in RTT for UL transmission by the close UE and the far UE, and due to the additional delay (D) employed by the close UE, UL messages corresponding to the DL scheduling (transmitted by the gNB at 405-*a*) may be received by the base station at a same time 430-*a*.

Alternatively, example timing diagram 401 may illustrate the second alternative described above where timing is aligned at the UEs (e.g., where a different RTTs are observed by the gNB for a close UE and a far UE). For example, a gNB may transmit DCI (e.g., via PDCCH signaling) at 405-*b*. The DCI may schedule two UEs ('Close UE' and 'Far UE') for UL transmission (e.g., for PUSCH signaling, which may be scheduled via an UL grant in DCI). The close UE may receive the DL message at 410-*b* and the far UE may receive the DL message at 415-*b* (e.g., due to differences in RTT associated with the two UEs). For example, due to proximity with a gNB in an NTN, a close UE and a far UE may have differences in RTTs (e.g., such as RTTs differing by 10 or more ms) that may be significant (e.g., relative to radio frame timing at the gNB and UEs).

Both UEs may be scheduled to transmit a corresponding UL message after some K1 slots (e.g., where K1 may be some scheduling offset configured by the network). As such (e.g., in cases where the close UE does not delay transmission of the UL message by an additional duration D), the close UE may transmit an UL message (e.g., corresponding to the DL message received at 410-*b*) at 425-*b* and the far UE may transmit an UL message (e.g., corresponding to the DL message received at 415-*b*) at 420-*b*. Therefore, due to the differences in RTT for DL reception of a scheduling grant and for UL transmission by the close UE and the far UE, UL messages corresponding to the DL scheduling (transmitted by the gNB at 405-*a*) may be received by the base station at a different times (e.g., UL corresponding to the scheduled close UE may be received at 435-*b* and UL corresponding to the scheduled far UE may be received at 430-*b*).

As such, techniques described herein may provide for efficient timing structures (e.g., UL and DL radio frame timing structures at a gNB, as well as UL and DL radio frame timing structures at a UE) to manage such effects of differing RTTs between UEs of a same cell (e.g., between close UE and far UE served by a gNB).

For instance, in cases where timing is aligned at the gNB (e.g., as in example timing diagram 400), a UE DL timing structure may lag the gNB timing structure by an amount of propagation delay between the UE and the gateway (e.g., which may include a UE-to-satellite propagation delay or both a UE-to-satellite propagation delay and a satellite-to-gateway propagation delay). In order to provide UL communications that are received at the gNB and synchronized with gNB SFN or slot boundaries, UE UL timing may have each corresponding SFN or slot advanced ahead of the UE DL timing by an amount of the RTD, which may take into account propagation delay variation due to, for example, UE proximity to the gNB.

In some cases, for initial access the UE may transmit a random access request to the gNB to initiate a connection establishment. In some cases, an initial RTD value for random access requests may be broadcast by the gNB, and may be sufficient for the gNB to receive and decode the random access request even in the presence of some timing error. The gNB may transmit a RAR and TA value to the UE in response to the random access request. In some cases, the gNB may also provide information related to propagation delay variation.

In cases where the gNB timing reference is used for determination of UL timing (e.g., such as for the determination of D or the determination of the UL time 425-a), the one way propagation delay may corresponds to the delay between the UE and the gNB (e.g., which may include delay between the UE and the satellite (UE-satellite delay) or both the UE-satellite delay plus satellite-gateway delay). In some examples, the UE may be able to estimate the propagation delay, for example in cases where the UE has a GNSS capability. In cases where satellite reference timing is used, the service link may be aligned according to satellite clock, and the gateway may adjust its transmit timing to compensate delay between satellite and gateway, and thus the UE may not need to consider timing variation of the feeder link due to satellite movement relative to gateway.

In cases where the UE uses the gNB timing reference, when the UE receives UL scheduling (e.g., in DCI of a DL message from the gNB), the UE may determine the UL timing according to the received DL signal timing plus a TA, plus a scheduling offset ($K_{offset}$) (e.g., in addition to the K1 offset and/or K2 offset). In some cases, the gNB or other network node may broadcast information about RTD (e.g., to be used in initial access such as a random access procedure). In some cases, the gNB may broadcast the RTD between the satellite and the UE. In some cases, the UE may determine RTD between the UE and the satellite, based on one or more of a GNSS capability of the UE, ephemeris information associated with the satellite, information provided by gateway (e.g., in broadcast or unicast), time stamps of communications with the satellite, or any combinations thereof. In cases where the satellite timing reference is used for UE UL timing (e.g., in examples where the gNB is a satellite and not a ground gateway), the UE may calculate the RTD and timing variation for RTD only between UE and satellite. In such cases, the UE may not consider the RTD variation between satellite and gateway. In some cases, the RTD between satellite and gateway may be broadcast for initial access.

According to the techniques described herein, wireless communications systems (e.g., NTNs) may limit delays for UL communications (e.g., limit offsets between a UE UL frame timing structure and a UE DL frame timing structure). For instance, when a UE receives a grant (e.g., at 410 for 'Close UE' and at 415 for 'Far UE'), wireless communications systems may limit the duration between the received grant and corresponding UL transmission (e.g., at 425 for 'Close UE' and at 420 for 'Far UE'). That is, when a UE receives a grant and starts processing when to transmit UL (e.g., such as transmission of PUSCH corresponding to an UL grant or hybrid automatic repeat request (HARQ)-ACK corresponding to a DL grant) the network may impose buffering limits to some number of slots or some time duration (e.g., in ms).

FIG. 5 illustrates an example of a frame timing diagram 500 that supports timing improvements for wireless communications systems in accordance with one or more aspects of the present disclosure. In some examples, frame timing diagram 500 may implement aspects of wireless communication system 100, wireless communications system 200, frame timing diagram 300, frame timing diagram 301, timing diagram 400, and/or timing diagram 401. For example, frame timing diagram 500 may be based on a configuration by a gateway 105 (or a satellite 120), and implemented by a UE 115 for estimating and determining UL timing (or implemented by a satellite 120 for estimating and determining DL timing) in an NTN, as described with reference to FIGS. 1-4. Generally, FIG. 5 may illustrate one or more aspects that may allow frameworks (e.g., NTNs) to define timing relationships at a base station (gNB, which may refer to a gateway and/or a satellite) and a UE based on timing fully aligned at the network 525.

In the example of FIG. 5, a satellite may schedule the UE to transmit an UL transmission in satellite DL slot0 of sat DL 510 timing. In some cases, sat DL 510 timing may be aligned with sat UL 505 timing (e.g., satellite UL slot 0). Based on a scheduling offset ($K_{offset}$=N) and a TA, UEs may determine an UL radio frame timing structure (e.g., UE UL 515 timing) such that UE UL may be transmitted according to a TA for satellite reception of the UL message in the frame where the satellite expects to receive the UL message (e.g., such that the UL transmission from the UE arrives at the satellite aligned with a frame boundary expected for DL scheduling in satellite DL slot0). For instance, in some cases a network 525 may implement a K2 offset for UL (e.g., PUSCH) communications scheduled by a downlink (e.g., PDCCH) grant. In some cases, K2=3 slots, and a satellite scheduling an UL transmission via a DL slot0 may expect to receive a corresponding UL message (e.g., PUSCH, HARQ-ACK, etc.) in an UL slot3. In such cases, UEs may determine an UL radio frame timing structure (e.g., UE UL 515 timing) based on a scheduling offset ($K_{offset}$=N), slot offset (K2=3), and a TA, such that UE UL (e.g., an UL message) may be transmitted according to a TA for satellite reception of the UL message in the slot where the satellite expects to receive the UL message (e.g., in a satellite UL slot3 of sat UL 505).

According to the techniques described herein, UEs may receive an indication of a scheduling offset, $K_{offset}$=N, from a gNB (e.g., a base station or satellite). UEs may then determine an RTT for communications with the gNB and determine a TA based on $K_{offset}$=N and the determined RTT. As such, UEs with various delays (e.g., different RTTs) within the cell may transmit UL messages to the gNB in accordance with timing alignment at the network 525. In the example frame timing diagram 500, $K_{offset}$=N, TA=$N_X$, and TA for PRACH=$N_X$ (e.g., the TA used for PUSCH and PRACH may be the UE-specific RTT, which may be determined by the UE or signaled by the satellite in RTD information).

$K_{offset}$ may refer to a scheduling offset (e.g., from 0-32 slots, or more slots for NTNs). $K_{offset}$ may be signaled to UEs in the cell via SIB or other signaling. As an example, without $K_{offset}$, for 15 kilohertz (kHz) SCS and a 30 ms (30 slot) scheduling delay, if TA=200 ms, then an UL message corresponding to a grant received in a slot s (or SFN s) may be transmitted in a slot s−170+K, where K may be indicated in the DCI and may indicate an additional offset on top of the scheduling offset. As such, NTNs may implement $K_{offset}$ such that if a baseline TA (e.g., N) is present, the scheduling delay starts at the baseline TA (e.g., N) via implementation of the $K_{offset}$=N, where N corresponds to the worst case RTT, as described herein. Therefore, UEs with delays other than the worst case RTT (N) may adjust their radio frame timing structure or UL timing such that their TA accounts for their $N_X$ (e.g., via TA=N−$N_X$, or TA=N−D for the UE with the minimum delay in the cell 535). For example, a UE with a minimum delay (D slots difference) 535 may have a UE DL 520-b timing that is behind a UE UL 515-b by a minimum TA (e.g., TA_min (N-D slots) 550.

$K_{offset}$ and TA may thus offset each other to some extent depending on the best case scenario RTT of the cell and a particular UE's RTT in comparison to the best case RTT captured by $K_{offset}$ (e.g., a UE with max delay 530 in cell applies $TA_{Max}$ of N slots). $K_{offset}$=N may be included as a part of UE radio frame timing structure such that TA=N is applied (e.g., to align UL frame N with DL frame 0 for the UE with maximum delay 530 within the cell). Further, the described techniques may limit TA and $K_{offset}$ to limit buffering, improve system efficiency, etc. (e.g., otherwise if $K_{offset}$ is too large and if TA is small, then the UE has to buffer for a very long time).

The gNB (e.g., satellite) may signal a $K_{offset}$=N and UEs in the cell may apply TA=$N_X$ (e.g., plus, potentially, small TA command corrections). As discussed, the techniques described herein may limit the buffering length at the UE (e.g., to D). The buffering length at the UE may be limited to, for example, X slots or X ms. In some examples, wireless communications systems (e.g., UEs and radio frame timing structures in an NTN) may adhere to $K_{offset}$-TA<delta (e.g., or more specifically $K_{offset}$*slotDuration-TA<delta). In some cases, delta may be specified or preconfigured by the network 525, may depend on numerology, may depend on UE capability (e.g., UE buffering capability), etc. Additionally or alternatively, wireless communications systems (e.g., UEs and radio frame timing structures in an NTN, such as UE UL 515-a timing and UE DL 520-a timing) may adhere to TA<$K_{offset}$+$TA_{Max}$ (e.g., where $TA_{Max}$ 540 may be preconfigured, signaled, or otherwise specified by the network 525). In some cases, the value of delta may depend on, for example, ephemeris information (e.g., for geosynchronous orbit (GEO) it may be larger than for LEO, or MEO for example).

FIG. 6 illustrates an example of a frame timing diagram 600 that supports timing improvements for wireless communications systems in accordance with one or more aspects of the present disclosure. In some examples, frame timing diagram 600 may implement aspects of wireless communication system 100, wireless communications system 200, frame timing diagram 300, frame timing diagram 301, timing diagram 400, timing diagram 401, and/or frame timing diagram 500. For example, frame timing diagram 600 may be based on a configuration by a gateway 105 (or a satellite 120), and implemented by a UE 115 for estimating and determining UL timing (or implemented by a satellite 120 for estimating and determining DL timing) in an NTN, as described with reference to FIGS. 1-5. Generally, FIG. 6 may illustrate one or more aspects that may allow frameworks (e.g., NTNs) to define timing relationships at a base station (gNB, which may refer to a gateway and/or a satellite) and a UE based on timing aligned with offset.

In the example of FIG. 6, a satellite may schedule the UE to transmit an UL transmission in satellite DL slot0 of sat DL 610 timing. In some cases, sat DL 610 timing may be aligned with sat UL 605 timing (e.g., satellite UL slot 0). Based on a scheduling offset ($K_{offset}$=D) and a TA (e.g., TA=$N_X$-(N-D)), UEs may determine an UL radio frame timing structure (e.g., UE UL 615-a timing) such that UE UL may be transmitted according to a TA for satellite reception of the UL message in the frame where the satellite expects to receive the UL message (e.g., such that the UL transmission from the UE arrives at the satellite aligned with a frame boundary expected for DL scheduling in satellite DL slot0 of sat DL 610). For instance, in some cases a network 625 may implement a K2 offset for UL (e.g., PUSCH) communications scheduled by a DL (e.g., PDCCH) grant. Further, in some cases, K1 may refer to a time offset between physical downlink shared channel (PDSCH) and HARQ-ACK (e.g., physical uplink control channel (PUCCH) transmission). In some cases, K2=3 slots, and a satellite scheduling an UL transmission via a DL slot0 may except to receive a corresponding UL message (e.g., PUSCH, HARQ-ACK, etc.) in an UL slot3. In such cases, UEs may determine an UL radio frame timing structure (e.g., UE UL timing) based on a scheduling offset ($K_{offset}$=N), slot offset (K2=3), and a TA, such that UE UL (e.g., an UL message) may be transmitted according to a TA for satellite reception of the UL message in the frame where the satellite expects to receive the UL message (e.g., in a satellite UL slot3 of sat UL 605).

According to the techniques described herein, UEs may receive an indication of a scheduling offset, $K_{offset}$=D, from a gNB (e.g., a base station or satellite). UEs may then determine an RTT for communications with the gNB and determine a TA based on $K_{offset}$=D and the determined RTT. As such, UEs with various delays (e.g., different RTTs) within the cell may transmit UL messages to the gNB in accordance with timing alignment at the network 625. In the example frame timing diagram 600, $K_{offset}$=D, TA=$N_X$-(N-D), the offset at the network=N-D, and the TA for PRACH=$N_X$-(N-D).

As discussed, $K_{offset}$ may refer to a scheduling offset (e.g., from 0-32 slots, or more slots for NTNs). $K_{offset}$ may be signaled to UEs in the cell via SIB or other signaling. As such, according to the example of FIG. 6, NTNs may implement $K_{offset}$ such that some delay is added in the frame structure (the radio frame timing structure) of the network 625. As all UEs may have a common delay of N-D 640 (e.g., the minimum delay or RTT of the cell), the network 625 may account for such an offset and the UEs may account for differential delay from other UEs in the cell (e.g., instead of UEs having to do all the work, UEs may account for differential delay within the cell and the satellite may absolve common delay within the cell).

The gNB (e.g., satellite) may signal a $K_{offset}$=D in addition to a common offset (N-D), and UEs in the cell may apply TA=$N_X$-(N-D), (e.g., plus, potentially, small TA command corrections). In such examples, there may be no need to add additional limitations in the TA (e.g., as the TA will be between 0 and D). In some cases, D for NTNs may be larger than a $TA_{Max}$ for terrestrial communications systems. In example frame timing diagram 600, UEs may use a common offset (N-D) 640 in determining TA=$N_X$-(N-D), as the network 625 may be accounting for the common offset delay (e.g., out of total UE RTT ($N_X$) gNB is handling the common delay N-D 640 part of it). In some cases, if the RTT estimation is based on timestamps, then the network 625 (e.g., gNB or satellite) may determine (or dynamically switch between) whether or not to use radio frame timing structures analogous to example frame timing diagram 500 or example frame timing diagram 600 (e.g., when implementing radio frame timing structures analogous to example frame timing diagram 600, the timestamps may be delayed by N-D).

Generally, considering UEs with GNSS and without GNSS, the UE may identify or determine (e.g., either via explicit signaling, via network specification or preconfiguration, or via derivation from other parameters), a minimum offset (M), a scheduling slot offset (S), and a portion of the offset that is captured at the network side (P). For implementing radio frame timing structures analogous to example frame timing diagram 500 (e.g., where timing is fully aligned at the network 625), M=N−D, S=N, and P=0. For implementing radio frame timing structures analogous to example frame timing diagram 600 (e.g., where timing is aligned with an offset, such as with a common offset N−D), M=N−D, S=D, and P=N−D. In some cases, a minimum offset may be implemented for UEs without GNSS for initial TA for PRACH. For example, the UE UL 615-*b* timing and UE DL 620-*b* timing may be aligned for a UE with a minimum delay 635.

In some cases, relationships between M, S, and P (as well as the TA) may be limited by wireless communications systems (e.g., by NTNs). For example, wireless communications systems (e.g., UEs and radio frame timing structures in an NTN) may adhere to S+P−M<z, where z may be specified or preconfigured by the network 625, where z may depend on deployment, etc. (e.g., which may limit buffering at the UE, for instance, by limiting the max time between receiving a DCI and transmitting PUSCH). Additionally or alternatively, wireless communications systems (e.g., UEs and radio frame timing structures in an NTN) may adhere to M−P<TA<M−P+y, where y may be specified or preconfigured by the network 625, where y may depend on deployment, etc. (e.g., which may limit the range of TA at the UE). In some cases, the UE UL 615-*a* timing and the UE DL 620-*a* timing for a UE with maximum delay 630 may be offset by a maximum TA (e.g., TA_max (D slots) 645).

Figure 7:
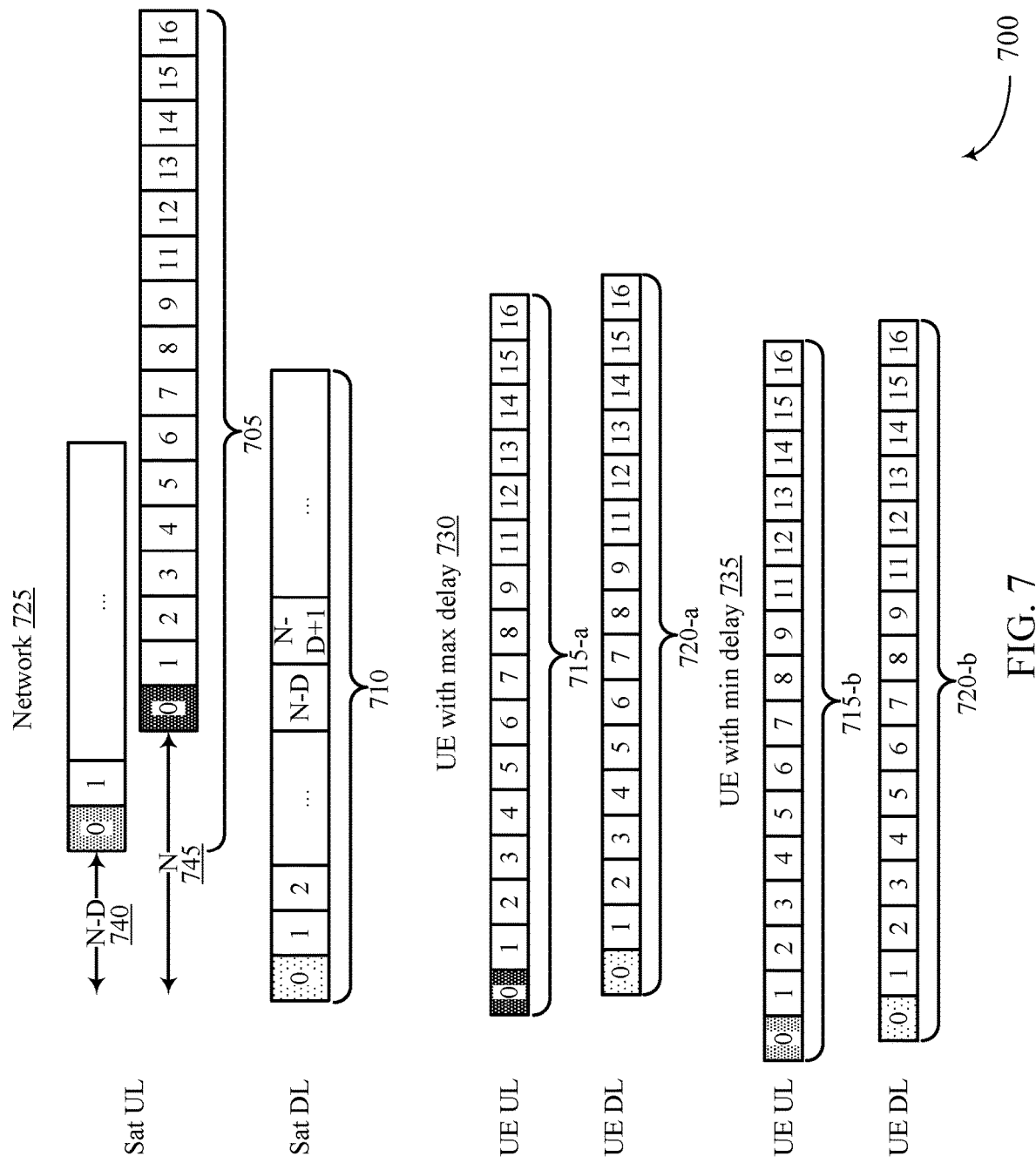
FIG. 7 illustrates an example of a frame timing diagram that supports timing improvements for wireless communications systems in accordance with one or more aspects of the present disclosure.

FIG. 7 illustrates an example of a frame timing diagram 700 that supports timing improvements for wireless communications systems in accordance with one or more aspects of the present disclosure. In some examples, frame timing diagram 700 may implement aspects of wireless communication system 100, wireless communications system 200, frame timing diagram 300, frame timing diagram 301, timing diagram 400, timing diagram 401, and/or frame timing diagram 500. For example, frame timing diagram 700 may be based on a configuration by a gateway 105 (or a satellite 120), and implemented by a UE 115 for estimating and determining UL timing (or implemented by a satellite 120 for estimating and determining DL timing) in an NTN, as described with reference to FIGS. 1-5. Generally, FIG. 7 may illustrate one or more aspects that may allow frameworks (e.g., NTNs) to define timing relationships at a base station (gNB, which may refer to a gateway and/or a satellite) and a UE based on UE alignment with a closest slot.

In the example of FIG. 7, a satellite may schedule the UE to transmit an UL transmission in satellite DL slot0 of sat DL 710 where $K_{offset}$=0. In such cases, TA may be rounded down to a nearest slot boundary and UEs may determine an UL radio frame timing structure (e.g., UE UL 715 timing) such that UE UL may be transmitted according to a nearest slot boundary and the satellite may account for differences in RTTs associated with different UEs in the cell. If network 725 schedules the two UEs (e.g., UE with a maximum delay 730, UE with a minimum delay 735) at DL slot0, the network 725 may receive UL from the different UEs at different times. A UE with a maximum delay 730 may be configured with a UE UL 715-*a* timing and a UE DL 720-*a* timing that may be aligned or offset. A UE with a minimum delay 735 may be configured with a UE UL 715-*b* timing and a UE DL 720-*b* timing that may be aligned or offset. In other words, the offset at the network 725 may be different for different UEs. In such examples where timing is aligned at the UEs and the network 725 manages differences in reception timing, the TA for PRACH and Msg3 may be $N_X$ 745 (or ($N_X$−D) 740), as during initial access the network 725 may be able to estimate when Msg3 will arrive from served UEs. As such, Msg3 from UEs may include indication of TA and slot offset.

For example, when performing random access, the UE may know the RTT delay $N_X$. For a RACH occasion in "gNB UL slot" n, the gNB may transmit in "UE UL slot n−$N_X$". When sending the random access response, the gNB may not know the TA applied by the UE. So, the gNB may signal a "fractional TA" to be applied. The "fractional TA" may be, in some cases, a time difference between the received PRACH and the closest slot boundary. The random access response may schedule a PUSCH (msg3) in "gNB UL slot s" (e.g., the UE may delay its transmission by N−$N_X$+TA on top of the scheduling delay such that all the UEs may transmit in the same UL slot). In msg3, the UE may include the N−$N_X$ (in slots). Now, the gNB may determine the relationship between a grant and the corresponding UL transmission. For the rest of the transmissions, the UE may disregard $K_{offset}$ or max RTT (e.g., the UL and DL frames may be shifted only by the TA).

In some examples, the scrambling sequence, PUSCH hopping, etc. may be changed or updated to align the values transmitted by multiple UEs (e.g., apply the $K_{offset}$ and $N_X$ to the slot in the sequence initialization). In some examples, TA may be greater than zero (TA>0) during the connection. When the TA is moving very close to 0, the gNB may issue a command to "shift the frame structure" by, for example, 1 slot and keep the TA positive.

Figure 8:
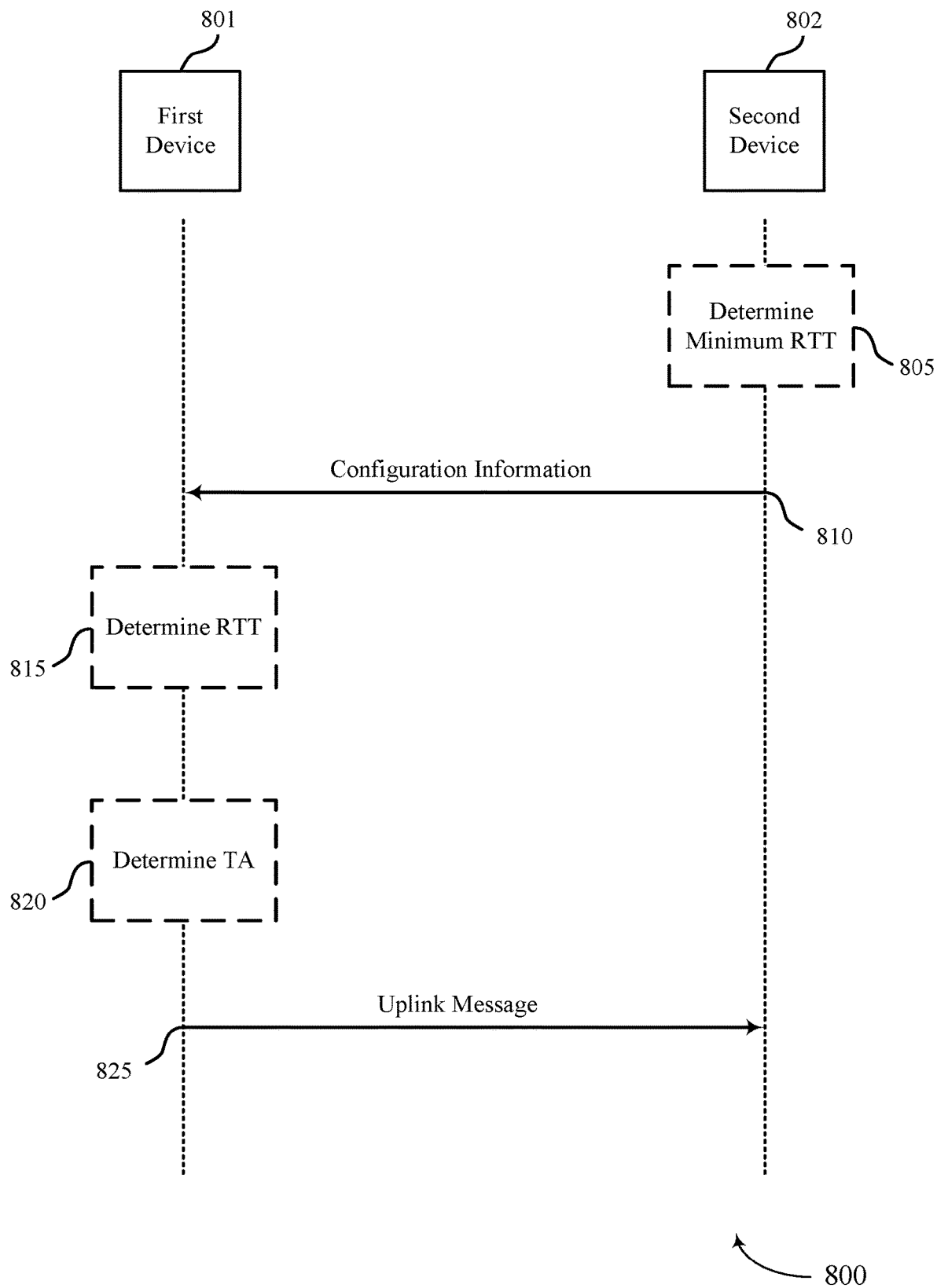
FIG. 8 illustrates an example of a process flow that supports timing improvements for wireless communications systems in accordance with one or more aspects of the present disclosure.

FIG. 8 illustrates an example of a process flow 800 that supports timing improvements for wireless communications systems in accordance with one or more aspects of the present disclosure. In some examples, process flow 800 may implement aspects of wireless communication system 100, wireless communications system 200, frame timing diagram 300, frame timing diagram 301, timing diagram 400, timing diagram 401, frame timing diagram 500, frame timing diagram 600, and/or frame timing diagram 700 (e.g., as described with reference to FIGS. 1-7). For example, the process flow 800 may be based on a configuration by a network, and implemented by a UE for identifying propagation delay, radio frame timing structure, etc. for use in determining DL and UL timing in an NTN, or some other network, as described with reference to FIGS. 1-7.

The process flow 800 may include a first device 801 and a second device 802. First device 801 may be an example of a UE or base station, and second device 802 may be an example of a satellite or base station, which may be examples of a gNB (or base station 105) and a UE 115 as described with reference to FIGS. 1-7. For example, second device 802 may be an example of a satellite 120, a ground base station 105 or gateway, etc., as described herein. In the following description of the process flow 800, the operations between the second device 801 and the first device 801 may be performed in a different order than the example order shown, or the operations performed by the second device 802 and the first device 801 may be performed in different orders or at different times. Some operations may also be omitted from the process flow 800, and other operations may be added to the process flow 800. In the example of FIG. 8, the second device 802 and the first device 801 may be in communication with each other via an NTN. The process flow 800 may support improved timing, higher data rates, improved mobility support for the first device 801 in the NTN, among other benefits.

At 805, the second device 802 may determine to use the satellite time reference for communications with the first device 801. At 810, the second device 802 may transmit configuration information to the first device 801 that indicates that the satellite time reference is to be used for UL communications timing of the first device 801. In some examples, the configuration information may include an indication of a scheduling offset ($K_{offset}$) between a DL radio frame timing structure and an UL radio frame timing structure. In some cases, the configuration information may be provided in broadcast transmissions from the second device 802, such as in one or more SIBs. At 810, the first device 801 may identify the satellite time reference is to be used for UL timing determination. In some cases, the first device 801 may decode broadcast information that indicates to use the satellite time reference (e.g., as well as an indication of $K_{offset}$). In some cases, the configuration information may include RTD information (e.g., a propagation delay value, a common offset N–D, etc.). In some cases, the configuration information may generally include indication of any of M, P, S, delta, $TA_{Max}$, y, and z, as described herein.

At 815, first device 801 may determine a RTT for communications with the second device 802. At 820, first device 801 may determine a TA based on the scheduling offset and the RTT (e.g., an potentially other information in the configuration information received at 810). At 825, first device 801 may transmit an UL message (e.g., PUSCH, HARQ feedback, etc.) to the second device 802 in accordance with the techniques described herein (e.g., based on radio frame timing structure, TA application, etc.). For example, in some cases, first device 801 may determine a range of TA values based on S+P−M<z, M−P<TA<M−P+y, $K_{offset}$−TA<delta, TA<$K_{offset}$+$TA_{Max}$, or some combination thereof. The first device 801 may determine a TA, in accordance with any configured thresholds described herein, and apply the TA to UL transmission timing (e.g., based on radio frame timing structures described herein).

Figure 9:
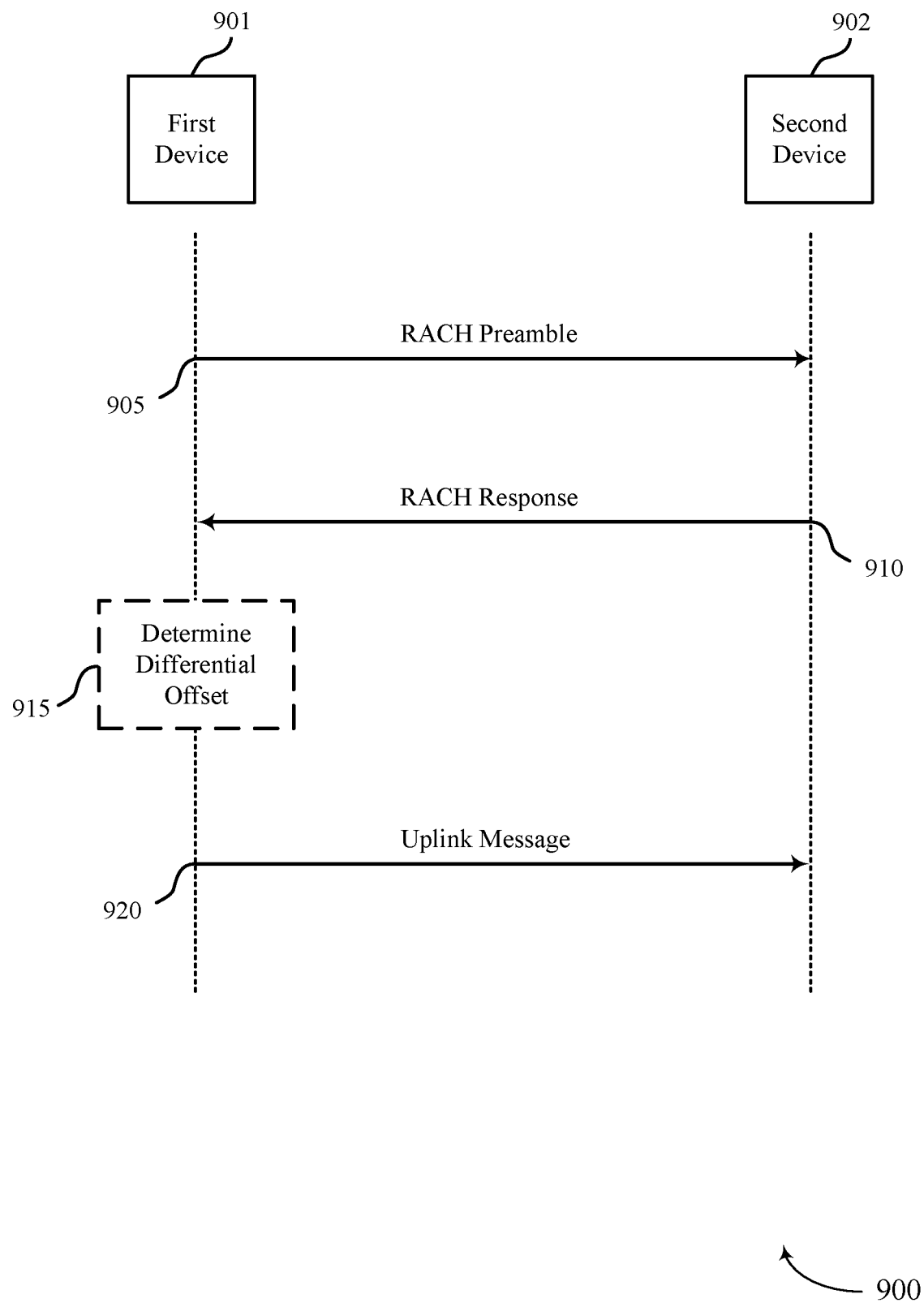
FIG. 9 illustrates an example of a process flow that supports timing improvements for wireless communications systems in accordance with one or more aspects of the present disclosure.

FIG. 9 illustrates an example of a process flow 900 that supports timing improvements for wireless communications systems in accordance with one or more aspects of the present disclosure. In some examples, process flow 900 may implement aspects of wireless communication system 100, wireless communications system 200, frame timing diagram 300, frame timing diagram 301, timing diagram 400, timing diagram 401, frame timing diagram 500, frame timing diagram 600, frame timing diagram 700, and/or process flow 800 (e.g., as described with reference to FIGS. 1-8). For example, the process flow 900 may be based on a configuration by a network, and implemented by a UE for identifying propagation delay, radio frame timing structure, etc. for use in determining DL and UL timing in an NTN, or some other network, as described with reference to FIGS. 1-8.

The process flow 900 may include a first device 901 and a second device 902. First device 901 may be an example of a UE or base station, and second device 902 may be an example of a satellite or base station, which may be examples of a gNB (or base station 105) and a UE 115 as described with reference to FIGS. 1-8. For example, second device 902 may be an example of a satellite 120, a ground base station 105 or gateway, etc., as described herein. In the following description of the process flow 900, the operations between the second device 902 and the first device 901 may be performed in a different order than the example order shown, or the operations performed by the second device 902 and the first device 901 may be performed in different orders or at different times. Some operations may also be omitted from the process flow 900, and other operations may be added to the process flow 900. In the example of FIG. 9, the second device 902 and the first device 901 may be in communication with each other via an NTN. The process flow 900 may support improved timing, higher data rates, improved mobility support for the first device 901 in the NTN, among other benefits.

At 905, first device 901 may transmit a RACH preamble (e.g., RACH Msg1) to second device 902 for an initial access procedure. At 910, second device 902 may transmit a random access response (e.g., a RAR or RACH response) to the first device 901. In some examples, the RAR message at 910 may include a fraction TA (e.g., a fractional TA to align a subsequent RACH Msg3 with a slot boundary of second device 902 radio frame timing structure, where the fractional TA is based on the reception timing of the RACH preamble at 905). At 915, first device 901 may determine a differential offset between a first slot boundary associated with a base station radio frame timing structure and a second slot boundary associated with a UE radio frame timing structure (e.g., based on the fractional TA). At 920, first device 901 may transmit, to the second device 902 in response to the RAR message, a second random access message (e.g., a Msg3) including the differential offset. In some examples, process flow may illustrate one or more aspects of techniques (e.g., RACH techniques) described with reference to FIG. 7.

Figure 10:
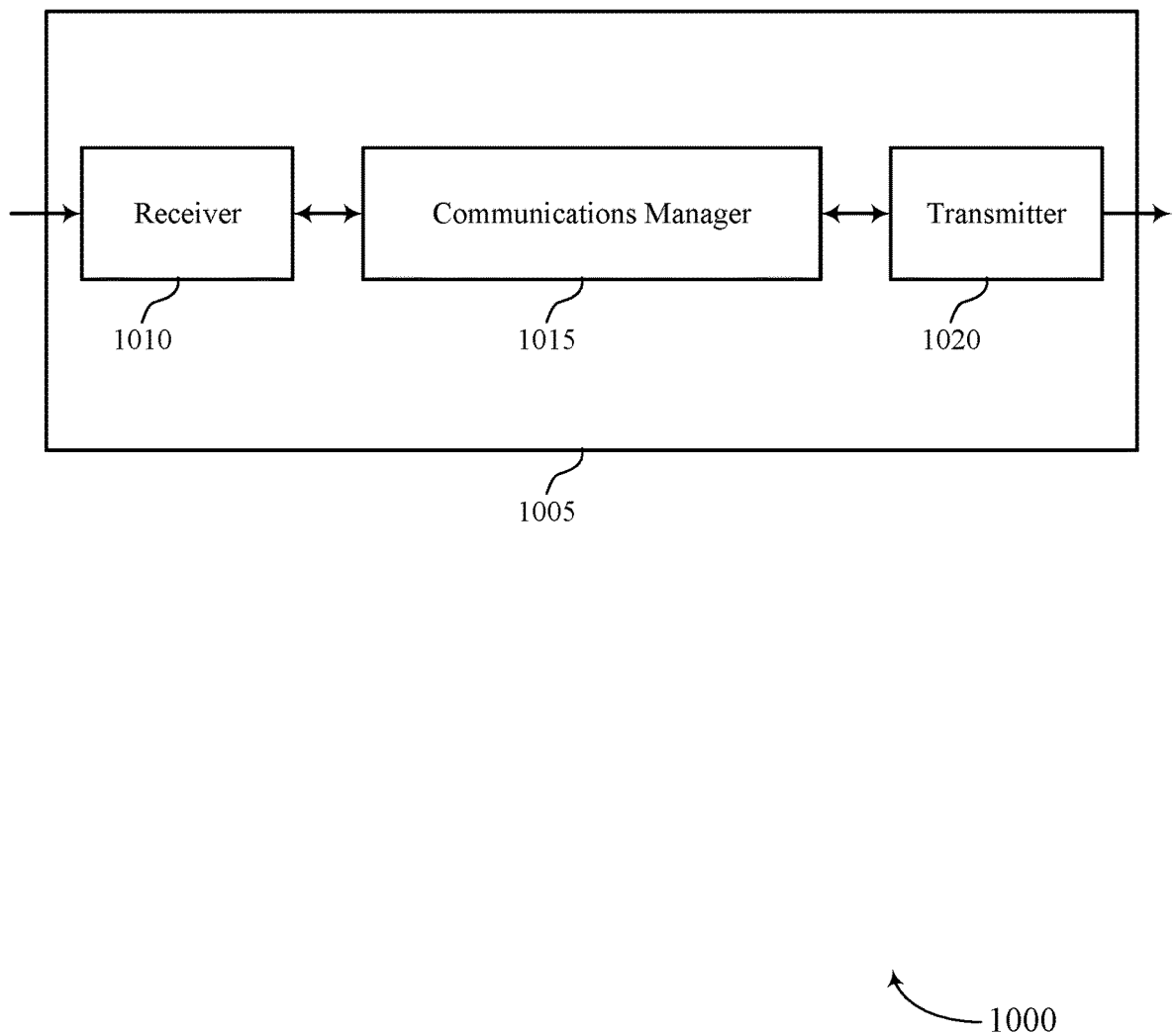
FIGS. 10 through 27 show flowcharts illustrating methods that support timing improvements for wireless communications systems in accordance with one or more aspects of the present disclosure.

FIG. 10 shows a block diagram 1000 of a device 1005 that supports timing improvements for wireless communications systems in accordance with one or more aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to timing improvements for wireless communications systems, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a base station, an indication of a scheduling offset between a DL radio frame timing structure and an UL radio frame timing structure, and transmit an UL message to the base station based on the TA, the TA based on the received indication of the scheduling offset.

The communications manager 1015 may also receive, from a base station, a random access response message including a fractional TA. The communications manager 1015 may transmit, to the base station in response to the random access response message, a second random access message including a differential offset between a first slot boundary associated with a base station radio frame timing structure and a second slot boundary associated with a UE radio frame timing structure.

The communications manager 1015 may be an example of aspects of the communications manager 1310 described herein. The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015 may be an example of means for performing various aspects of timing determination procedures as described herein. The communications manager 1015, or its sub-components, may be implemented in hardware (e.g., in communications management circuitry). The circuitry may comprise one or more of a processor, a DSP, an ASIC, a FPGA or other programmable logic device, discrete gate or transistor logic, discrete hardware components, or any combination thereof designed to perform the functions described in the present disclosure.

In another implementation, the communications manager 1015, or its sub-components, may be implemented in code (e.g., as communications management software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device.

In some examples, the communications manager 1015 may be configured to perform various operations (e.g., receiving, transmitting) using or otherwise in cooperation with the receiver 1010, the transmitter 1020, or both.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The described techniques, such as those described with reference to a communications manager 1015, may support NTN timing alignment of communications between a base station or satellite and one or more UEs served by the base station or satellite. For instance, the described techniques may provide for reliable estimation of timing offsets, and reliable estimation of TA values for UL, etc. relating to communications between high-altitude vehicles (e.g., satellites or other non-terrestrial-based equipment), user terminals, and gateways, in NTNs. As such, supported techniques may include features for efficient NTNs and efficient non-terrestrial communications. The described techniques may also support increased spectral efficiency and, in some examples, may promote higher mobility support for user terminals in NTNs compared to terrestrial networks.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
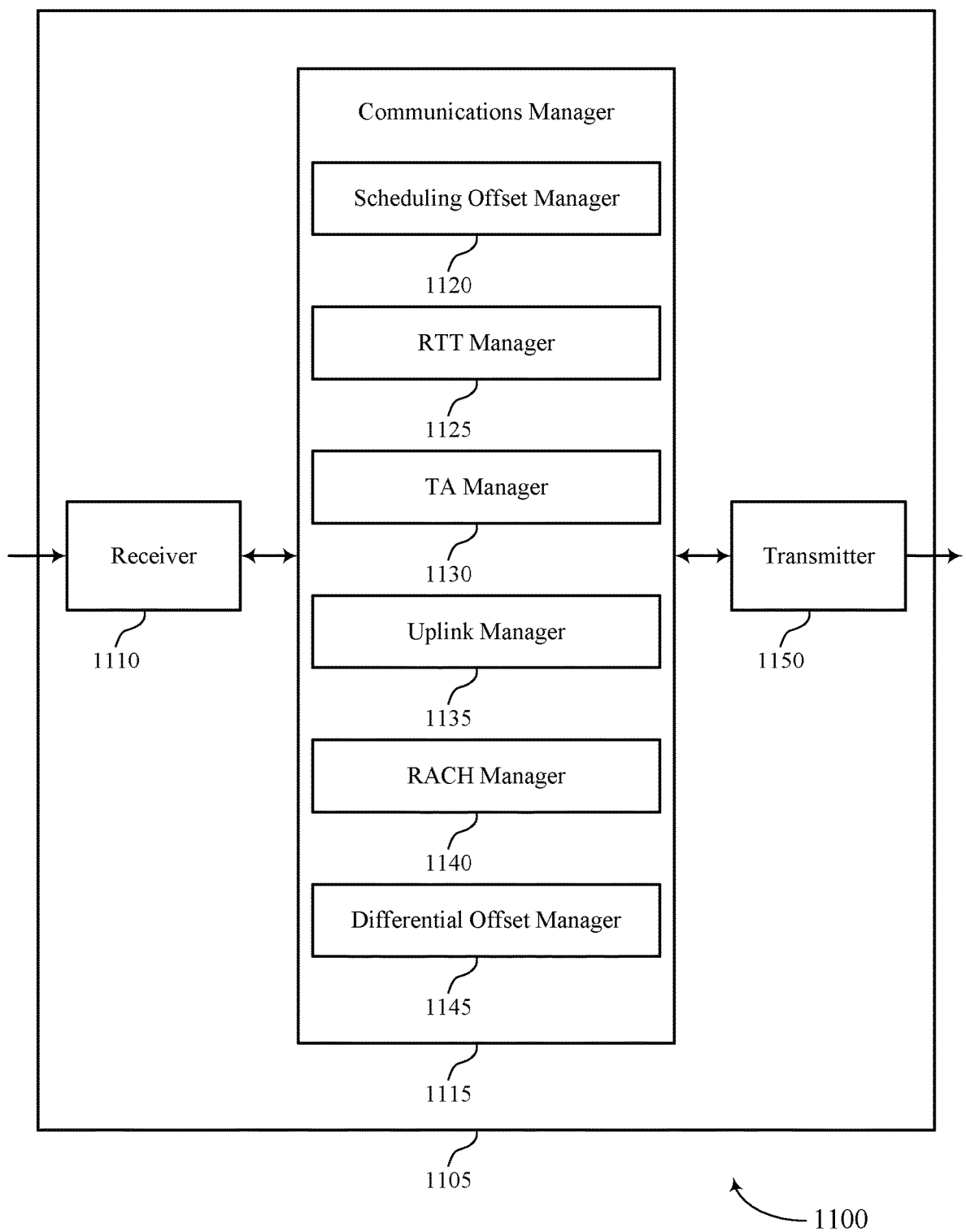

FIG. 11 shows a block diagram 1100 of a device 1105 that supports timing improvements for wireless communications systems in accordance with one or more aspects of the present disclosure. The device 1105 may be an example of aspects of a device 1005, or a UE 115 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to timing improvements for wireless communications systems, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a scheduling offset manager 1120, a RTT manager 1125, a TA manager 1130, an uplink manager 1135, a RACH manager 1140, and a differential offset manager 1145. The communications manager 1115 may be an example of aspects of the communications manager 1310 described herein.

The scheduling offset manager 1120 may receive, from a base station, an indication of a scheduling offset between a DL radio frame timing structure and an UL radio frame timing structure. The RTT manager 1125 may determine a RTT for communications with the base station. The TA manager 1130 may determine a TA based on the scheduling offset and the RTT. The uplink manager 1135 may transmit an UL message to the base station based on the TA, the TA based on the received indication of the scheduling offset.

The RACH manager 1140 may receive, from a base station, a random access response message including a fractional TA. The differential offset manager 1145 may determine a differential offset between a first slot boundary associated with a base station radio frame timing structure and a second slot boundary associated with a UE radio frame timing structure. The RACH manager 1140 may transmit, to the base station in response to the random access response message, a second random access message including the differential offset between a first slot boundary associated with a base station radio frame timing structure and a second slot boundary associated with a UE radio frame timing structure.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
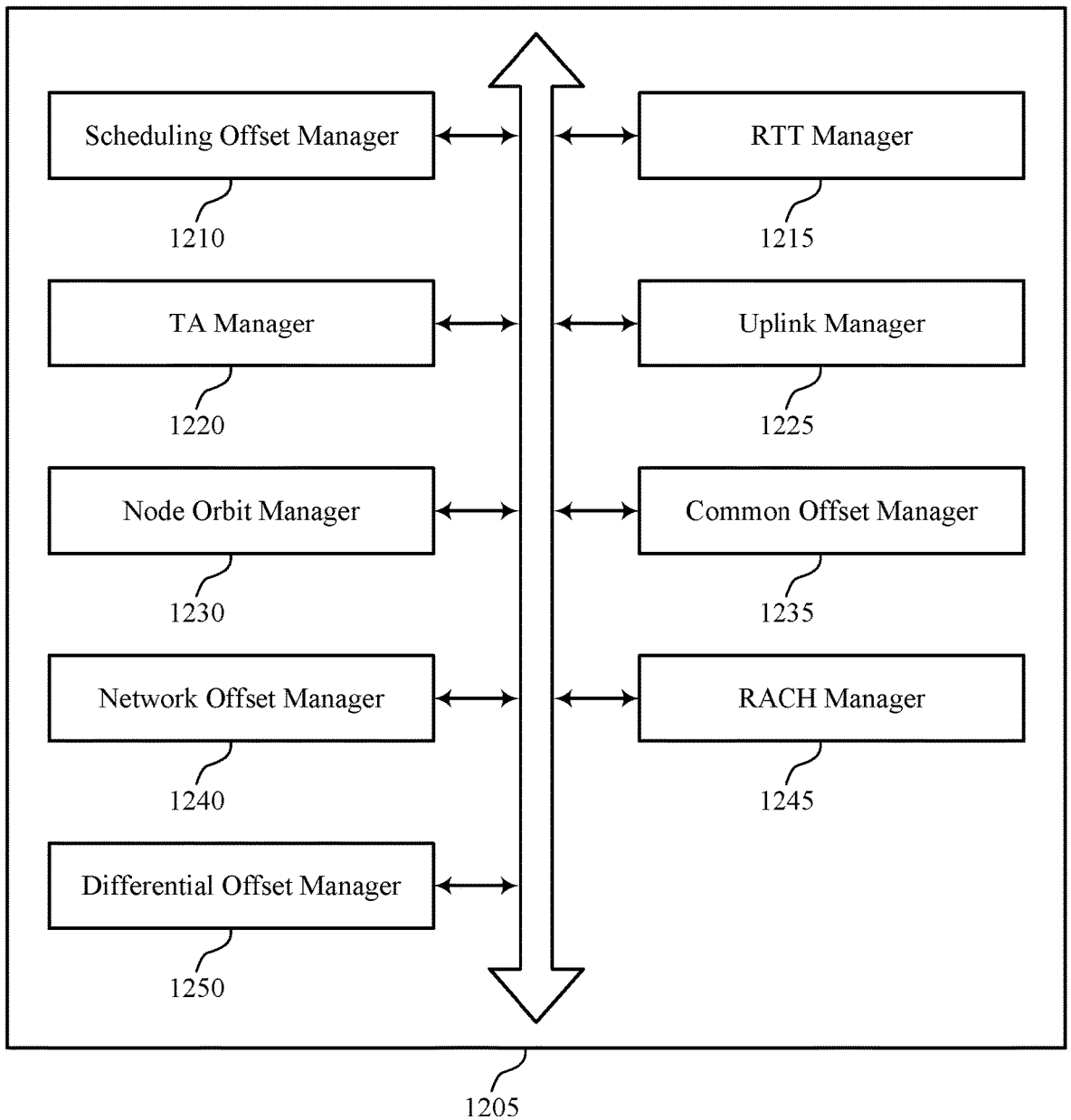

FIG. 12 shows a block diagram 1200 of a communications manager 1205 that supports timing improvements for wireless communications systems in accordance with one or more aspects of the present disclosure. The communications manager 1205 may be an example of aspects of a communications manager 1015, a communications manager 1115, or a communications manager 1310 described herein. The communications manager 1205 may include a scheduling offset manager 1210, a RTT manager 1215, a TA manager 1220, an uplink manager 1225, a node orbit manager 1230, a common offset manager 1235, a network offset manager 1240, a RACH manager 1245, and a differential offset manager 1250. Each of these modules may communicate, directly or indirectly, with one another (e.g., via one or more buses).

The scheduling offset manager 1210 may receive, from a base station, an indication of a scheduling offset between a DL radio frame timing structure and an UL radio frame timing structure.

The RTT manager 1215 may determine a RTT for communications with the base station. In some examples, the RTT manager 1215 may determine a RTT for communications with a base station. In some examples, the RTT manager 1215 may determine a scrambling sequence, a hopping pattern, or both based on the RTT. In some cases, the RTT for communications with the base station is determined based on one or more of a position of the UE, a position of the base station, a distance between the UE and the base station, a timestamp corresponding to a DL message received from the base station, and a local timestamp.

The TA manager 1220 may determine a TA based on the scheduling offset and the RTT. In some examples, the TA manager 1220 may determine a range of TA values based on the scheduling offset, where the TA is determined based on the range. In some examples, the TA manager 1220 may determine a TA threshold, where the TA is determined based on the TA threshold. In some examples, the TA manager 1220 may determine a range of TA values based on the common offset, where the TA is determined based on the range. In some examples, the TA manager 1220 may determine a range of TA values based on the network offset, where the TA is determined based on the range. In some examples, the TA manager 1220 may determine an initial TA based on the minimum offset. In some examples, the TA manager 1220 may determine a TA based on the differential offset. In some cases, the TA threshold is determined based on one or more of a slot duration, a radio frame numerology, and a buffering capability of the UE.

The uplink manager 1225 may transmit an UL message to the base station based on the TA, the TA based on the received indication of the scheduling offset. In some examples, the uplink manager 1225 may transmit a PRACH channel message based on the initial TA. In some examples, the uplink manager 1225 may transmit an UL message to the base station based on the TA.

The RACH manager 1245 may receive, from a base station, a random access response message including a fractional TA. In some examples, the RACH manager 1245 may transmit, to the base station in response to the random access response message, a second random access message including a differential offset between a first slot boundary associated with a base station radio frame timing structure and a second slot boundary associated with a UE radio frame timing structure. In some examples, the RACH manager 1245 may transmit a first random access message to the base station based on the RTT, where the random access response message is received based on transmitting the first random access message.

The differential offset manager 1250 may determine a differential offset between a first slot boundary associated with a base station radio frame timing structure and a second slot boundary associated with a UE radio frame timing structure. In some examples, the differential offset manager 1250 may receive, from the base station, an indication to shift the UE radio frame timing structure. In some examples, the differential offset manager 1250 may shift the UE radio frame timing structure based on the indication, where the TA is determined based on the shifting. In some cases, the differential offset is determined based on the fractional TA.

The node orbit manager 1230 may determine an orbit type associated with the base station, where the range is determined based on the orbit type.

The common offset manager 1235 may receive an indication of a common offset associated with a cell served by the base station, where the TA is determined based on the common offset.

The network offset manager 1240 may determine a network offset between a network DL radio frame timing structure and a network UL radio frame timing structure, where the TA is determined based on the network offset. In some examples, the network offset manager 1240 may receive an indication of the network offset, where the network offset is determined based on the indication of the network offset. In some examples, the network offset manager 1240 may determine a minimum offset between the DL radio frame timing structure and the UL radio frame timing structure, where the TA is determined based on the minimum offset.

Figure 13:
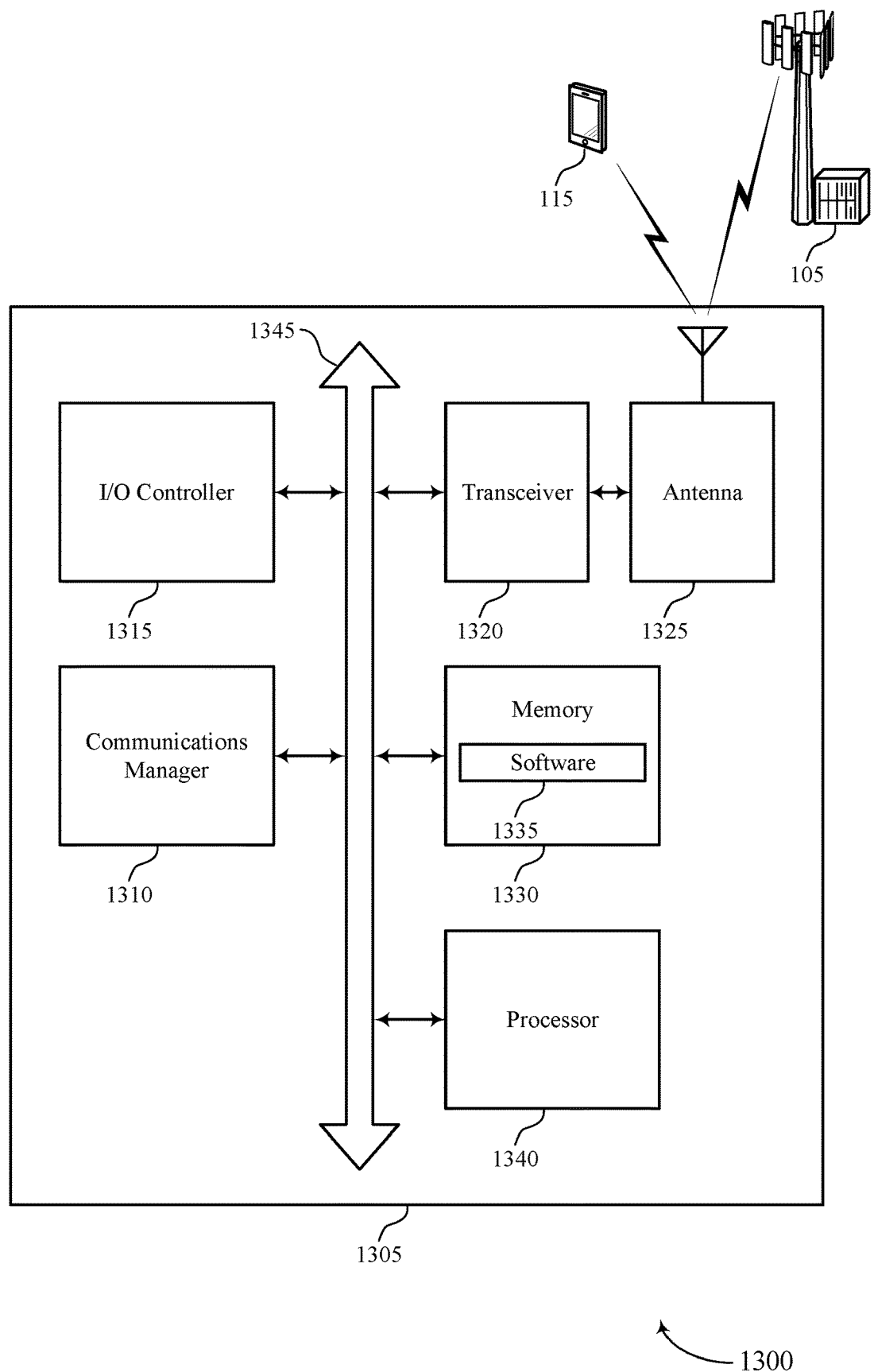

FIG. 13 shows a diagram of a system 1300 including a device 1305 that supports timing improvements for wireless communications systems in accordance with one or more aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive, from a base station, an indication of a scheduling offset between a DL radio frame timing structure and an UL radio frame timing structure, and transmit an UL message to the base station based on a TA, the TA based on the received indication of the scheduling offset.

The communications manager 1310 may also receive, from a base station, a random access response message including a fractional TA. The communications manager 1310 may transmit, to the base station in response to the random access response message, a second random access message including a differential offset between a first slot boundary associated with a base station radio frame timing structure and a second slot boundary associated with a UE radio frame timing structure.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code or software 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting timing improvements for wireless communications systems).

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
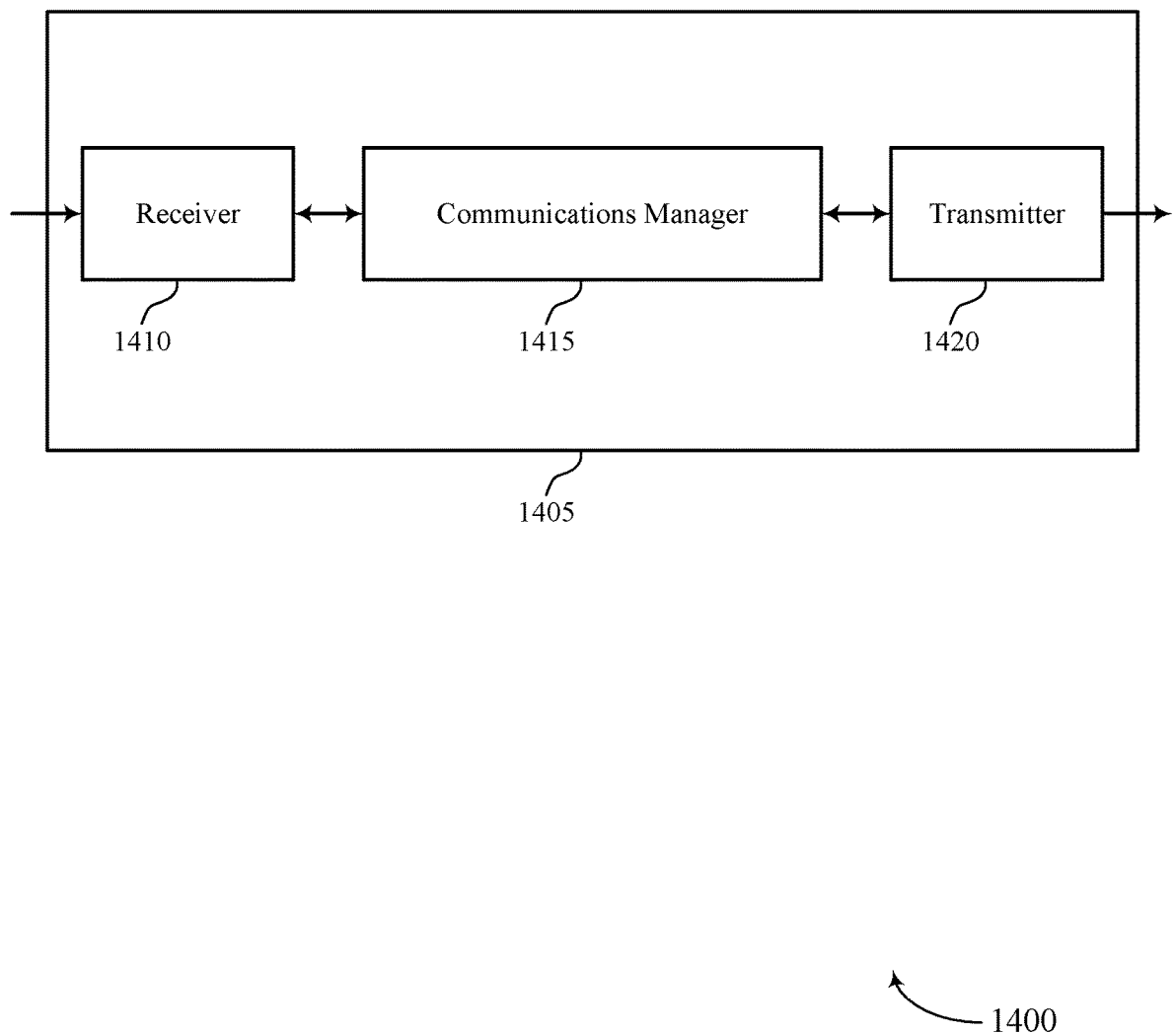

FIG. 14 shows a block diagram 1400 of a device 1405 that supports timing improvements for wireless communications systems in accordance with one or more aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to timing improvements for wireless communications systems, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit, to the UE, an indication of a scheduling offset between a DL radio frame timing structure and an UL radio frame timing structure, and receive an UL message from the UE based on a range of TA values, the range of TA values based on the scheduling offset. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1415 may be an example of means for performing various aspects of timing determination procedures as described herein. The communications manager 1415, or its sub-components, may be implemented in hardware (e.g., in communications management circuitry). The circuitry may comprise one or more of a processor, a DSP, an ASIC, a FPGA or other programmable logic device, discrete gate or transistor logic, discrete hardware components, or any combination thereof designed to perform the functions described in the present disclosure.

In another implementation, the communications manager 1415, or its sub-components, may be implemented in code (e.g., as communications management software or firmware) executed by a processor, or any combination thereof. If implemented in code executed by a processor, the functions of the communications manager 1415, or its sub-components may be executed by a general-purpose processor, a DSP, an ASIC, an FPGA or other programmable logic device.

In some examples, the communications manager 1415 may be configured to perform various operations (e.g., receiving, transmitting) using or otherwise in cooperation with the receiver 1010, the transmitter 1020, or both.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The described techniques, such as those described with reference to communications manager 1415, may support reliable NTN timing alignment of communications between a base station or satellite and one or more UEs served by the base station or satellite. For instance, the described techniques may provide for reliable estimation of timing offsets, and reliable estimation of TA values for UL, etc. relating to communications between high-altitude vehicles (e.g., satellites or other non-terrestrial-based equipment), user terminals, and gateways, in NTNs. As such, supported techniques may include features for efficient NTNs and efficient non-terrestrial communications. The described techniques may also support increased spectral efficiency and, in some examples, may promote higher mobility support for user terminals in NTNs compared to terrestrial networks.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
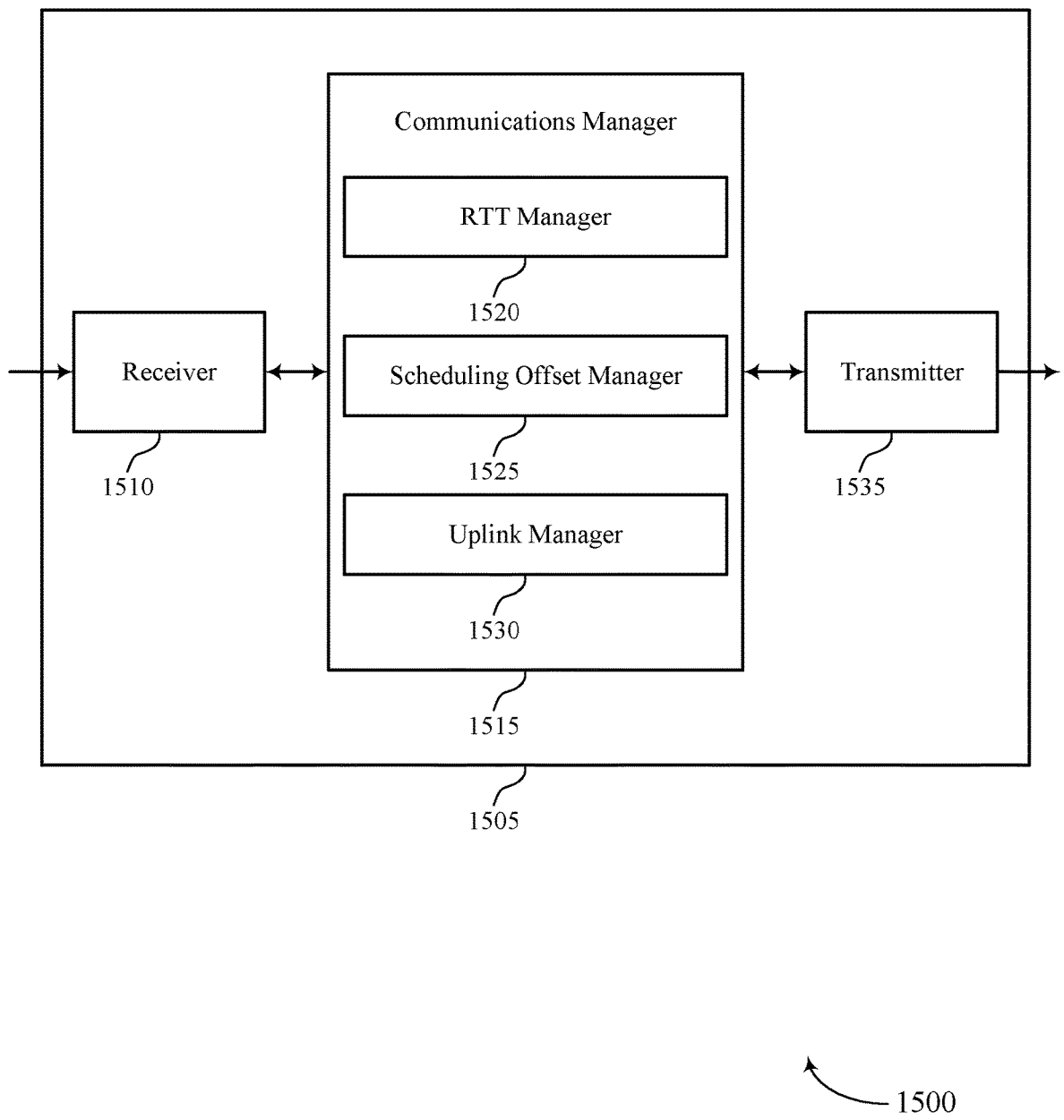

FIG. 15 shows a block diagram 1500 of a device 1505 that supports timing improvements for wireless communications systems in accordance with one or more aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to timing improvements for wireless communications systems, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a RTT manager 1520, a scheduling offset manager 1525, and an uplink manager 1530. The communications manager 1515 may be an example of aspects of the communications manager 1710 described herein.

The RTT manager 1520 may determine a minimum RTT for communications with a UE. The scheduling offset manager 1525 may transmit, to the UE, an indication of a scheduling offset between a DL radio frame timing structure and an UL radio frame timing structure. The uplink manager 1530 may receive an UL message from the UE based on a range of TA values, the range of TA values based on the scheduling offset.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
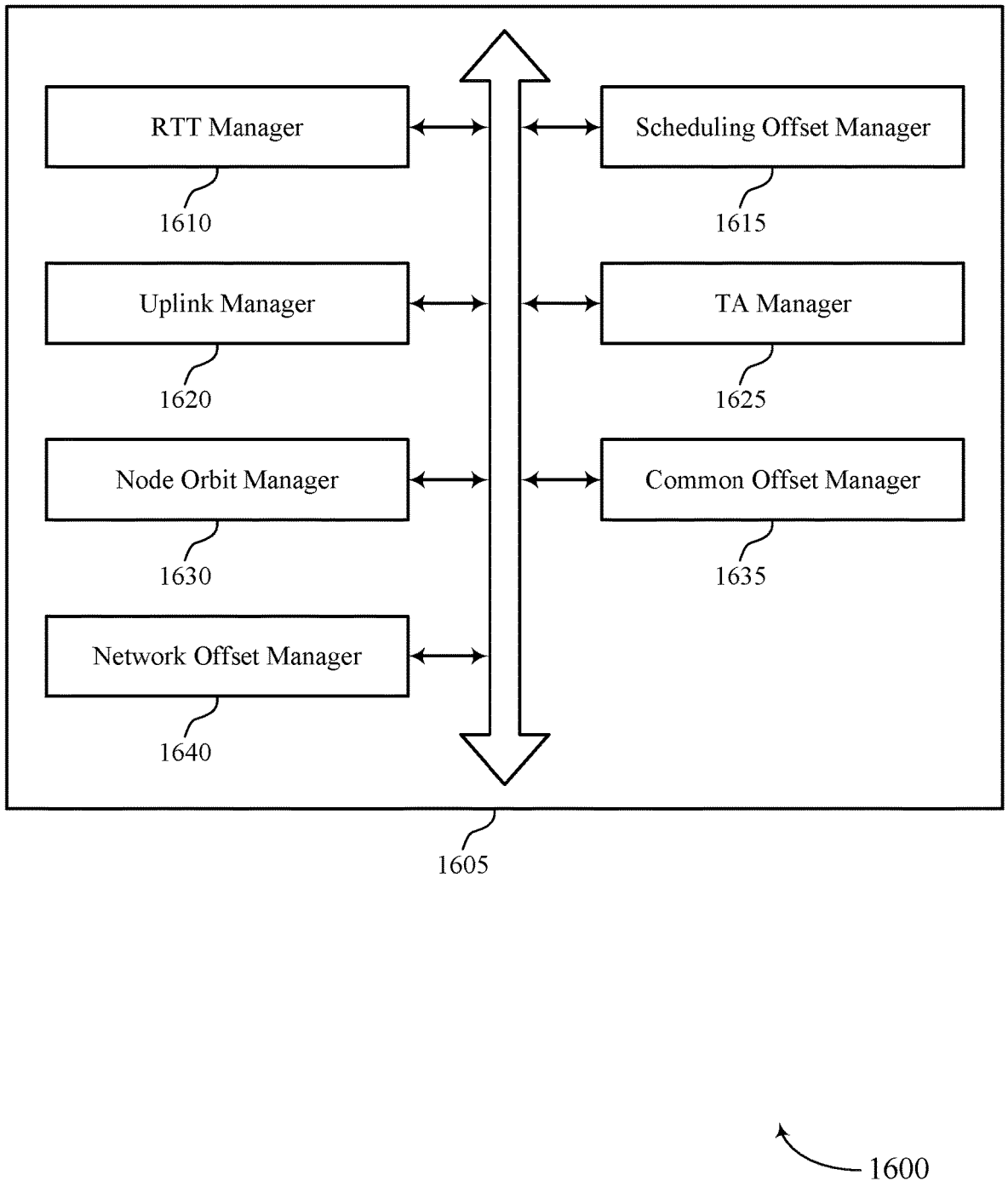

FIG. 16 shows a block diagram 1600 of a communications manager 1605 that supports timing improvements for wireless communications systems in accordance with one or more aspects of the present disclosure. The communications manager 1605 may be an example of aspects of a communications manager 1415, a communications manager 1515, or a communications manager 1710 described herein. The communications manager 1605 may include a RTT manager 1610, a scheduling offset manager 1615, an uplink manager 1620, a TA manager 1625, a node orbit manager 1630, a common offset manager 1635, and a network offset manager 1640. Each of these modules may communicate, directly or indirectly, with one another (e.g., via one or more buses).

The RTT manager 1610 may determine a minimum RTT for communications with a UE.

The scheduling offset manager 1615 may transmit, to the UE, an indication of a scheduling offset between a DL radio frame timing structure and an UL radio frame timing structure. In some examples, the scheduling offset manager 1615 may determine a minimum offset between the DL radio frame timing structure and the UL radio frame timing structure, where the TA is determined based on the minimum offset.

The uplink manager 1620 may receive an UL message from the UE based on a range of TA values, the range of TA values based on the scheduling offset. In some examples, the uplink manager 1620 may receive a PRACH message from the UE based on the initial TA.

The TA manager 1625 may determine a range of TA values based on the scheduling offset, where the UL message is received from the UE based on the range. In some examples, the TA manager 1625 may determine a TA threshold, where the TA is determined based on the TA threshold. In some examples, the TA manager 1625 may determine an initial TA based on the minimum offset. In some cases, the TA threshold is determined based on one or more of a slot duration, a radio frame numerology, and a buffering capability of the UE.

The node orbit manager 1630 may determine an orbit type associated with the base station, where the range is determined based on the orbit type.

The common offset manager 1635 may determine a common offset associated with a cell served by the base station. In some examples, the common offset manager 1635 may transmit an indication of the common offset to the UE, where the UL message is received from the UE based on the common offset.

The network offset manager 1640 may determine a network offset between a network DL radio frame timing structure and a network UL radio frame timing structure, where the UL message is received from the UE based on the network offset. In some examples, the network offset manager 1640 may transmit an indication of the network offset to the UE.

Figure 17:
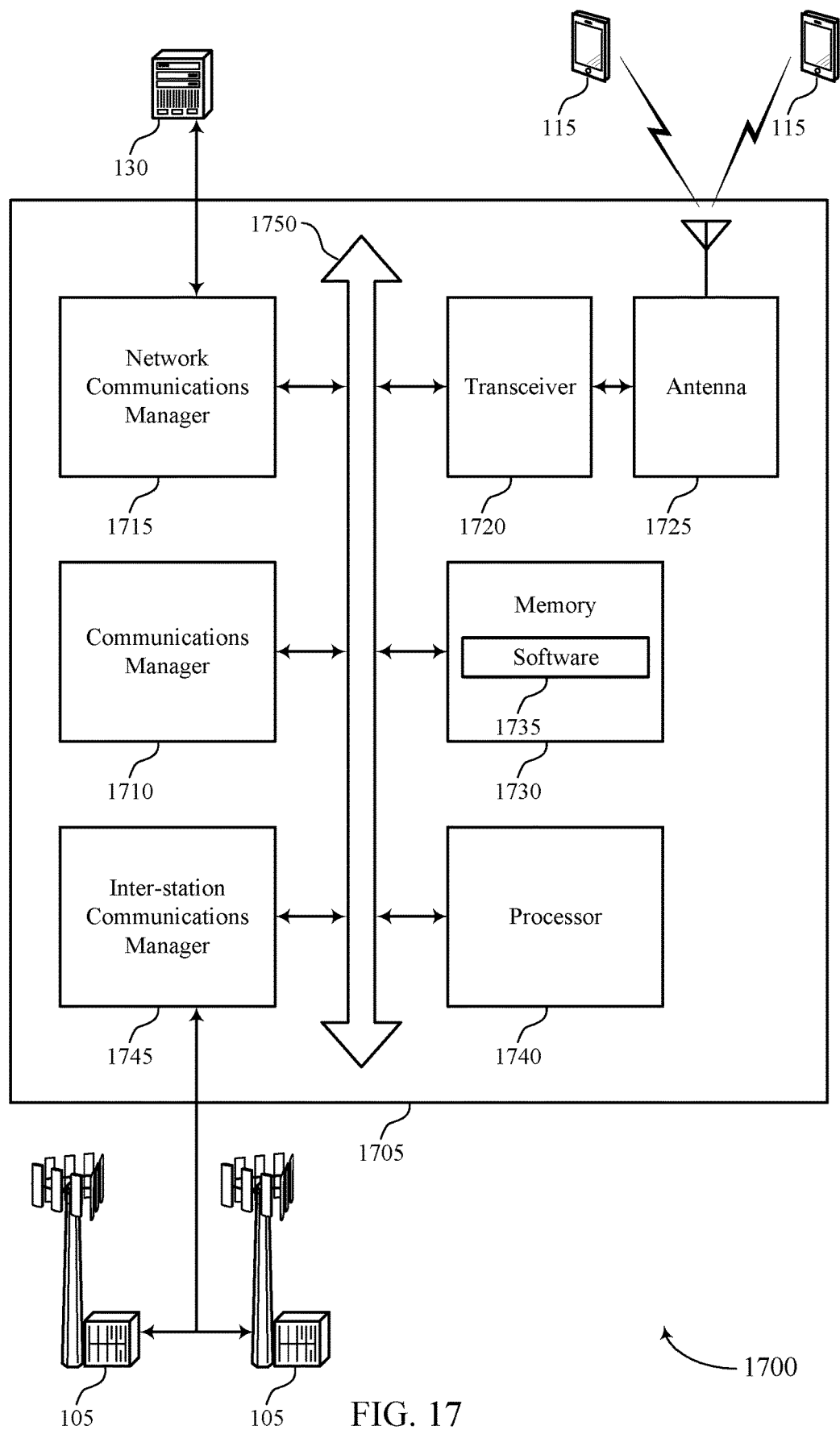

FIG. 17 shows a diagram of a system 1700 including a device 1705 that supports timing improvements for wireless communications systems in accordance with one or more aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit, to the UE, an indication of a scheduling offset between a DL radio frame timing structure and an UL radio frame timing structure, and receive an UL message from the UE based on a range of TA values, the range of TA values based on the scheduling offset.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code or software 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting timing improvements for wireless communications systems).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The software 1735 may include instructions to implement aspects of the present disclosure, including instructions to support wireless communications. The software 1735 may be stored in a non-transitory computer-readable medium such as system memory or other type of memory. In some cases, the software 1735 may not be directly executable by the processor 1740 but may cause a computer (e.g., when compiled and executed) to perform functions described herein.

Figure 18:
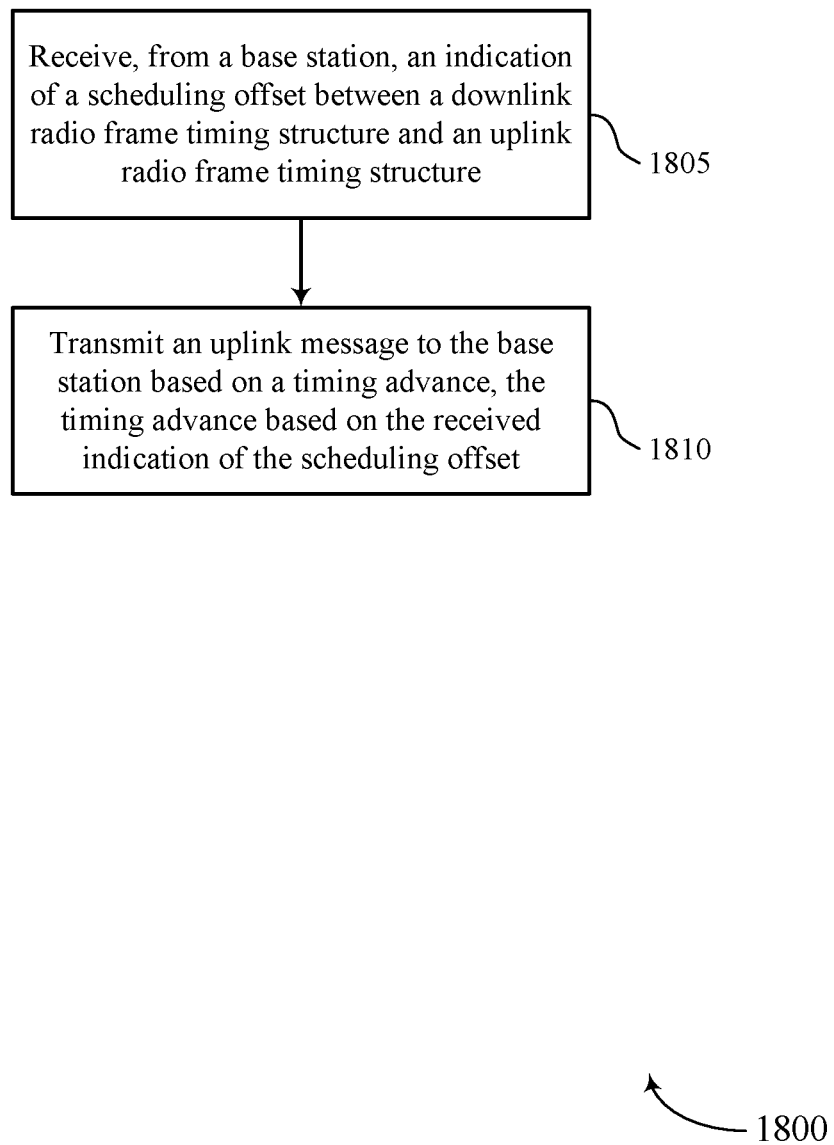

FIG. 18 shows a flowchart illustrating a method 1800 that supports timing improvements for wireless communications systems in accordance with one or more aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, an indication of a scheduling offset between a DL radio frame timing structure and an UL radio frame timing structure. The operations of 1805 may be performed according to the methods described herein. In some examples, aspects of the operations of 1805 may be performed by a scheduling offset manager as described with reference to FIGS. 10 through 13.

At 1810, the UE may transmit an UL message to the base station based on a TA, the TA based on the received indication of the scheduling offset. The operations of 1810 may be performed according to the methods described herein. In some examples, aspects of the operations of 1810 may be performed by an uplink manager as described with reference to FIGS. 10 through 13.

Figure 19:
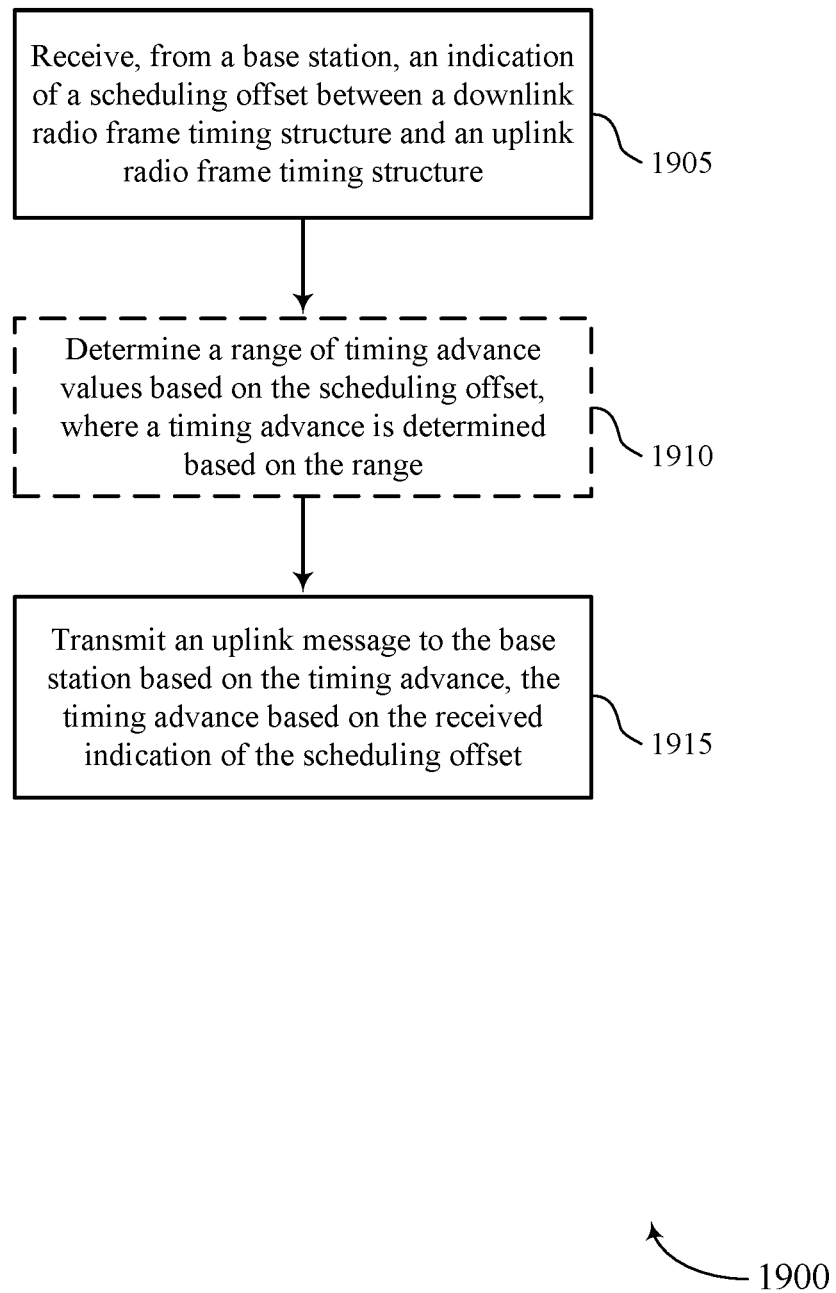

FIG. 19 shows a flowchart illustrating a method 1900 that supports timing improvements for wireless communications systems in accordance with one or more aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, an indication of a scheduling offset between a DL radio frame timing structure and an UL radio frame timing structure. The operations of 1905 may be performed according to the methods described herein. In some examples, aspects of the operations of 1905 may be performed by a scheduling offset manager as described with reference to FIGS. 10 through 13.

At 1910, the UE may determine a range of TA values based on the scheduling offset, where a TA is determined based on the range. The operations of 1910 may be performed according to the methods described herein. In some examples, aspects of the operations of 1910 may be performed by a TA manager as described with reference to FIGS. 10 through 13.

At 1915, the UE may transmit an UL message to the base station based on the TA, the TA based on the received indication of the scheduling offset. The operations of 1915 may be performed according to the methods described herein. In some examples, aspects of the operations of 1915 may be performed by an uplink manager as described with reference to FIGS. 10 through 13.

Figure 20:
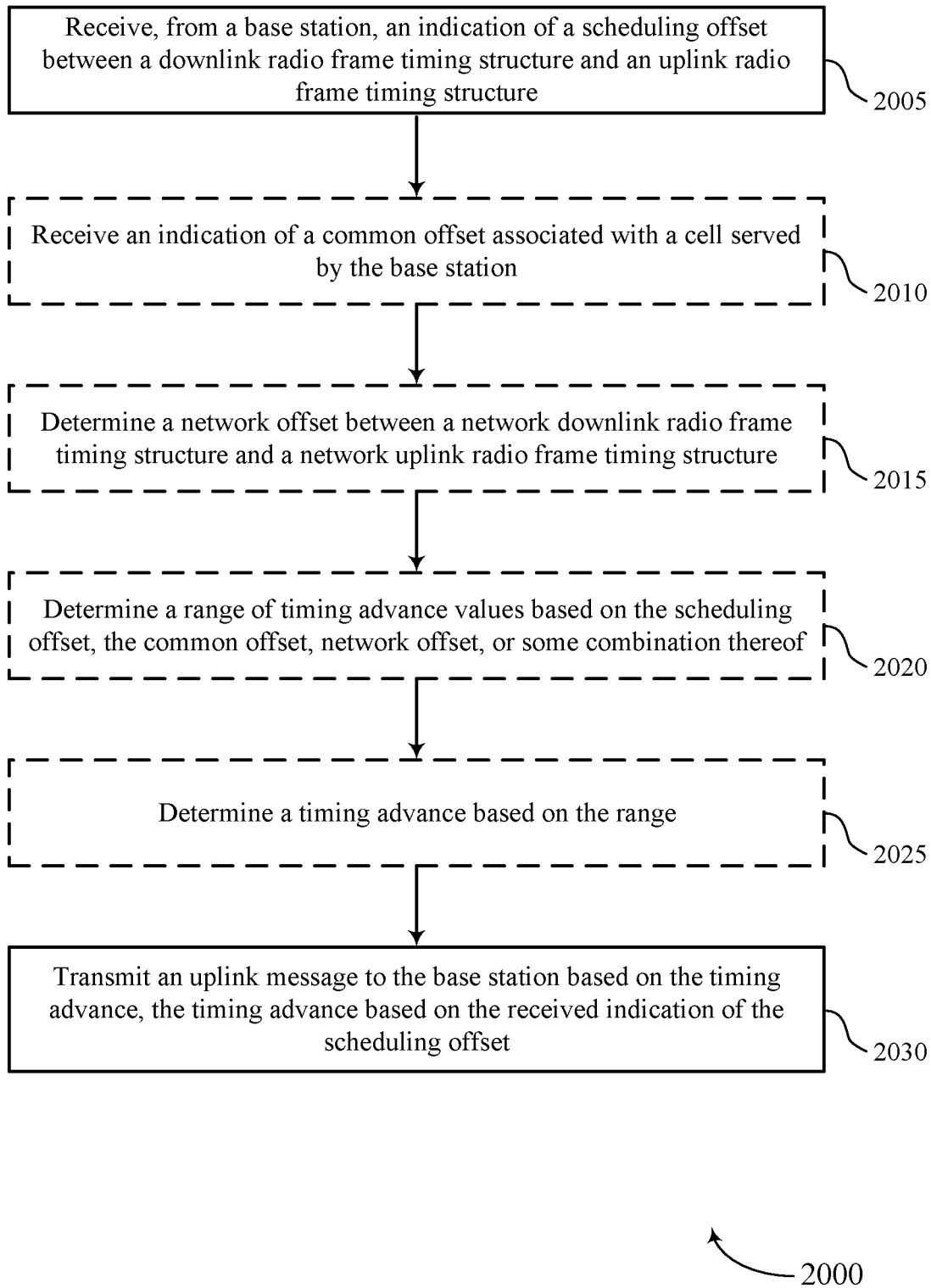

FIG. 20 shows a flowchart illustrating a method 2000 that supports timing improvements for wireless communications systems in accordance with one or more aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, an indication of a scheduling offset between a DL radio frame timing structure and an UL radio frame timing structure. The operations of 2005 may be performed according to the methods described herein. In some examples, aspects of the operations of 2005 may be performed by a scheduling offset manager as described with reference to FIGS. 10 through 13.

At 2010, the UE may receive an indication of a common offset associated with a cell served by the base station, where the TA is determined based on the common offset. The operations of 2010 may be performed according to the methods described herein. In some examples, aspects of the operations of 2010 may be performed by a common offset manager as described with reference to FIGS. 10 through 13.

At 2015, the UE may determine a network offset between a network DL radio frame timing structure and a network UL radio frame timing structure, where the TA is determined based on the network offset. The operations of 2015 may be performed according to the methods described herein. In some examples, aspects of the operations of 2015 may be performed by a network offset manager as described with reference to FIGS. 10 through 13.

At 2020, the UE may determine a range of TA values based on the scheduling offset, the common offset, network offset, or some combination thereof. For example, the UE may determine a range of TA values based on a delta value, an upper TA limit, a TA threshold, etc. in accordance with the techniques described herein (e.g., which may be specified or configured by the network). The operations of 2020 may be performed according to the methods described herein. In some examples, aspects of the operations of 2020 may be performed by a TA manager as described with reference to FIGS. 10 through 13.

At 2025, the UE may determine a TA based on the range. For example, the UE may determine a TA based on the scheduling offset and the determined RTT (e.g., while adhering to the range determined at 2025). The operations of 2025 may be performed according to the methods described herein. In some examples, aspects of the operations of 2025 may be performed by a TA manager as described with reference to FIGS. 10 through 13.

At 2030, the UE may transmit an UL message to the base station based on the TA, the TA based on the received indication of the scheduling offset. The operations of 2030 may be performed according to the methods described herein. In some examples, aspects of the operations of 2030 may be performed by an uplink manager as described with reference to FIGS. 10 through 13.

Figure 21:
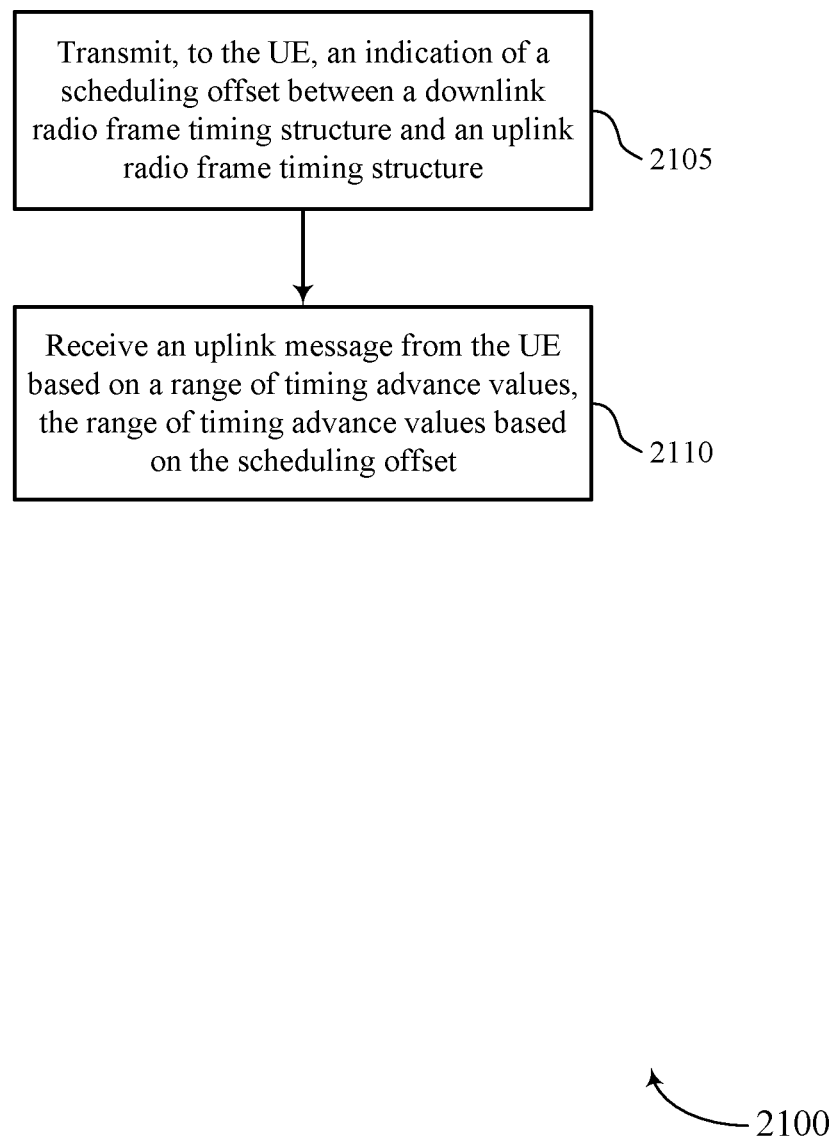

FIG. 21 shows a flowchart illustrating a method 2100 that supports timing improvements for wireless communications systems in accordance with one or more aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may transmit, to the UE, an indication of a scheduling offset between a DL radio frame timing structure and an UL radio frame timing structure. The operations of 21105 may be performed according to the methods described herein. In some examples, aspects of the operations of 2105 may be performed by a scheduling offset manager as described with reference to FIGS. 14 through 17.

At 2110, the base station may receive an UL message from the UE based on a range of TA values, the range of TA values based on the scheduling offset. The operations of 2110 may be performed according to the methods described herein. In some examples, aspects of the operations of 2110 may be performed by an uplink manager as described with reference to FIGS. 14 through 17.

Figure 22:
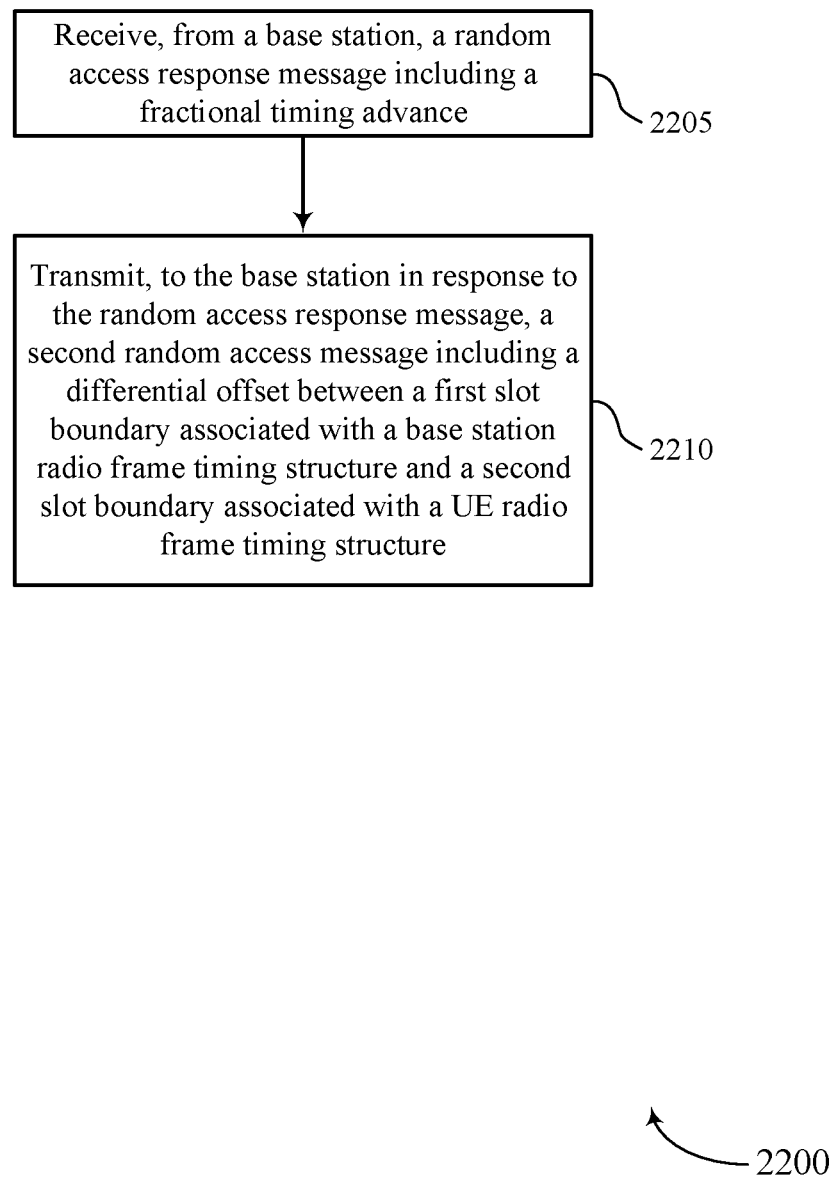

FIG. 22 shows a flowchart illustrating a method 2200 that supports timing improvements for wireless communications systems in accordance with one or more aspects of the present disclosure. The operations of method 2200 may be implemented by a UE 115 or its components as described herein. For example, the operations of method 2200 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, a random access response message including a fractional TA. The operations of 2205 may be performed according to the methods described herein. In some examples, aspects of the operations of 2205 may be performed by a RACH manager as described with reference to FIGS. 10 through 13.

At 2210, the UE may transmit, to the base station in response to the random access response message, a second random access message including a differential offset between a first slot boundary associated with a base station radio frame timing structure and a second slot boundary associated with a UE radio frame timing structure. The operations of 2210 may be performed according to the methods described herein. In some examples, aspects of the operations of 2210 may be performed by a RACH manager as described with reference to FIGS. 10 through 13.

Figure 23:
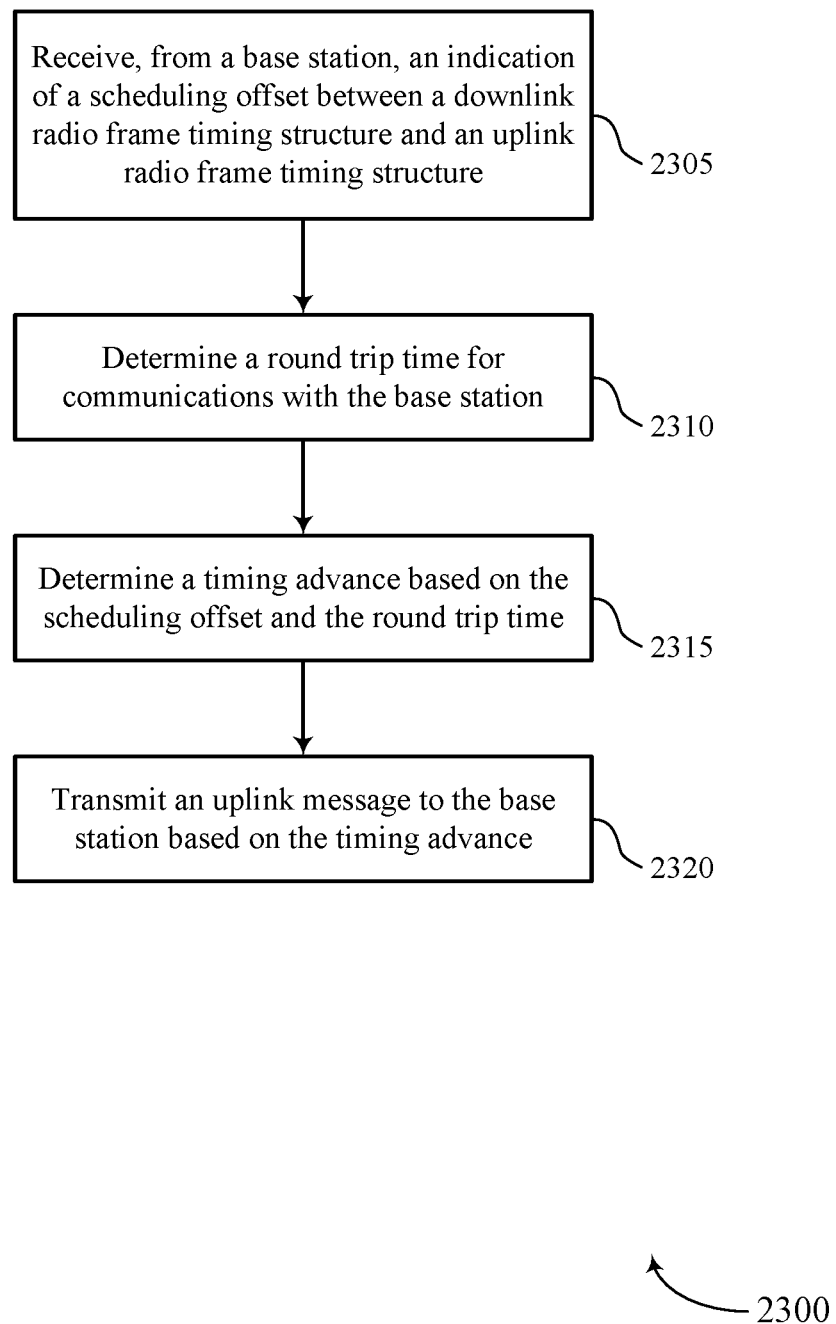

FIG. 23 shows a flowchart illustrating a method 2300 that supports timing improvements for wireless communications systems in accordance with one or more aspects of the present disclosure. The operations of method 2300 may be implemented by a UE 115 or its components as described herein. For example, the operations of method 2300 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2305, the UE may receive, from a base station, an indication of a scheduling offset between a downlink radio frame timing structure and an uplink radio frame timing structure. The operations of 2305 may be performed according to the methods described herein. In some examples, aspects of the operations of 2305 may be performed by a scheduling offset manager as described with reference to FIGS. 10 through 13.

At 2310, the UE may determine a round trip time for communications with the base station. The operations of 2310 may be performed according to the methods described herein. In some examples, aspects of the operations of 2310 may be performed by a RTT manager as described with reference to FIGS. 10 through 13.

At 2315, the UE may determine a timing advance based on the scheduling offset and the round trip time. The operations of 2315 may be performed according to the methods described herein. In some examples, aspects of the operations of 2315 may be performed by a TA manager as described with reference to FIGS. 10 through 13.

At 2320, the UE may transmit an uplink message to the base station based on the timing advance. The operations of 2320 may be performed according to the methods described herein. In some examples, aspects of the operations of 2320 may be performed by an uplink manager as described with reference to FIGS. 10 through 13.

Figure 24:
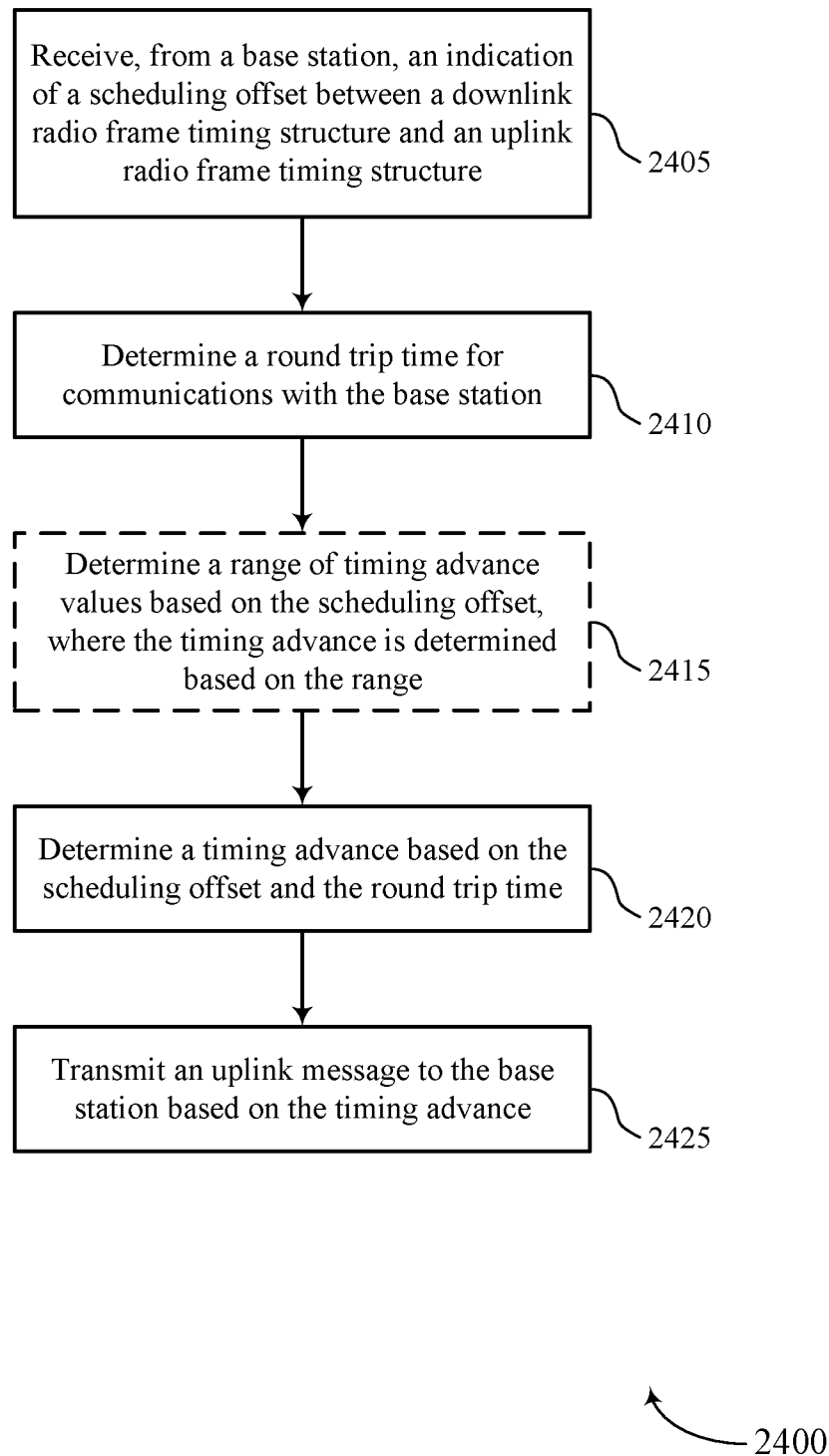

FIG. 24 shows a flowchart illustrating a method 2400 that supports timing improvements for wireless communications systems in accordance with one or more aspects of the present disclosure. The operations of method 2400 may be implemented by a UE 115 or its components as described herein. For example, the operations of method 2400 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2405, the UE may receive, from a base station, an indication of a scheduling offset between a downlink radio frame timing structure and an uplink radio frame timing structure. The operations of 2405 may be performed according to the methods described herein. In some examples, aspects of the operations of 2405 may be performed by a scheduling offset manager as described with reference to FIGS. 10 through 13.

At 2410, the UE may determine a round trip time for communications with the base station. The operations of 2410 may be performed according to the methods described herein. In some examples, aspects of the operations of 2410 may be performed by a RTT manager as described with reference to FIGS. 10 through 13.

At 2415, the UE may determine a range of timing advance values based on the scheduling offset, where the timing advance is determined based on the range. The operations of 2415 may be performed according to the methods described herein. In some examples, aspects of the operations of 2415 may be performed by a TA manager as described with reference to FIGS. 10 through 13.

At 2420, the UE may determine a timing advance based on the scheduling offset and the round trip time. The operations of 2420 may be performed according to the methods described herein. In some examples, aspects of the operations of 2420 may be performed by a TA manager as described with reference to FIGS. 10 through 13.

At 2425, the UE may transmit an uplink message to the base station based on the timing advance. The operations of 2425 may be performed according to the methods described herein. In some examples, aspects of the operations of 2425 may be performed by an uplink manager as described with reference to FIGS. 10 through 13.

Figure 25:
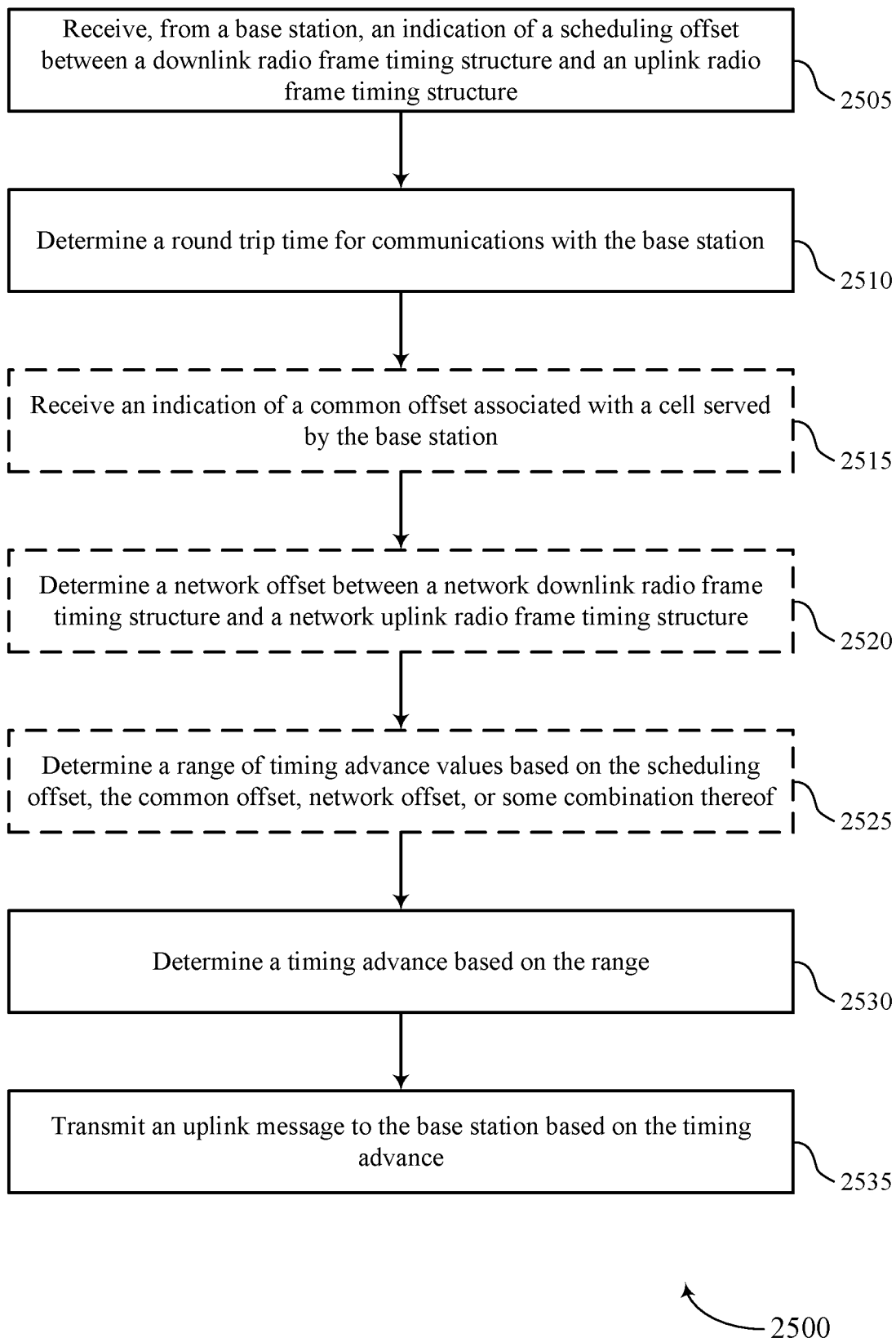

FIG. 25 shows a flowchart illustrating a method 2500 that supports timing improvements for wireless communications systems in accordance with one or more aspects of the present disclosure. The operations of method 2500 may be implemented by a UE 115 or its components as described herein. For example, the operations of method 2500 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2505, the UE may receive, from a base station, an indication of a scheduling offset between a downlink radio frame timing structure and an uplink radio frame timing structure. The operations of 2505 may be performed according to the methods described herein. In some examples, aspects of the operations of 2505 may be performed by a scheduling offset manager as described with reference to FIGS. 10 through 13.

At 2510, the UE may determine a round trip time for communications with the base station. The operations of 2510 may be performed according to the methods described herein. In some examples, aspects of the operations of 2510 may be performed by a RTT manager as described with reference to FIGS. 10 through 13.

At 2515, the UE may receive an indication of a common offset associated with a cell served by the base station, where the timing advance is determined based on the common offset. The operations of 2515 may be performed according to the methods described herein. In some examples, aspects of the operations of 2515 may be performed by a common offset manager as described with reference to FIGS. 10 through 13.

At 2520, the UE may determine a network offset between a network downlink radio frame timing structure and a network uplink radio frame timing structure, where the timing advance is determined based on the network offset. The operations of 2520 may be performed according to the methods described herein. In some examples, aspects of the operations of 2520 may be performed by a network offset manager as described with reference to FIGS. 10 through 13.

At 2525, the UE may determine a range of timing advance values based on the scheduling offset, the common offset, network offset, or some combination thereof. For example, the UE may determine a range of timing advance values based on a delta value, an upper timing advance limit, a timing advance threshold, etc. in accordance with the techniques described herein (e.g., which may be specified or configured by the network). The operations of 2525 may be performed according to the methods described herein. In some examples, aspects of the operations of 2525 may be performed by a TA manager as described with reference to FIGS. 10 through 13.

At 2530, the UE may determine a timing advance based on the range. For example, the UE may determine a timing advance based on the scheduling offset and the determined round trip time (e.g., while adhering to the range determined at 2525). The operations of 2530 may be performed according to the methods described herein. In some examples, aspects of the operations of 2530 may be performed by a TA manager as described with reference to FIGS. 10 through 13.

At 2535, the UE may transmit an uplink message to the base station based on the timing advance. The operations of 2535 may be performed according to the methods described herein. In some examples, aspects of the operations of 2535 may be performed by an uplink manager as described with reference to FIGS. 10 through 13.

Figure 26:
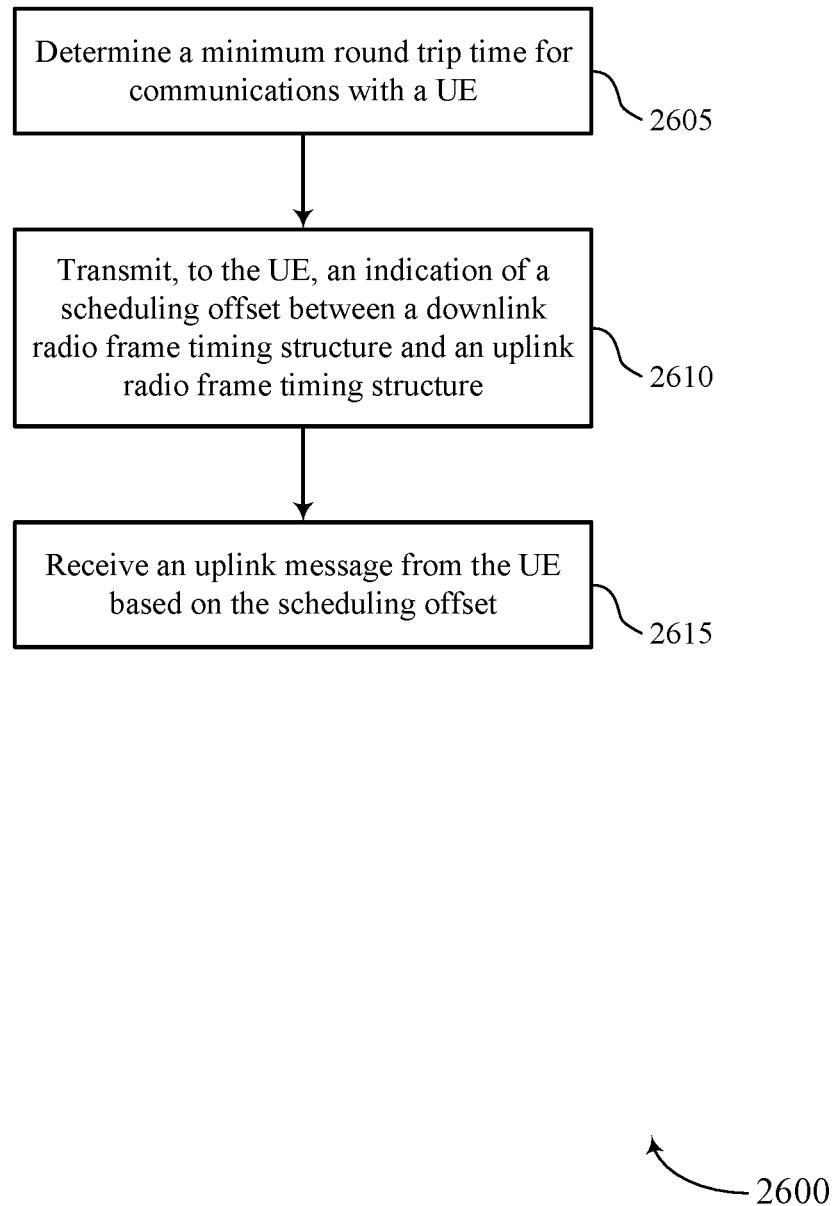

FIG. 26 shows a flowchart illustrating a method 2600 that supports timing improvements for wireless communications systems in accordance with one or more aspects of the present disclosure. The operations of method 2600 may be implemented by a base station 105 or its components as described herein. For example, the operations of method 2600 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2605, the base station may determine a minimum round trip time for communications with a UE. The operations of 2605 may be performed according to the methods described herein. In some examples, aspects of the operations of 2605 may be performed by a RTT manager as described with reference to FIGS. 14 through 17.

At 2610, the base station may transmit, to the UE, an indication of a scheduling offset between a downlink radio frame timing structure and an uplink radio frame timing structure. The operations of 2610 may be performed according to the methods described herein. In some examples, aspects of the operations of 2610 may be performed by a scheduling offset manager as described with reference to FIGS. 14 through 17.

At 2615, the base station may receive an uplink message from the UE based on the scheduling offset. The operations of 2615 may be performed according to the methods described herein. In some examples, aspects of the operations of 2615 may be performed by an uplink manager as described with reference to FIGS. 14 through 17.

Figure 27:
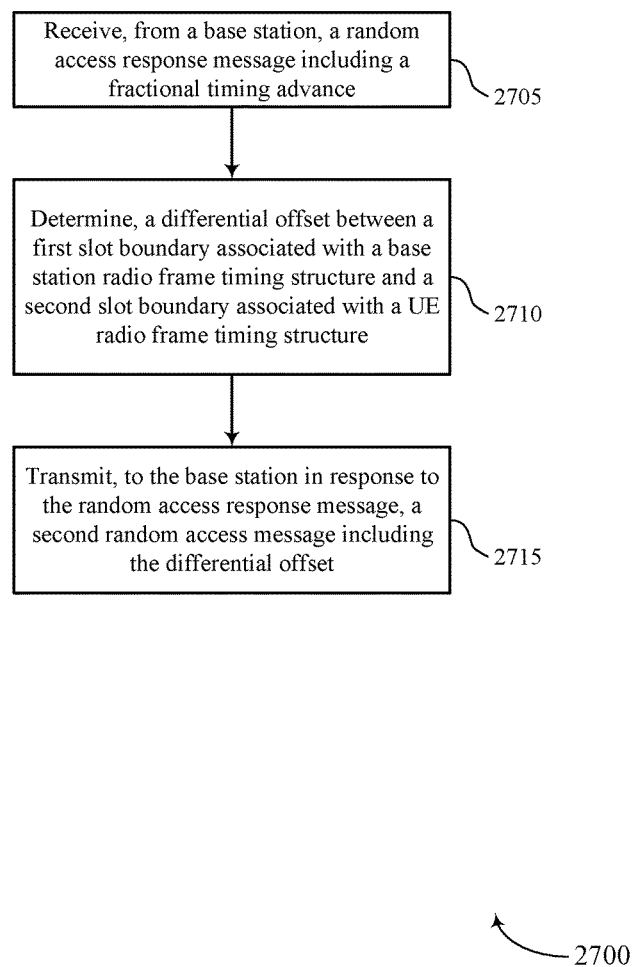

FIG. 27 shows a flowchart illustrating a method 2700 that supports timing improvements for wireless communications systems in accordance with one or more aspects of the present disclosure. The operations of method 2700 may be implemented by a UE 115 or its components as described herein. For example, the operations of method 2700 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2705, the UE may receive, from a base station, a random access response message including a fractional timing advance. The operations of 2705 may be performed according to the methods described herein. In some examples, aspects of the operations of 2705 may be performed by a RACH manager as described with reference to FIGS. 10 through 13.

At 2710, the UE may determine a differential offset between a first slot boundary associated with a base station radio frame timing structure and a second slot boundary associated with a UE radio frame timing structure. The operations of 2710 may be performed according to the methods described herein. In some examples, aspects of the operations of 2710 may be performed by a differential offset manager as described with reference to FIGS. 10 through 13.

At 2715, the UE may transmit, to the base station in response to the random access response message, a second random access message including the differential offset. The operations of 2715 may be performed according to the methods described herein. In some examples, aspects of the operations of 2715 may be performed by a RACH manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The following provides an overview of aspects of the present disclosure:

Aspect 1: A method for wireless communication, comprising: receiving, from a base station, an indication of a scheduling offset between a downlink radio frame timing structure and an uplink radio frame timing structure, and transmitting an uplink message to the base station based on a timing advance, the timing advance based at least in part on the received indication of the scheduling offset.

Aspect 2: The method of aspect 1, further comprising: determining a range of timing advance values based on the scheduling offset, where the timing advance may be determined based on the range.

Aspect 3: The method of any one of aspects 1 through 2, further comprising: determining an orbit type associated with the base station, wherein the range is determined based at least in part on the orbit type.

Aspect 4: The method of any one of aspects 1 through 3, further comprising: determining a timing advance threshold, wherein the timing advance is determined based at least in part on the timing advance threshold.

Aspect 5: The method of any one of aspects 1 through 4, wherein the timing advance threshold is determined based at least in part on one or more of a slot duration, a radio frame numerology, and a buffering capability of the UE.

Aspect 6: The method of any one of aspects 1 through 5, further comprising: receiving an indication of a common offset associated with a cell served by the base station, wherein the timing advance is determined based at least in part on the common offset.

Aspect 7: The method of any one of aspects 1 through 6, further comprising: determining a range of timing advance values based at least in part on the common offset, wherein the timing advance is determined based at least in part on the range.

Aspect 8: The method of any one of aspects 1 through 7, wherein the timing advance is based at least in part on a round trip time for communications with the base station.

Aspect 9: The method of aspect 8, wherein the round trip time for communications with the base station is determined based at least in part on one or more of a position of the UE, a position of the base station, a distance between the UE and the base station, a timestamp corresponding to a downlink message received from the base station, and a local timestamp.

Aspect 10: The method of any one of aspects 1 through 9, further comprising: determining a network offset between a network downlink radio frame timing structure and a network uplink radio frame timing structure, wherein the timing advance is determined based at least in part on the network offset.

Aspect 11: The method of any one of aspects 1 through 10, further comprising: determining a range of timing advance values based at least in part on the network offset, wherein the timing advance is determined based at least in part on the range Aspect 12: The method of any one of aspects 1 through 11, further comprising: receiving an indication of the network offset, wherein the network offset is determined based on the indication of the network offset Aspect 13: The method of any one of aspects 1 through 12, further comprising: determining a minimum offset between the downlink radio frame timing structure and the uplink radio frame timing structure, wherein the timing advance is determined based at least in part on the minimum offset Aspect 14: The method of any one of aspects 1 through 13, further comprising: determining an initial timing advance based at least in part on the minimum offset and transmitting a physical random access channel message based at least in part on the initial timing advance.

Aspect 15: The method of any one of aspects 1 through 14, wherein the scheduling offset is based at least in part on a non-terrestrial network.

Aspect 16: An apparatus for wireless communications comprising at least one means for performing a method of any one of aspects 1 through 15.

Aspect 17: An apparatus for wireless communication comprising a processor, and memory coupled to the processor, the processor and memory configured to perform a method of any one of aspects 1 through 15.

Aspect 18: A non-transitory computer-readable medium storing code for wireless communication comprising a processor, memory in electronic communication with the processor, and instructions stored in the memory and executable by the processor to cause the apparatus to perform a method of any one of aspects 1 through 15.

Aspect 19: A method for wireless communication, comprising: transmitting, to the UE, an indication of a scheduling offset between a downlink radio frame timing structure and an uplink radio frame timing structure, and receiving an uplink message from the UE based at least in part on a range of timing advance values, the range of timing advance values based at least in part on the scheduling offset.

Aspect 20: The method of aspect 19, further comprising: determining the range of timing advance values based at least in part on the scheduling offset, wherein the uplink message is received from the UE based at least in part on the range.

Aspect 21: The method of any one of aspects 19 through 20, further comprising: determining an orbit type associated with the base station, wherein the range is determined based at least in part on the orbit type.

Aspect 22: The method of any one of aspects 19 through 21, further comprising: determining a timing advance threshold, wherein a timing advance is determined based at least in part on the timing advance threshold.

Aspect 23: The method of any one of aspects 19 through 22, wherein the timing advance threshold is determined based at least in part on one or more of a slot duration, a radio frame numerology, and a buffering capability of the UE Aspect 24: The method of any one of aspects 19 through 23, further comprising: determining a common offset associated with a cell served by the base station and transmitting an indication of the common offset to the UE, wherein the uplink message is received from the UE based at least in part on the common offset.

Aspect 25: The method of any one of aspects 19 through 24, further comprising: determining a network offset between a network downlink radio frame timing structure and a network uplink radio frame timing structure, wherein the uplink message is received from the UE based at least in part on the network offset.

Aspect 26: The method of any one of aspects 19 through 25, further comprising: transmitting an indication of the network offset to the UE.

Aspect 27: The method of any one of aspects 19 through 26, further comprising: determining a minimum offset between the downlink radio frame timing structure and the uplink radio frame timing structure, wherein a timing advance is determined based at least in part on the minimum offset.

Aspect 28: The method of any one of aspects 19 through 27, further comprising: determining an initial timing advance based at least in part on the minimum offset and receiving a physical random access channel message from the UE based at least in part on the initial timing advance.

Aspect 29: The method of any one of aspects 19 through 28, wherein the scheduling offset is based at least in part on a non-terrestrial network.

Aspect 30: An apparatus for wireless communications comprising at least one means for performing a method of any one of aspects 19 through 29.

Aspect 31: An apparatus for wireless communication comprising a processor, and memory coupled to the processor, the processor and memory configured to perform a method of any one of aspects 19 through 29.

Aspect 32: A non-transitory computer-readable medium storing code for wireless communication comprising a processor, memory in electronic communication with the processor, and instructions stored in the memory and executable by the processor to cause the apparatus to perform a method of any one of aspects 19 through 29.

Aspect 33: A method for wireless communication, comprising: receiving, from a base station, a random access response message comprising a fractional timing advance, and transmitting, to the base station in response to the random access response message, a second random access message comprising a differential offset between a first slot boundary associated with a base station radio frame timing structure and a second slot boundary associated with a UE radio frame timing structure.

Aspect 34: The method of aspect 33, further comprising: determining a round trip time for communications with a base station, transmitting a first random access message to the base station based at least in part on the round trip time, wherein the random access response message is received based at least in part on transmitting the first random access message.

Aspect 35: The method of any one of aspects 33 through 34, further comprising: determining a scrambling sequence, a hopping pattern, or both based at least in part on the round trip time.

Aspect 36: The method of any one of aspects 33 through 35, further comprising: determining a timing advance based at least in part on the differential offset, and transmitting an uplink message to the base station based at least in part on the timing advance.

Aspect 37: The method of any one of aspects 33 through 36, further comprising: receiving, from the base station, an indication to shift the UE radio frame timing structure, and shifting the UE radio frame timing structure based at least in part on the indication, wherein the timing advance is determined based at least in part on the shifting Aspect 38: The method of any one of aspects 33 through 37, wherein the differential offset is determined based at least in part on the fractional timing advance.

Aspect 39: The method of any one of aspects 33 through 38, wherein the base station is associated with a non-terrestrial network.

Aspect 40: An apparatus for wireless communications comprising at least one means for performing a method of any one of aspects 33 through 39.

Aspect 41: An apparatus for wireless communication comprising a processor, and memory coupled to the processor, the processor and memory configured to perform a method of any one of aspects 33 through 39.

Aspect 42: A non-transitory computer-readable medium storing code for wireless communication comprising a processor, memory in electronic communication with the processor, and instructions stored in the memory and executable by the processor to cause the apparatus to perform a method of any one of aspects 33 through 39.

Aspect 43: A method for wireless communication, comprising: receiving, from a base station, an indication of a scheduling offset between a downlink radio frame timing structure and an uplink radio frame timing structure, determining a round trip time for communications with the base station, determining a timing advance based on the scheduling offset and the round trip time, and transmitting an uplink message to the base station based on the timing advance.

Aspect 44: The method of aspect 43, further comprising: determining a range of timing advance values based on the scheduling offset, where the timing advance may be determined based on the range.

Aspect 45: The method of any one of aspects 43 through 44, further comprising: determining an orbit type associated with the base station, wherein the range is determined based at least in part on the orbit type.

Aspect 46: The method of any one of aspects 43 through 45, further comprising: determining a timing advance threshold, wherein the timing advance is determined based at least in part on the timing advance threshold.

Aspect 47: The method of any one of aspects 43 through 46, wherein the timing advance threshold is determined based at least in part on one or more of a slot duration, a radio frame numerology, and a buffering capability of the UE.

Aspect 48: The method of any one of aspects 43 through 47, further comprising: receiving an indication of a common offset associated with a cell served by the base station, wherein the timing advance is determined based at least in part on the common offset.

Aspect 49: The method of any one of aspects 43 through 48, further comprising: determining a range of timing advance values based at least in part on the common offset, wherein the timing advance is determined based at least in part on the range.

Aspect 50: The method of any one of aspects 43 through 49, wherein the round trip time for communications with the base station is determined based at least in part on one or more of a position of the UE, a position of the base station, a distance between the UE and the base station, a timestamp corresponding to a downlink message received from the base station, and a local timestamp.

Aspect 51: The method of any one of aspects 43 through 50, further comprising: determining a network offset between a network downlink radio frame timing structure and a network uplink radio frame timing structure, wherein the timing advance is determined based at least in part on the network offset.

Aspect 52: The method of any one of aspects 43 through 51, further comprising: determining a range of timing advance values based at least in part on the network offset, wherein the timing advance is determined based at least in part on the range Aspect 53: The method of any one of aspects 43 through 52, further comprising: receiving an indication of the network offset, wherein the network offset is determined based on the indication of the network offset Aspect 54: The method of any one of aspects 43 through 53, further comprising: determining a minimum offset between the downlink radio frame timing structure and the uplink radio frame timing structure, wherein the timing advance is determined based at least in part on the minimum offset Aspect 55: The method of any one of aspects 43 through 54, further comprising: determining an initial timing advance based at least in part on the minimum offset and transmitting a physical random access channel message based at least in part on the initial timing advance.

Aspect 56: The method of any one of aspects 43 through 55, wherein the scheduling offset is based at least in part on a non-terrestrial network.

Aspect 57: An apparatus for wireless communications comprising at least one means for performing a method of any one of aspects 43 through 56.

Aspect 58: An apparatus for wireless communication comprising a processor, memory in electronic communication with the processor, and instructions stored in the memory and executable by the processor to cause the apparatus to perform a method of any one of aspects 43 through 56.

Aspect 59: A non-transitory computer-readable medium storing code for wireless communication comprising a processor, memory in electronic communication with the processor, and instructions stored in the memory and executable by the processor to cause the apparatus to perform a method of any one of aspects 43 through 56.

Aspect 60: A method for wireless communication, comprising: determining a minimum round trip time for communications with a UE, transmitting, to the UE, an indication of a scheduling offset between a downlink radio frame timing structure and an uplink radio frame timing structure, and receiving an uplink message from the UE based at least in part on the scheduling offset.

Aspect 61: The method of aspect 60, further comprising: determining a range of timing advance values based at least in part on the scheduling offset, wherein the uplink message is received from the UE based at least in part on the range.

Aspect 62: The method of any one of aspects 60 through 61, further comprising: determining an orbit type associated with the base station, wherein the range is determined based at least in part on the orbit type.

Aspect 63: The method of any one of aspects 60 through 62, further comprising: determining a timing advance threshold, wherein the timing advance is determined based at least in part on the timing advance threshold.

Aspect 64: The method of any one of aspects 60 through 63, wherein the timing advance threshold is determined based at least in part on one or more of a slot duration, a radio frame numerology, and a buffering capability of the UE Aspect 65: The method of any one of aspects 60 through 64, further comprising: determining a common offset associated with a cell served by the base station and transmitting an indication of the common offset to the UE, wherein the uplink message is received from the UE based at least in part on the common offset.

Aspect 66: The method of any one of aspects 60 through 65, further comprising: determining a network offset between a network downlink radio frame timing structure and a network uplink radio frame timing structure, wherein the uplink message is received from the UE based at least in part on the network offset.

Aspect 67: The method of any one of aspects 60 through 66, further comprising: transmitting an indication of the network offset to the UE.

Aspect 68: The method of any one of aspects 60 through 67, further comprising: determining a minimum offset between the downlink radio frame timing structure and the uplink radio frame timing structure, wherein the timing advance is determined based at least in part on the minimum offset.

Aspect 69: The method of any one of aspects 60 through 68, further comprising: determining an initial timing advance based at least in part on the minimum offset and receiving a physical random access channel message from the UE based at least in part on the initial timing advance.

Aspect 70: The method of any one of aspects 60 through 69, wherein the scheduling offset is based at least in part on a non-terrestrial network.

Aspect 71: An apparatus for wireless communications comprising at least one means for performing a method of any one of aspects 60 through 70.

Aspect 72: An apparatus for wireless communication comprising a processor, memory in electronic communication with the processor, and instructions stored in the memory and executable by the processor to cause the apparatus to perform a method of any one of aspects 60 through 70.

Aspect 73: A non-transitory computer-readable medium storing code for wireless communication comprising a processor, memory in electronic communication with the processor, and instructions stored in the memory and executable by the processor to cause the apparatus to perform a method of any one of aspects 60 through 70.

Aspect 74: A method for wireless communication, comprising: receiving, from a base station, a random access response message comprising a fractional timing advance, determining, a differential offset between a first slot boundary associated with a base station radio frame timing structure and a second slot boundary associated with a UE radio frame timing structure, and transmitting, to the base station in response to the random access response message, a second random access message comprising the differential offset.

Aspect 75: The method of aspect 74, further comprising: determining a round trip time for communications with a base station, transmitting a first random access message to the base station based at least in part on the round trip time, wherein the random access response message is received based at least in part on transmitting the first random access message.

Aspect 76: The method of any one of aspects 74 through 75, further comprising: determining a scrambling sequence, a hopping pattern, or both based at least in part on the round trip time.

Aspect 77: The method of any one of aspects 74 through 76, further comprising: determining a timing advance based at least in part on the differential offset, and transmitting an uplink message to the base station based at least in part on the timing advance.

Aspect 78: The method of any one of aspects 74 through 77, further comprising: receiving, from the base station, an indication to shift the UE radio frame timing structure, and shifting the UE radio frame timing structure based at least in part on the indication, wherein the timing advance is determined based at least in part on the shifting Aspect 79: The method of any one of aspects 74 through 78, wherein the differential offset is determined based at least in part on the fractional timing advance.

Aspect 80: The method of any one of aspects 74 through 79, wherein the base station is associated with a non-terrestrial network.

Aspect 81: An apparatus for wireless communications comprising at least one means for performing a method of any one of aspects 74 through 80.

Aspect 82: An apparatus for wireless communication comprising a processor, memory in electronic communication with the processor, and instructions stored in the memory and executable by the processor to cause the apparatus to perform a method of any one of aspects 74 through 80.

Aspect 83: A non-transitory computer-readable medium storing code for wireless communication comprising a processor, memory in electronic communication with the processor, and instructions stored in the memory and executable by the processor to cause the apparatus to perform a method of any one of aspects 74 through 80.

What is claimed is:

1. A method for wireless communication at a first user equipment (UE), comprising:
receiving, from a network device, an indication of a scheduling offset between a downlink radio frame timing structure and an uplink radio frame timing structure, wherein the scheduling offset is based at least in part on a first round trip time (RTT) value for communications between a second UE and the network device, and wherein the second UE is associated with a largest RTT value of any UEs in communication with the network device; and
transmitting an uplink message to the network device based at least in part on a timing advance, the timing advance based at least in part on the received indication of the scheduling offset.

2. The method of claim 1, further comprising:
determining a range of timing advance values based at least in part on the scheduling offset, wherein the timing advance is determined based at least in part on the range.

3. The method of claim 2, further comprising:
determining an orbit type associated with the network device, wherein the range is determined based at least in part on the orbit type.

4. The method of claim 1, further comprising:
determining a timing advance threshold, wherein the timing advance is determined based at least in part on the timing advance threshold.

5. The method of claim 4, wherein the timing advance threshold is determined based at least in part on one or more of a slot duration, a radio frame numerology, and a buffering capability of the first UE.

6. The method of claim 1, further comprising:
receiving an indication of a common offset associated with a cell served by the network device, wherein the timing advance is determined based at least in part on the common offset.

7. The method of claim 6, further comprising:
determining a range of timing advance values based at least in part on the common offset, wherein the timing advance is determined based at least in part on the range.

8. The method of claim 1, wherein the timing advance is based at least in part on a second RTT value for communications between the first UE and the network device.

9. The method of claim 8, wherein the second RTT value for communications with the network device is determined based at least in part on one or more of a position of the first UE, a position of the network device, a distance between the first UE and the network device, a timestamp corresponding to a downlink message received from the network device, and a local timestamp.

10. The method of claim 1, further comprising:
determining a network offset between a network downlink radio frame timing structure and a network uplink radio frame timing structure, wherein the timing advance is determined based at least in part on the network offset.

11. The method of claim 10, further comprising:
determining a range of timing advance values based at least in part on the network offset, wherein the timing advance is determined based at least in part on the range.

12. The method of claim 10, further comprising:
receiving an indication of the network offset, wherein the network offset is determined based on the indication of the network offset.

13. The method of claim 10, further comprising:
determining a minimum offset between the downlink radio frame timing structure and the uplink radio frame timing structure, wherein the timing advance is determined based at least in part on the minimum offset.

14. The method of claim 13, further comprising:
determining an initial timing advance based at least in part on the minimum offset; and
transmitting a physical random access channel message based at least in part on the initial timing advance.

15. The method of claim 1, wherein the scheduling offset is based at least in part on a non-terrestrial network.

16. The method of claim 1, wherein the second UE is a worst-case UE of the UEs in communication with the network device based at least in part on the first RTT value being a worst-case RTT value for the UEs.

17. A method for wireless communication at a network device, comprising:
transmitting an indication of a scheduling offset between a downlink radio frame timing structure and an uplink radio frame timing structure, wherein the scheduling offset is based at least in part on a first round trip time (RTT) value for communications between a user equipment (UE) and the network device, and wherein the UE is associated with a largest RTT value of any UEs in communication with the network device; and
receiving an uplink message based at least in part on a range of timing advance values, the range of timing advance values based at least in part on the scheduling offset.

18. The method of claim 17, further comprising:
determining the range of timing advance values based at least in part on the scheduling offset, wherein the uplink message is received based at least in part on the range.

19. The method of claim 18, further comprising:
determining an orbit type associated with the network device, wherein the range is determined based at least in part on the orbit type.

20. The method of claim 17, further comprising:
determining a timing advance threshold, wherein a timing advance is determined based at least in part on the timing advance threshold.

21. The method of claim 17, further comprising:
determining a common offset associated with a cell served by the network device; and
transmitting an indication of the common offset, wherein the uplink message is received based at least in part on the common offset.

22. The method of claim 17, further comprising:
determining a network offset between a network downlink radio frame timing structure and a network uplink radio frame timing structure, wherein the uplink message is received based at least in part on the network offset; and
transmitting an indication of the network offset.

23. The method of claim 22, further comprising:
determining a minimum offset between the downlink radio frame timing structure and the uplink radio frame timing structure, wherein a timing advance is determined based at least in part on the minimum offset.

24. The method of claim 17, wherein the UE is a worst-case UE of the UEs in communication with the network device based at least in part on the first RTT value being a worst-case RTT value for the UEs.

25. An apparatus for wireless communication at a first user equipment (UE), comprising:
a processor; and
memory coupled to the processor, the processor configured to:
receive, from a network device, an indication of a scheduling offset between a downlink radio frame timing structure and an uplink radio frame timing structure, wherein the scheduling offset is based at least in part on a first round trip time (RTT) value for communications between a second UE and the network device, and wherein the second UE is associated with a largest RTT value of any UEs in communication with the network device; and
transmit an uplink message to the network device based at least in part on a timing advance, the timing advance based at least in part on the received indication of the scheduling offset.

26. The apparatus of claim 25, wherein the processor is further configured to:
determine a range of timing advance values based at least in part on the scheduling offset, wherein the timing advance is determined based at least in part on the range.

27. The apparatus of claim 26, wherein the processor is further configured to:
determine an orbit type associated with the network device, wherein the range is determined based at least in part on the orbit type.

28. The apparatus of claim 25, wherein the processor is further configured to:
determine a timing advance threshold, wherein the timing advance is determined based at least in part on the timing advance threshold.

29. The apparatus of claim 28, wherein the timing advance threshold is determined based at least in part on one or more of a slot duration, a radio frame numerology, and a buffering capability of the first UE.

30. The apparatus of claim 25, wherein the second UE is a worst-case UE of the UEs in communication with the network device based at least in part on the first RTT value being a worst-case RTT value for the UEs.

31. An apparatus for wireless communication at a user equipment (UE), comprising:
one or more memories; and
one or more processors coupled with the one or more memories and configured to cause the UE to:
receive, from a network device, an indication of a scheduling offset between a downlink radio frame timing structure and an uplink radio frame timing structure of the UE to account for propagation delay and propagation delay variation associated with communications in a non-terrestrial network (NTN); and
transmit an uplink message to the network device based at least in part on a timing advance, wherein the timing advance is based at least in part on the received indication of the scheduling offset and a timing advance threshold.

32. The apparatus of claim 31, wherein the one or more processors are further configured to cause the UE to:

determine a range of timing advance values based at least in part on the scheduling offset, wherein the timing advance is determined based at least in part on the range.

33. The apparatus of claim 31, wherein the timing advance threshold is determined based at least in part on one or more of a slot duration, a radio frame numerology, and a buffering capability of the UE.

34. An apparatus for wireless communication at a network device, comprising:
  one or more memories; and
  one or more processors coupled with the one or more memories and configured to cause the network device to:
    transmit, to a user equipment (UE), an indication of a scheduling offset between a downlink radio frame timing structure and an uplink radio frame timing structure of the UE to account for propagation delay and propagation delay variation associated with communications in a non-terrestrial network (NTN); and
    receive, from the UE, an uplink message based at least in part on a timing advance, wherein the timing advance is based at least in part on the indication of the scheduling offset and a timing advance threshold.

35. The apparatus of claim 34, wherein the one or more processors are further configured to cause the network device to:
  determine a range of timing advance values based at least in part on the scheduling offset, wherein the timing advance is based at least in part on the range.

36. The apparatus of claim 34, wherein the timing advance threshold is determined based at least in part on one or more of a slot duration, a radio frame numerology, and a buffering capability of the UE.

37. A method for wireless communication at a user equipment (UE), comprising:
  receiving, from a network device, an indication of a scheduling offset between a downlink radio frame timing structure and an uplink radio frame timing structure of the UE to account for propagation delay and propagation delay variation associated with communications in a non-terrestrial network (NTN); and
  transmitting an uplink message to the network device based at least in part on a timing advance, wherein the timing advance is based at least in part on the received indication of the scheduling offset and a timing advance threshold.

38. The method of claim 37, further comprising:
  determining a range of timing advance values based at least in part on the scheduling offset, wherein the timing advance is determined based at least in part on the range.

39. The method of claim 37, wherein the timing advance threshold is determined based at least in part on one or more of a slot duration, a radio frame numerology, and a buffering capability of the UE.

40. A method for wireless communication at a network device, comprising:
  transmitting, to a user equipment (UE), an indication of a scheduling offset between a downlink radio frame timing structure and an uplink radio frame timing structure of the UE to account for propagation delay and propagation delay variation associated with communications in a non-terrestrial network (NTN); and
  receiving, from the UE, an uplink message based at least in part on a timing advance, wherein the timing advance is based at least in part on the indication of the scheduling offset and a timing advance threshold.

41. The method of claim 40, further comprising:
  determining a range of timing advance values based at least in part on the scheduling offset, wherein the timing advance is based at least in part on the range.

42. The method of claim 40, wherein the timing advance threshold is determined based at least in part on one or more of a slot duration, a radio frame numerology, and a buffering capability of the UE.

\* \* \* \* \*